(12) United States Patent
Tanabe et al.

(10) Patent No.: US 12,278,498 B2
(45) Date of Patent: Apr. 15, 2025

(54) DEVICE HOUSING FOR WIRELESSLY RECEIVING POWER, AND DEVICE HAVING THE SAME

(71) Applicant: Aeterlink Corp., Tokyo (JP)

(72) Inventors: Yuji Tanabe, Tokyo (JP); Naoto Kodate, Tokyo (JP)

(73) Assignee: Aeterlink Corp., Tokyo (JP)

( * ) Notice: Subject to any disclaimer, the term of this patent is extended or adjusted under 35 U.S.C. 154(b) by 162 days.

(21) Appl. No.: 18/038,241

(22) PCT Filed: Mar. 31, 2021

(86) PCT No.: PCT/JP2021/014102
§ 371 (c)(1),
(2) Date: May 23, 2023

(87) PCT Pub. No.: WO2022/113396
PCT Pub. Date: Jun. 2, 2022

(65) Prior Publication Data
US 2024/0097489 A1   Mar. 21, 2024

(30) Foreign Application Priority Data
Nov. 24, 2020 (JP) ................................ 2020-194699

(51) Int. Cl.
*H02J 50/00* (2016.01)
*H02J 50/20* (2016.01)
*H02J 50/80* (2016.01)

(52) U.S. Cl.
CPC ............ *H02J 50/005* (2020.01); *H02J 50/20* (2016.02); *H02J 50/80* (2016.02)

(58) Field of Classification Search
CPC ........... H02J 50/005; H02J 50/80; H02J 50/20
(Continued)

(56) References Cited

U.S. PATENT DOCUMENTS 6,856,291 B2 * 2/2005 Mickle .................. H01Q 1/248
                                                          343/703
6,864,848 B2   3/2005 Sievenpiper
(Continued)

FOREIGN PATENT DOCUMENTS

CN     107909795 A    4/2018
JP    2002-299950 A   10/2002
(Continued)

OTHER PUBLICATIONS

International Search Report of PCT/JP2021/014102 dated Jun. 22, 2021.
(Continued)

*Primary Examiner* — Alfonso Perez Borroto
(74) *Attorney, Agent, or Firm* — Mattingly & Malur, PC

(57) ABSTRACT

A device housing is provided for wirelessly receiving electric power in order to supply electric power to a device with an excellent power-receiving efficiency, while suppressing an increase in its size as a whole. Also, a device having the same device housing and a device housing for constituting a main body of a device which is a sensor or an actuator are provided. The device housing is provided with a power-receiving device for mainly generating an electric field or a magnetic field for performing wireless power supply. The power-receiving device includes at least one of a dipole antenna, a slot antenna, a monopole antenna, a chip antenna and an inverted-F antenna. The device housing has a size in a three-dimensional space, and expansion of its size in the three-dimensional space due to the provision of the power-receiving devices is substantially limited to one axis direction (X-axis direction) at most.

13 Claims, 29 Drawing Sheets

(58) Field of Classification Search
USPC .......................................................... 307/149
See application file for complete search history.

(56) References Cited

U.S. PATENT DOCUMENTS

| | | | | |
|---|---|---|---|---|
| 6,967,462 | B1* | 11/2005 | Landis | H02J 50/80 |
| | | | | 320/109 |
| 7,084,605 | B2* | 8/2006 | Mickle | H01Q 1/248 |
| | | | | 320/108 |
| 7,237,719 | B2* | 7/2007 | Fruhauf | G06K 19/07733 |
| | | | | 235/492 |
| 7,518,267 | B2* | 4/2009 | Baarman | H02J 13/00026 |
| | | | | 320/108 |
| 7,812,771 | B2 | 10/2010 | Greene et al. | |
| 10,310,000 | B2 | 6/2019 | Yanagi et al. | |
| 2007/0222681 | A1* | 9/2007 | Greene | H02J 50/005 |
| | | | | 343/702 |
| 2010/0161002 | A1 | 6/2010 | Aghassian et al. | |
| 2017/0170677 | A1 | 6/2017 | Park et al. | |
| 2018/0077762 | A1 | 3/2018 | Lindberg-Poulsen et al. | |
| 2019/0197269 | A1 | 6/2019 | Ostermeier et al. | |

FOREIGN PATENT DOCUMENTS

| | | |
|---|---|---|
| JP | 2005-514844 A | 5/2005 |
| JP | 2008-183646 A | 8/2008 |
| JP | 2009-530964 A | 8/2009 |
| JP | 2011-211859 A | 10/2011 |
| JP | 2014-007629 A | 1/2014 |
| KR | 10-2017-0071267 A | 6/2017 |
| WO | 2015/132821 A1 | 9/2015 |

OTHER PUBLICATIONS

Extended European Search Report received in corresponding European Application No. 21897376.6 dated Oct. 10, 2024.

* cited by examiner (A)

DEVICE HOUSING FOR WIRELESSLY RECEIVING POWER, AND DEVICE HAVING THE SAME

CROSS-REFERENCE TO RELATED APPLICATION

This application claims priority to Japanese Patent Application No. 2020-194699, entitled "WIRELESS POWER SUPPLY DEVICE," filed on Nov. 24, 2020, and the content of which is incorporated herein by reference in its entirety.

FIELD OF THE INVENTION

The present invention relates to a device housing for wirelessly receiving electric power, and a device having the same device housing.

BACKGROUND

Various sensors and actuators may be used in the fields of plants (FA: Factory Automation), Internet of things (IoT), and home electric appliances, etc. In general, in sensors and actuators, a wiring for a power source is not made wirelessly.

For example, for performing wireless power supply to a proximity sensor, it is conceivable that a power-receiving device such as an antenna is provided by combining with the proximity sensor. However, when energy is received wirelessly, there are problems such as a decrease in power-receiving efficiency comparing with a case of performing wired power supply. In addition, when a proximity sensor is provided with an antenna or the like, there are problems such as an increase in a size of the proximity sensor, as a whole.

With respect to the background art on this technical field, there is JP2014-7629A (which is hereinafter referred as Patent Document 1). In the Patent Document 1, it is disclosed that "a proximity sensor 10 is configured to include a first antenna 1, a second antenna 2 and a unit for detecting voltage standing wave ratio 3. In the second antenna 2, the change direction of the resonance frequency with regard to changes of the distance to an object is reverse to the direction of the resonance frequency of the first antenna 1. In addition, the unit for detecting voltage standing wave ratio 3 is configured to detect first voltage standing wave ratio S1 on a signal line connected to the first antenna 1, and second voltage standing wave ratio S2 on a signal line connected to the second antenna 2 (see summary)".

In the Patent Document 1, two different kinds of antennas are provided in a proximity sensor. Especially, a loop antenna 1 and a helical antenna 2 are provided. However, according to the disclosure, the loop antenna 1 and the helical antenna 2 are not provided for receiving energy required for operating the proximity sensor. In addition, the loop antenna 1 and the helical antenna 2 may remarkably increase the size of the proximity sensor as a whole (see FIGS. 1, 6). Accordingly, it is conceivable that the usability of the proximity sensor may be degraded.

PRIOR ART DOCUMENTS

[Patent Document 1] JP2014-7629A

SUMMARY OF THE INVENTION

Problem to be Solved by the Invention

Accordingly, it is an object of the present disclosure to provide a device housing for wirelessly receiving electric power in order to supply the electric power to a device with an excellent power-receiving efficiency, while suppressing an increase in a size of the device as a whole; and a device having the same device housing.

Means for Solving the Problem

To solve the above-mentioned problems, for example, the configuration described in the claims is applied. The present disclosure includes a plurality of means for solving the above-mentioned problems, and an example is given below.

A device housing constituting a main body of a device which is a sensor or an actuator is provided. The device housing is provided with a power-receiving device for mainly generating an electric field or a magnetic field for performing wireless power supply. The power-receiving device includes at least one of a dipole antenna, a slot antenna, a monopole antenna, a chip antenna and an inverted-F antenna. In addition, the device housing has a size in a three-dimensional space, and expansion of the size of the device housing in the three-dimensional space due to the provision of the power receiving devices is substantially limited to one axis direction at most.

Effect of the Invention

According to the present disclosure, it becomes possible to provide a device housing for wirelessly receiving electric power in order to supply the electric power to a device with an excellent power-receiving efficiency, while suppressing an increase in a size of the device as a whole; and a device having the same device housing.

Problems, configurations, and effects except those mentioned above will be clarified by referring to the description of the following embodiments.

DESCRIPTION OF THE PREFERRED EMBODIMENTS

Hereinafter, embodiments for carrying out the invention will be explained by referring to figures. Each one of the below-mentioned embodiments is given as an example for providing the invention. The contents of the invention will not be limited by the descriptions of the examples.

Example 1

"Entire Constitution of Power-Receiving Device"

With referring to FIG. 1 (A), a power-receiving system 1 according to the present example will be explained.

The power-receiving system 1 is configured to include, at least, a power-receiving device 20 and a device (or an electric device) 30. The power-receiving device 20 is capable of wirelessly receiving energy E transmitted from a power-transmitting device 10 (without using a wiring) and supplying the electric power to the device 30. Accordingly, it completely removes the need for physically providing a wire (or a cable) for supplying electric power from the power-transmitting device 10 to the power-receiving device 20.

In addition, the power-receiving device 20 is integrally constituted with the device 30 to which power is supplied. Accordingly, it removes the need for physically providing a wire (or a cable) for supplying electric power from the power-receiving device 20 to the device 30.

Figure 1:
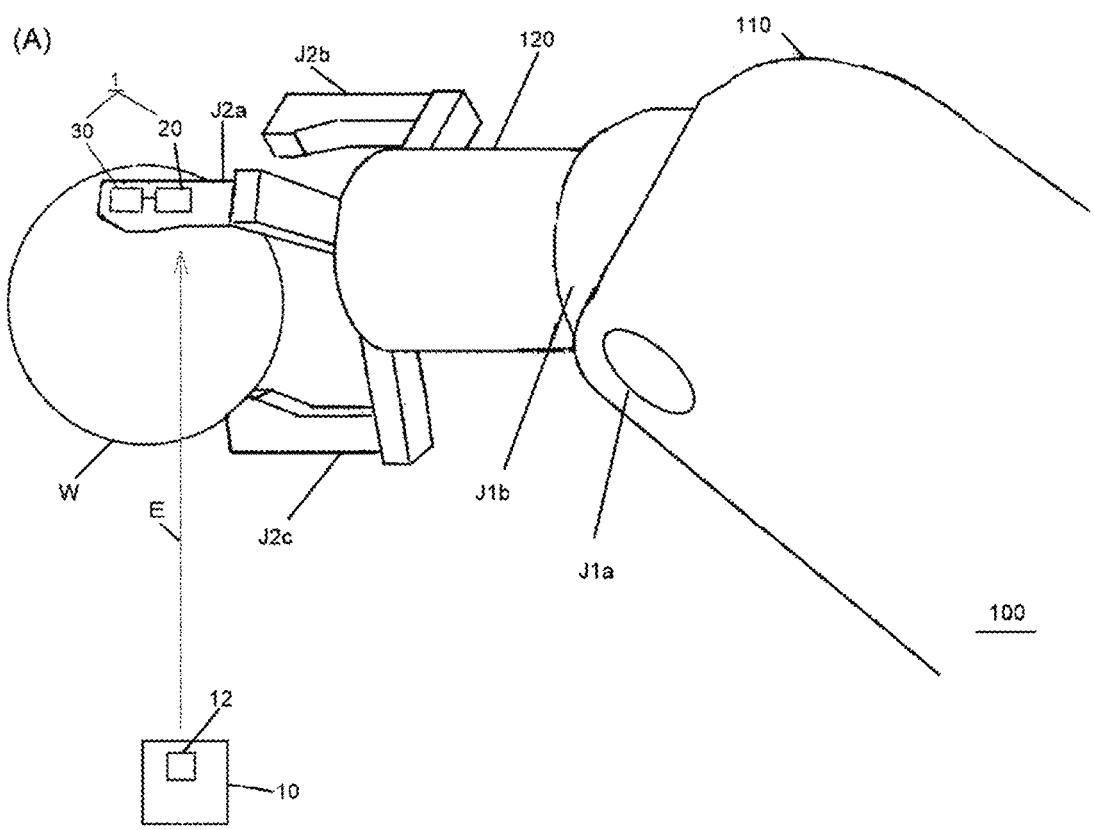
FIG. 1 is an example of a diagram divided into (A) and (B) for illustrating a power-receiving device which is capable of being wirelessly supplied with electric power from a power-transmitting device.
Figure 1:
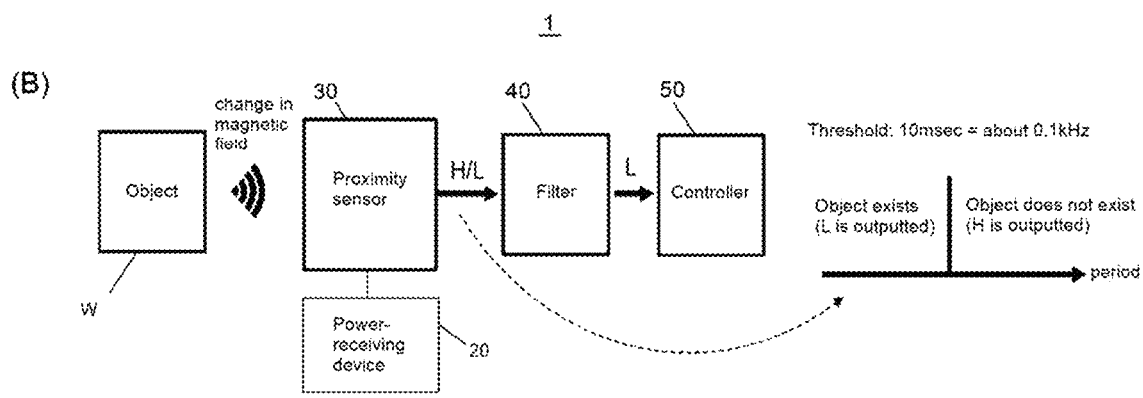

As illustrated in FIG. 1 (B), the power-receiving system 1 is capable of including other elements 30, 40.

The power-receiving device 20 is defined as a device which is capable of receiving energy E wirelessly transmitted thereto, in order to supply electric power to the device 30.

The power-transmitting device 10 which is provided in a pair with the power-receiving device 20 is defined as a device which is capable of wirelessly transmitting energy E.

The device 30 is an electric device (or a module) which is capable of being supplied with electric power as energy for operating the device 30 from the power-receiving device 20. Especially, the device 30 is a sensor or an actuator.

The sensor is defined as an electric device which is capable of measuring physical quantities and of generating measured results.

The actuator is defined as an electric device which is capable of changing physical quantities based on inputted signals.

For example, the sensor 30 may be any one of a proximity sensor, a MR (Magnetic Resistance) sensor, a hall element, a displacement sensor, an inspection sensor, a discrimination sensor, a measuring sensor, a length measuring sensor, a vibration sensor, a microphoto sensor, a pressure sensor, a flow sensor, a temperature-humidity sensor, a human detecting sensor, a wear sensor, an acceleration sensor, a strain sensor (or distortion sensor), a force sensor, a CMOS sensor, a photoelectric sensor, a laser sensor, an ultrasonic sensor, a touch sensor, a linear cage, a potentiometer (or position sensor), an image sensor, a color sensor, a LiDAR sensor, a TOF sensor, a seismic sensor, a gyroscopic sensor, an inclination sensor, a rotation sensor, an angle sensor, a tachometer, a load cell, a false sensor, a torque sensor, a liquid level sensor, a liquid leakage/water detection sensor, a non-contact temperature sensor, a current sensor, an electric power sensor, an electrostatic sensor, and an isolator, etc.

For example, the actuator may be any one of an electric actuator, a hydraulic actuator, a pneumatic actuator (or an air pressure type actuator), a chemical actuator, a magnetic fluid actuator, and an electroviscous fluid actuator, etc.

The power-receiving system 1 which includes, at least, the power-receiving device 20 and the device 30 is capable of being provided in various application examples. For example, the power-receiving system 1 is capable of being provided in the fields of FA (such as a factory), IoT (Internet of Things), or home electric appliances, etc.

In the example illustrated in FIG. 1 (A), the power-receiving system 1 is provided in a machine 100 which may be an industrial robot (for example, a machine tool) or a domestic robot (for example, a home electric appliance), etc.

The machine 100 is capable of being configured to be used in a variety of applications, such as grasping, picking, placing, assembling, painting, or welding, etc., of a workpiece (or a component) W. Preferably, the machine 100 is an articulated robot which is capable of performing various operations at a high degree of freedom.

The power-receiving system 1 is capable of being provided in various application examples, in addition to the illustrated machine 100. For example, in general, the power-receiving system 1 is capable of being provided so as to supply electric power to an arbitrarily sensor (for example, a proximity sensor, a magnetic sensor, or the like) for detecting objects on a line in a factory, in the FA equipment. Furthermore, in general, the power-receiving system 1 is capable of being provided so as to monitor conditions in an office environment (for example, with a temperature and humidity sensor, or an illumination sensor, etc.) in a building management system.

Hereinafter, the power-receiving system 1 provided in the articulated robot 100 will be explained.

In general, the articulated robot 100 includes a plurality of (at least two) shafts and/or joints J1a, J1b, J2a, J2b, and J2c for operating a robot arm unit 110 and/or a robot hand unit 120 at a high degree of freedom. In general, as the number of the joints J1a, J1b, J2a, J2b, and J2c becomes larger, the degree of freedom of the articulated robot 100 becomes higher, but more precise control will be required accordingly. On the other hand, as the number of the joints J1a, J1b, J2a, J2b, and J2c becomes smaller, the mechanism of the articulated robot 100 becomes simpler, and a malfunction thereof will be less likely to occur.

Figure 2:
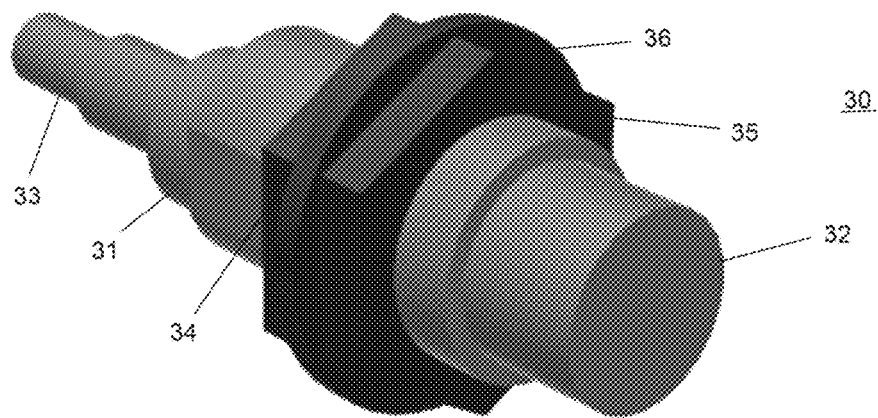
FIG. 2 is an example of a diagram illustrating a conventional proximity sensor.
Figure 2:
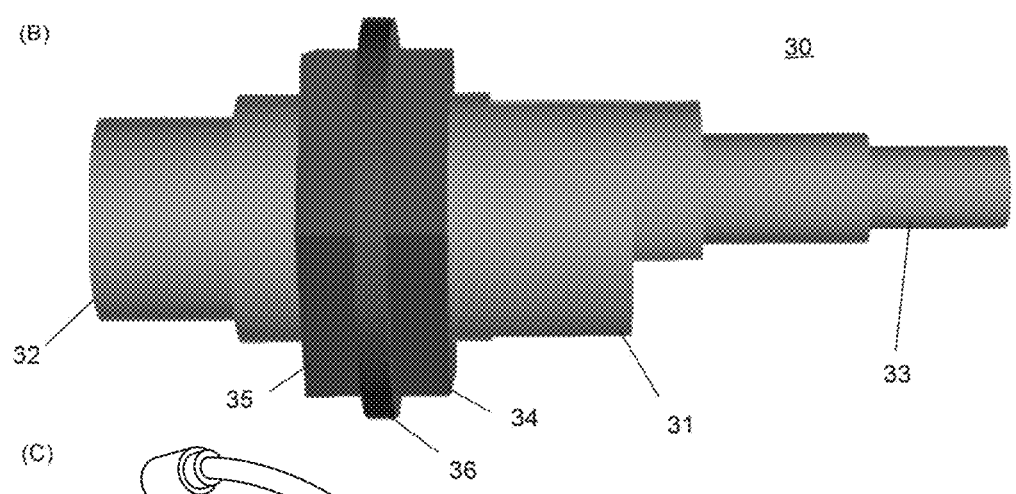
Figure 2:
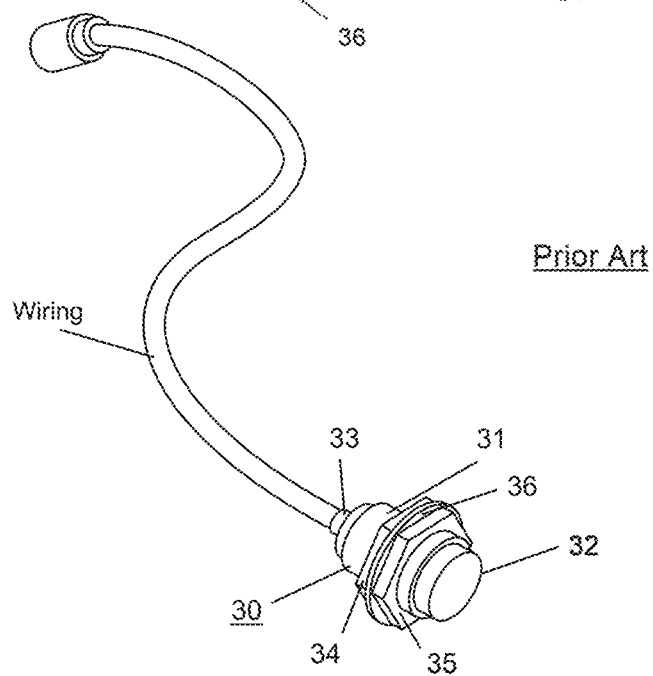

With referring to FIG. 2 (C), a wiring condition of a sensor 30 according to the prior art is exemplified. As illustrated in the figure, in a case where a wire is provided inside the machine 100 in order to supply electric power to the sensor 30, there are several problems. For example, when the joints J1a, J1b, J2a, J2b, and J2c of the articulated robot 100 are operated, loads may be applied to the wire (see FIG. 2). Accordingly, there is a risk that the wire may be broken. Furthermore, performing maintenance of the wire will be required. In addition, in a machine (for example, the articulated robot 100) which is capable of performing various operations at a high degree of freedom, various components such as actuators or the like are already provided therein. Therefore, there is a problem that a size of a space for installing a wire is limited. In addition, there is a risk that the wire may be broken by being corroded by an oil or the like.

The present example is constituted to prevent the occurrence of the above-mentioned problems of wiring.

The power-receiving system 1 is capable of being provided in various machines 100 in an arbitrary manner. For example, all of the parts of the power-receiving system 1 may not be accommodated in a finger of the robot hand unit 120 illustrated in FIG. 1 (A). For example, a relatively large bulky part may be constituted to be flexible to be waded up for being put in a space of the finger. Also, it is possible to provide a part of the power-receiving system 1 at a location distant from the finger (for example, at a root of the finger of the robot hand unit 120, or at a wider place in the vicinity). Further, it is possible to provide a part of the power-receiving system 1 so as to protrude to the outside of the machine 100, as needed.

With referring to FIG. 1 (A), it is exemplified that the power-transmitting device 10 is provided to the outside of the articulated robot 100 at an appropriate place. The power-transmitting device 10 is capable of wirelessly transmitting energy E to the power-receiving device 20 via a power-transmitting antenna 12. There are several types for wirelessly transmitting electric power. Preferably, the present example is configured to perform wireless power supply between the power-transmitting device 10 and the power-receiving device 20 based on the microwave system. According to the microwave system, it is possible to transmit energy E (or electric power) at a relatively long distance.

Hereinafter, as an example of the device 30, a proximity sensor will be explained.

"Proximity Sensor"

With referring to FIG. 2 (A), (B), a perspective view and a side view of a conventional proximity sensor 30 are illustrated.

The proximity sensor 30 is a device for detecting an object (as a detection target) without contacting with the object. Various types of proximity sensors 30 are known. For example, one type of the proximity sensors is configured to react with a metal when the metal approaches thereto. Therefore, it may not be deteriorated by abrasion with an object because the measurement is made without contacting with the object. Additionally, it has water-proofness and dust-proofness, and also it has the advantage of hardly broken. Especially, in a case of the proximity sensor which is capable of reacting with a metal, it has the advantage that it is less susceptible to dust or water drops. Further, it may have less erroneous detection. There are various types of detection distances of the proximity sensor 30. For example, one type of the proximity sensors may detect an object on the mm unit. For example, the proximity sensor may be any one of an induction type proximity sensor, an electrostatic capacity type proximity sensor, and a magnetic proximity sensor.

In a case that the proximity sensor is an induction type proximity sensor, an object to be detected will be a metal conductor (in general, the metal is composed of an iron, an aluminum, a brass, or a copper, etc.). According to the principle, a magnetic loss due to an eddy current generated on a surface of a conductor is detected by influence of external magnetic fields. For example, alternating current magnetic fields are generated at a detection coil, and then a variation of impedance due to the eddy current generated on the metal body (which becomes the detection target) is detected.

In a case of an electrostatic capacity type proximity sensor, an object to be detected will be any one of a metal, a resin, a liquid, and a powder, etc. (based on the dielectric constant). According to the principle, a variation of an electrostatic capacity generated between the sensor and the detection target is detected. For example, when a metal or a dielectric approaches thereto, an electrostatic capacity between a ground potential and an electrode inside the sensor increases by an electrostatic induction effect. The oscillation amplitude increases according to a variation of the electrostatic capacity of the electrode, and then the approach of the detection target is detected.

In a case of a magnetic proximity sensor, an object to be detected will be mainly a magnet. According to the principle, a lead piece of a switch is operated by a magnet. For example, the switch is configured to be turned on by turning on the lead switch.

With referring to FIG. 2 (A), an example of the induction type proximity sensor 30 is illustrated. In this sensor 30, a detection coil, an oscillation circuit, a circuit for detecting an oscillation condition, and an output circuit (which are not illustrated in the figure) may be accommodated in a device housing (for example, a housing or a case) which is configured to constitute a main body of the sensor 30. A detection surface 32 is provided at one end of the device housing 31, and the detection surface 32 is capable of emitting high-frequency magnetic fields from the detection coil according to the oscillation circuit. When a metal object (see reference symbol W in FIG. 1) approaches in the high-frequency magnetic fields, an induction current flows in the approaching metal due to an electromagnetic induction phenomenon. Accordingly, a heat loss is generated in the metal object W. When this condition occurs, the circuit for detecting the oscillation condition detects an attenuation or a stop of the oscillation, and then the result is outputted by the output circuit to the outside.

The proximity sensor 30 is required to be supplied with electric power in order to perform the above-mentioned detection operations and to generate electric signals. Usually, in the conventional proximity sensor 30, a connector for wiring (or an attaching member) 33 is provided at one end side of the device housing 31 opposite to the detection surface 32. In general, the connector 33 is made of metal, and a wire (or a cable) for receiving electric power is connected in the connector 33 (see FIG. 2 (B)). For example, the diameter of the detection surface 32 is made to be about 18 mm, and the length of the device housing 31 along the longitudinal direction is made to be about 35 mm. However, the shape and the size of the device housing 31 and those of the detection surface 32 are not limited to the above-mentioned example, and the device housing 31 may be variously constituted. For example, a part of the device housing 31 is enlarged so as to have a diametrically enlarged portion (see reference numerals 34, 35, and 36) which is capable of performing clamping/fixing in order to prevent the occurrence of fluctuation of the detection distance. For example, it is possible to configure the device housing 31 to be clamped by providing nuts 34, 35 and a washer 36 as the diametrically enlarged portion. Accordingly, the device housing 31 is capable of being separated into two parts from the diametrically enlarged portion.

"Wireless Power Supply"

The proximity sensor 30 needs to be provided close to an object for the purpose of detecting the object. In general, when the proximity sensor 30 is provided near an object (or a workpiece W) to be detected, a situation may occur in which the proximity sensor 30 collides with the workpiece W. In such a case, a breakage of the proximity sensor 30 may occur. Accordingly, the replacement frequency of the proximity sensor 30 is said to be relatively high. For example, the proximity sensor 30 may be replaced at a frequency of about once every three months.

In order to replace a cable (or a wiring) of the proximity sensor 30, additional work is needed in two steps: fitting of a cable, and disposing of the cable (see FIG. 2 (C)). In general, a plurality of cables for the proximity sensor 30 are provided in various lengths, such as 2 m, 5 m, 10 m or the like, and it is required to attach an arbitrary cable to a controller or the like according to the facility. The occurrence of the work means that a labor cost may be required for a worker in the factory. For example, according to some companies, it is estimated that the hourly wage of the worker may be 4000 Japanese Yen, and the loss for stopping the line may be 3 million Japanese Yen per minute.

In the present example, in order to address the above-described problems, the power-receiving device 20 is configured to receive energy E transmitted from the power-transmitting device 10 according to the microwave system in order to supply electric power to the proximity sensor 30. However, there is an upper limit to the capacity of the energy to be transmitted according to the microwave system. In addition, there is a problem in that the efficiency of receiving energy is reduced as compared to the case of performing wired power supply. In addition, when performing wireless power supply between the power-transmitting device 10 and the power-receiving device 20, the amount of power to be transmitted is attenuated in inverse proportion to the square of the distance between the two devices 10, 20 according to Friis transmission formula.

In general, the proximity sensor 30 may be operated in a range from about 12V to about 24V and in a range from about 3 mA to about 1000 mA. In other words, when converted into electric power, the power consumption of at least about 36 mW may be required. However, when performing wireless power supply according to the microwave system, electric power of only about 1 mW to 10 mW may be supplied to a target through a distance of one meter. That is, in order to perform wireless power supply with regard to the proximity sensor 30, reducing the power consumption of the proximity sensor 30 may become an issue.

The above-mentioned problem of the "reducing the power consumption of the proximity sensor" may be solved by newly developing a proximity sensor 30 having low power consumption for specific use. However, in general, a period of about 1 year to 5 years may be required in order to newly develop a product.

Therefore, for example, in the manufacturing industries, the products for consumer equipment are often applied to the products for automobiles. In such a case, a required period may be reduced to about one year.

In the present example, it is estimated that a conventional or existing proximity sensor 30 which is applicable in a range from 12V to 24V is used as it is, thereby eliminating the need for newly developing a proximity sensor having low power consumption. For this purpose, the applicant performed the below-mentioned tests.

Firstly, the applicant performed tests to verify how an existing proximity sensor 30 which is applicable in a range from 12V to 24V may work when electric power lower than the recommended electric power is supplied to the existing proximity sensor 30.

Figure 3:
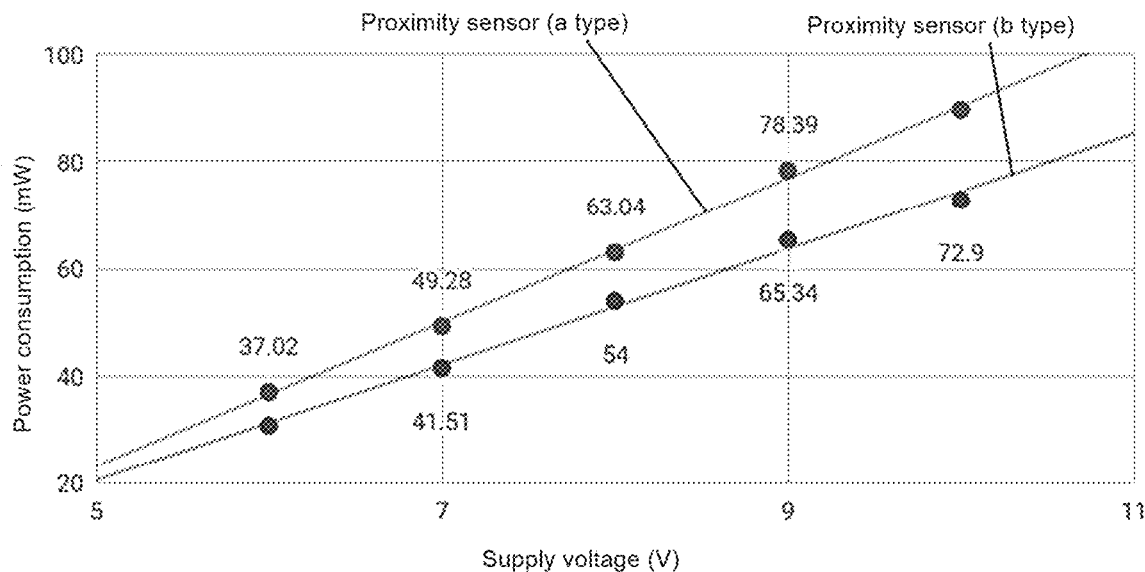
FIG. 3 is an example of a diagram illustrating changes in the output of the proximity sensor when the voltage is dropped.
Figure 3:
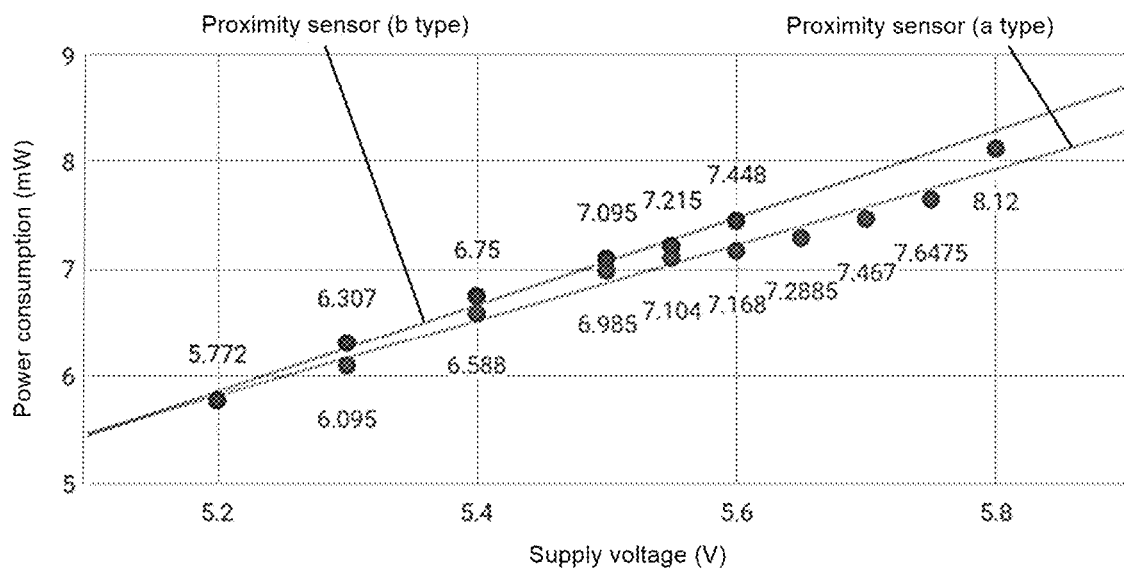

With referring to FIG. 3 (A), changes in the electric power of the proximity sensor with respect to changes in the supplied voltage (or supply voltage) are depicted when voltage lower than the recommended value is supplied to two different types (which are referenced by reference numerals a and b) of commercially available proximity sensors which are applicable in a range from 12V to 24V. In the figure, values of supplied voltage (V) are depicted on the horizontal axis, and values of electric power (mW) are depicted on the vertical axis.

When the supplied voltage is lowered to about 6V with respect to the existing proximity sensors which are applicable to 12V to 24V, it is verified that the existing proximity sensor may operate as specified. Normally, when an object is detected, the power of the proximity sensor is made to be Low (L). At this time, as the supplied voltage becomes smaller, the power consumption becomes smaller. However, the occurrence of the power consumption of about 30 mW is still confirmed.

With referring to FIG. 3 (B), subsequently to FIG. 3 (A), changes in the electric power of the proximity sensor are illustrated when supplied voltage is further decreased. As depicted in the figure, when the voltage is lowered to about 5.2V, the power consumption becomes about 6 mW. In other words, it is confirmed that the proximity sensor 30 may work as long as there is the supply amount of about 10 mW.

In this way, when the supplied voltage is reduced from the recommended value with respect to the existing proximity sensors which are applicable to 12V to 24V, it is verified that the power requirement may be satisfied. Accordingly, it becomes possible to avoid the need for researching and developing a new proximity sensor which is applicable to about 5V to 6V. However, it is confirmed that the proximity sensor may work differently when the supplied voltage is reduced as compared with the case of the normal condition (in other words, when the sensor works at about 12V to 24V, as it is recommended).

Figure 4:
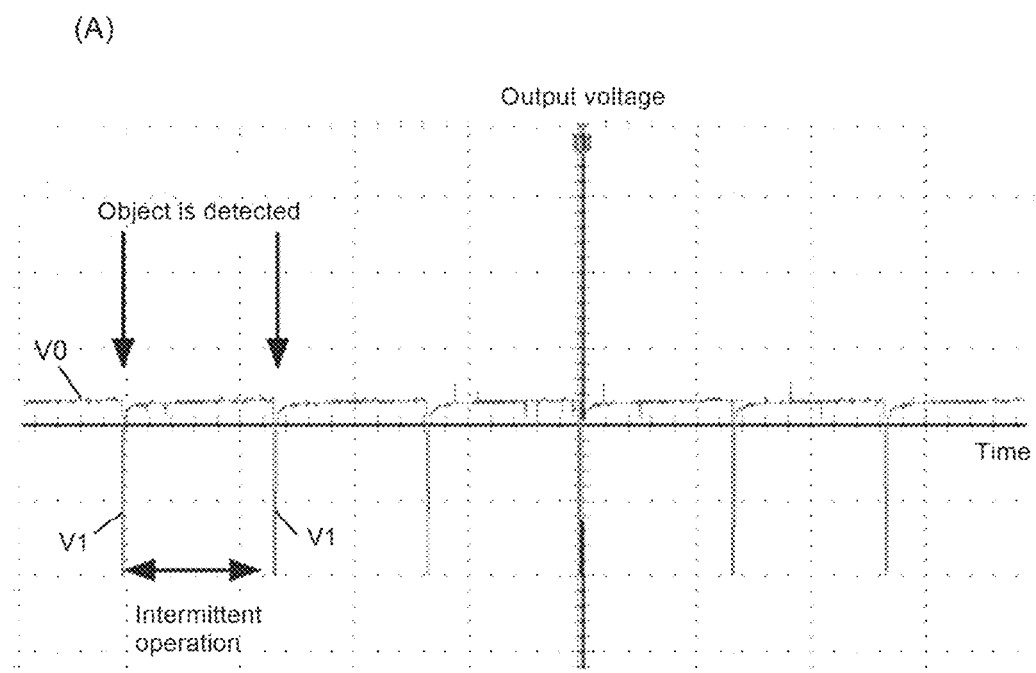
FIG. 4 is an example of a diagram illustrating changes in the output of the proximity sensor when the voltage is dropped.
Figure 4:
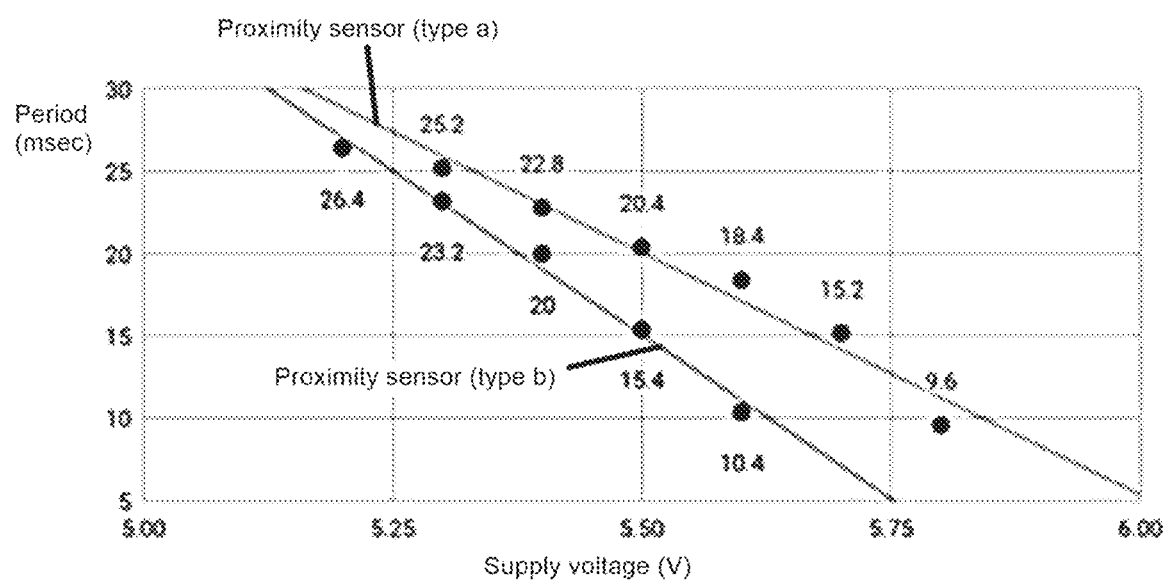

With referring to FIG. 4 (A), output waveforms of the proximity sensor 30 are depicted when the supplied voltage is considerably lowered (for example, equal to or less than 6V) from the recommended value, as illustrated in FIG. 3 (B). As can be seen from the figure, when an object (as a detection target) is not in the vicinity of the sensor, the output voltage appears as positive (see V0). On the contrary, when an object is detected, the output voltage appears as large negative (see V1). In an ordinary use condition, when an object is detected, the output voltage of the proximity sensor is maintained in the lowered condition of "Low output for detecting an object". However, as illustrated in FIG. 3 (B), when the supplied voltage which is considerably lowered from the recommended value is supplied to the sensor, it is confirmed that the above-mentioned condition of "Low output for detecting an object" is not maintained in the entire time-domain of the detection, but an intermittent operation is performed. That is, it is confirmed that the proximity sensor may periodically output the output voltage in the positive (see V0) and in the negative (see V1) alternately, even though the object is continuously detected by the sensor. Supposing that the period of the intermittent operation is made to be $T_{period}$, then it is conformed that the output-voltage-waveforms downwardly appear at every period $T_{period}$ when the object is detected.

Furthermore, the Applicant performed other tests to confirm the regularity of the above-mentioned intermittent operation of the proximity sensor.

With referring to FIG. 4 (B), a graph is depicted for the above-mentioned case of FIG. 4 (A). In this figure, values of supplied voltage (V) are depicted on the horizontal axis, and values of time (msec) are depicted on the vertical axis. As a consequence, it is found that the period $T_{period}$ of the intermittent operation illustrated in FIG. 4 (A) has a relationship as shown in the graph of FIG. 4 (B). That is, according to one type of the proximity sensor (type a), it is found that as the supplied voltage becomes smaller from 6V, the size of the period $T_{period}$ becomes larger almost proportionally to the voltage drop. It is confirmed that the same result may be obtained for another type of the proximity sensor (type b). Accordingly, it is found that there is a relationship between the intermittent operation of the proximity sensor and the periodic variation thereof.

Hereinafter, it is supposed that a condition in which the proximity sensor performs an intermittent operation when the supplied voltage of the proximity sensor is considerably lowered from the recommended value is referred to as a "low power mode (a mode in which the operation of the sensor is enabled with about one-fifth of power consumption of the conventional normal operation mode)". In addition, it is supposed that a condition in which the supplied voltage of the proximity sensor satisfies the recommended value and the proximity sensor does not perform the intermittent operation is referred to as a "normal power mode". It is also supposed that the low power mode may include a condition in which the operation of the sensor is enabled with power consumption in a range from about 1/5 to less than 1/1 compared with the conventional normal operation mode.

In the low power mode, it is confirmed that the proximity sensor 30 may perform the intermittent operation (see FIG. 4 (A)). As a result, problems may occur when the output of the sensor is used as it is. Accordingly, the present example makes efforts to distinguish a condition in which an object exists, and a condition in which there is no need to detect an object (for example, an object does not exist) or an object is detected after a long time interval (for example, an object is replaced), by devising a circuit. That is, the period $T_{period}$ of the intermittent operation appears at relatively short intervals as illustrated in FIG. 4 (A). The size of the time interval is substantially proportional to the supplied voltage, as illustrated in FIG. 4 (B). Accordingly, it becomes possible to estimate the size of the time interval according to the supplied voltage. Therefore, based on the fact that the intermittent operation of the proximity sensor is able to be predicted based on the supplied voltage, it becomes possible to determine whether or not the proximity sensor is detecting an object.

With referring again to FIG. 1 (B), it is illustrated that the power-receiving system 1 is configured to include the power-receiving device 20, the proximity sensor 30, a periodic filter 40, and a controller 50. In this circuit, the output of the proximity sensor 30 is passed through the periodic filter 40 and then it is transmitted to the controller 50. The periodic filter 40 is an electric element which is capable of distinguishing a condition in which changes of High/Low are relatively fast (for example, the condition corresponds to the low power mode, at the time when an object is detected) and a condition in which the changes do not exist (for example, when there is no object).

For example, with referring to FIG. 4 (B), it is illustrated that voltage of 5.5V is supplied to the proximity sensor (a). At this time, it is predictable that the proximity sensor (type a) performs the intermittent operation at the period $T_{period}$ of 20.4 msec. Accordingly, the output of the proximity sensor 30 is made to be passed through the periodic filter 40 in accordance with the size of the period. As a result, when the proximity sensor 30 detects an object W in the low power mode and performs the intermittent operation, the output may be used in the same way as the case of the normal power mode Therefore, according to the present power-receiving system 1, it is possible to avoid the occurrence of the erroneous recognition of the sensor output even when the conventional proximity sensor 30 which is applicable in a range from about 12V to about 24V is operated in the low power mode (for example, in a range from about 5V to about 6V).

However, the power-receiving system 1 is not limited to the configuration illustrated in FIG. 1 (B). The power-receiving system 1 is applicable to various types of devices (for example, sensors or actuators) 30, and the device 30 may be operated in the normal power mode in addition to the low power mode depending on the kinds of the devices 30. Therefore, the power-receiving system 1 may not necessarily include the periodic filter 40.

"Power-Receiving Antenna"

Hereinafter, the power-receiving device 20 for being used in the power-receiving system 1 illustrated in FIGS. 1 to 4 will be described. In the present example, the power-receiving device 20 is configured as a power-receiving antenna. In particular, the power-receiving antenna is configured by using a device housing 31 (see FIG. 2 (A)) constituting a main body of the device 30 to which electric power is supplied. Accordingly, the power-receiving device 20 is provided integrally with the device 30.

Figure 5:
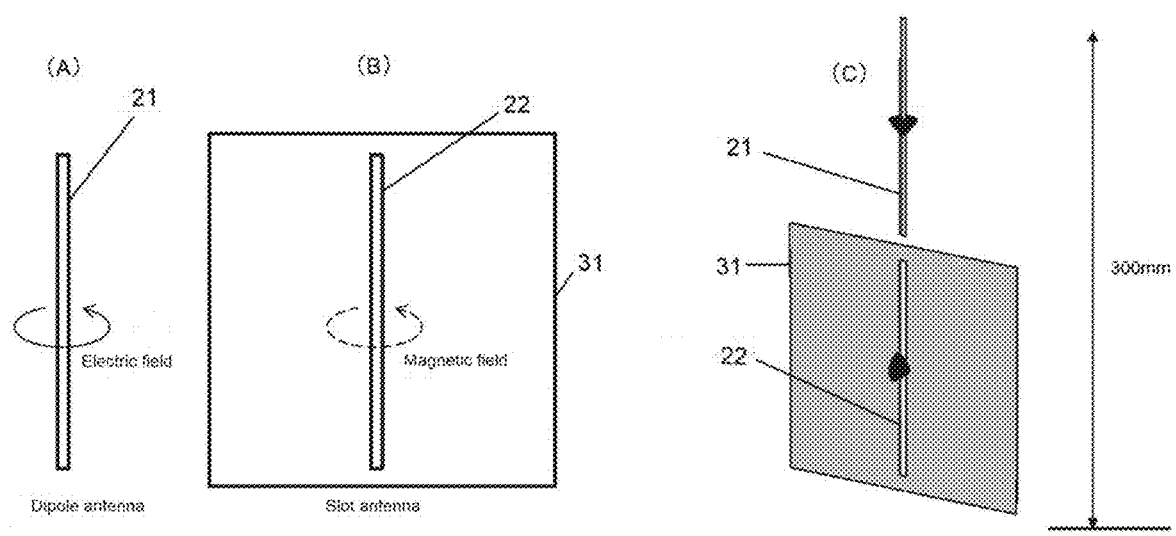
FIG. 5 is an example of a diagram illustrating a power-receiving device.
Figure 6:
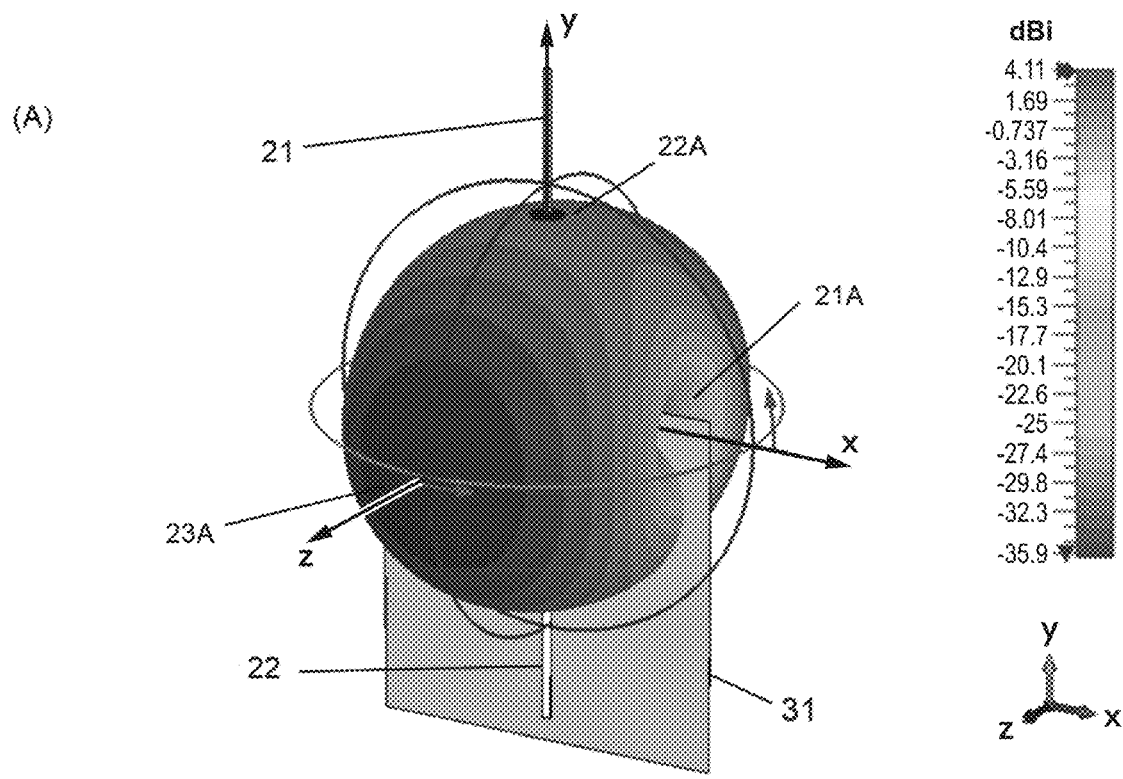
FIG. 6 is an example of a diagram illustrating radiations of two different types of antennas in the three-dimensional space.
Figure 6:
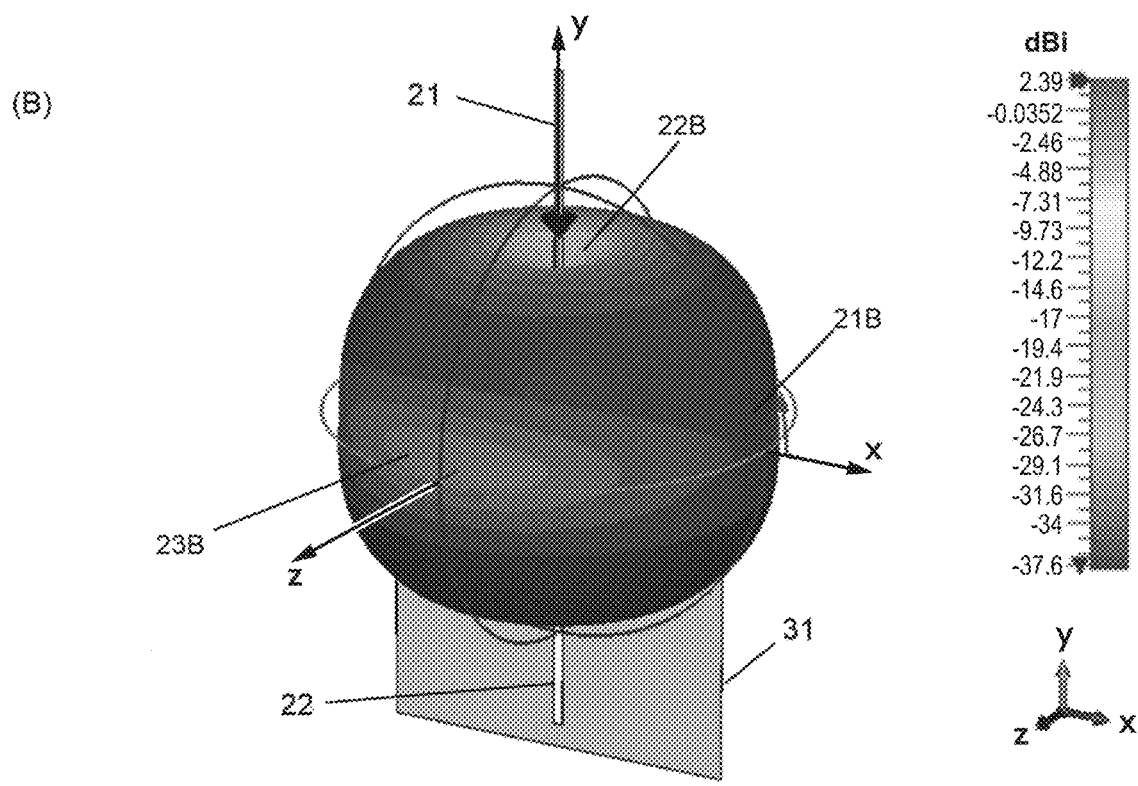
Figure 7:
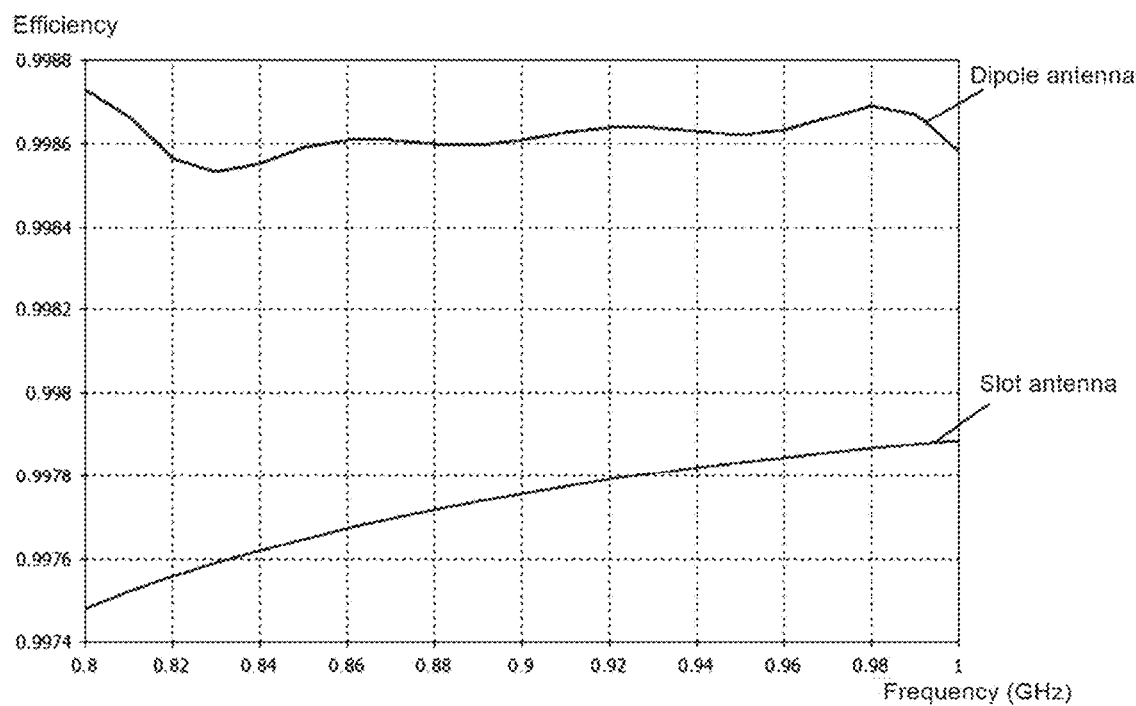
FIG. 7 is an example of a diagram illustrating efficiencies of two different types of antennas.

FIGS. 5 to 7 schematically illustrate an overall configuration of the power-receiving device 20.

In FIG. 5 (A), a dipole antenna 21 for being used as the power-receiving device 20 is illustrated. For example, the dipole antenna 21 is attached to the device housing 31 of the proximity sensor 30. The dipole antenna 21 is made to function as an antenna for generating electric field radiation. In general, the proximity sensor 30 is configured to have a metal device housing (or metal body) 31. With regard to this, a metal should not be arranged in a periphery of the dipole antenna 21, but a resin or the like (which is not a metal) should be arranged thereabout.

In FIG. 5 (B), a slot antenna 22 for being used as the power-receiving device 20 is illustrated. For example, an arbitrary cavity is provided in the metal device housing 31 of the proximity sensor 30. Accordingly, a slot is formed so as to penetrate a wall portion of the device housing. The slot antenna is made to function as an antenna for generating electromagnetic field radiation.

In FIG. 5 (C), it is exemplified that the dipole antenna 21 and the slot antenna 22 may be used in combination as the power-receiving device 20. In this case, the dipole antenna 21 and the slot antenna 22 are arranged continuously and linearly along the longitudinal direction. It is illustrated that the two antennas 21, 22 may have a length of about 300 mm, as a whole.

The dipole antenna 21 and the slot antenna 22 illustrated in FIG. 5 (C) are mutually aligned along the same direction. However, the working direction of the dipole antenna 21 and that of the slot antenna 22 appear orthogonal to each other. The dipole antenna 21 mainly acts on the basis of the electric fields, and the slot antenna 22 mainly acts on the basis of the magnetic fields, so that the respective working directions intersect with each other.

With referring to FIG. 6, the simulation results of the power-receiving conditions of respective antennas are depicted in the three-dimensional space, with regard to the power-receiving device 20 (see FIG. 5 (C)). In FIG. 6 (A), the directivity of the dipole antenna 21 is schematically illustrated, and in FIG. 6 (B) the directivity of the slot antenna 22 is schematically illustrated. In these figures, it is illustrated that as the color becomes darker, the intensity of the directivity of each antenna becomes stronger. As can be seen from the figures, an omnidirectional antenna may be configured as a whole, by combining the two different types of antennas 21, 22 for constituting the power-receiving device 20.

For example, when viewed from the X-axis direction in FIG. 6 (A), it can be seen that the dipole antenna 21 has an area in which the directivity of the antenna is decreased or weakened, as indicated by the reference numeral 21A. On the other hand, when viewed from the X-axis direction in FIG. 6 (B), it can be seen that the slot antenna 22 has an area in which the directivity of the antenna is increased or strengthened, as indicated by the reference numeral 21B. The two areas 21A, 21B overlap each other so that the area of the dipole antenna 21 where its function is dropping may be complemented by the area of the slot antenna 22 when viewed from the X-axis direction.

Also, for example, when viewed from the Y-axis direction in FIG. 6 (A), it can be seen that the dipole antenna 21 has an area in which the directivity of the antenna is increased, as indicated by the reference numeral 22A. On the other hand, when viewed from the Y-axis direction in FIG. 6 (B), it can be seen that the slot antenna 22 has an area in which the directivity of the antenna is decreased, as indicated by the reference numeral 22B. The two areas 22A, 22B overlap each other so that the area of the slot antenna 22 where its function is dropping may be complemented by the area of the dipole antenna 21 when viewed from the Y-axis direction.

Further, for example, when viewed from the Z-axis direction in FIG. 6 (A), it can be seen that the dipole antenna 21 has an area in which the directivity of the antenna is increased, as indicated by the reference numeral 23A. On the other hand, when viewed from the Z-axis direction in FIG. 6 (B), it can be seen that the slot antenna 22 has an area in which the directivity of the antenna is decreased, as indicated by the reference numeral 23B. The two areas 23A, 23B overlap each other so that the area of the slot antenna 22 where its function is dropping may be complemented by the area of the dipole antenna 21 when viewed from the Z-axis direction.

In this way, the directivity of the dipole antenna 21 and that of the slot antenna 22 do not appear uniformly in the three-dimensional space. The two directivities appear with various intensities, respectively, and each of the distributions is different. Accordingly, by properly combining the two distributions, it becomes possible to complement an area(s) where the directivity of the dipole antenna 21 is weakened by an area(s) of the slot antenna 22, and vice versa. Therefore, the two antennas 21, 22 are configured to mutually complement different directivities of the two antennas. As a result, the combination of the antennas 21, 22 is constituted to be capable of receiving electric power in almost all directions without particularly showing a lack of directivity, as a whole. It is possible to achieve this constitution only by arranging the two antennas 21, 22 in a straight line, as illustrated in FIG. 5 (C), and it is not necessary to adjust both orientations in a complicated manner.

With referring to FIG. 7, the simulation results of the above-mentioned dipole antenna 21 and the slot antenna 22 are illustrated. In this figure, values of frequencies (GHz) are depicted on the horizontal axis, and values of efficiencies of the antennas are depicted on the vertical axis (supposing that efficiency of the perfect (ideal) antenna is 100%). As can be seen from the figure, it is verified that each antenna may have high efficiency of more than about 99% when the frequency is varied in a range from 0.8 GHz to 1.0 GHz. Accordingly, it is confirmed that the power-receiving device 20 illustrated in FIG. 5 (A) to (C) is capable of suitably receiving electric power.

Next, a more specific example of the power-receiving device 20 will be described with referring to FIGS. 8 to 10, with regard to the above-mentioned power-receiving device 20 schematically illustrated in FIGS. 5 to 7.

Figure 8:
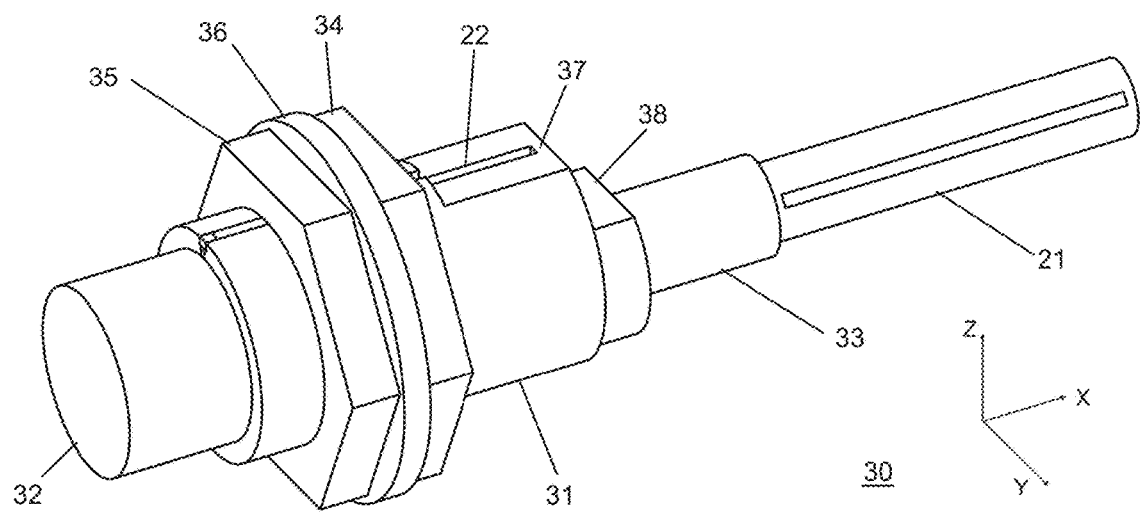
FIG. 8 is an example of a diagram illustrating a perspective view of a proximity sensor having two different types of antennas

With referring to FIG. 8, a perspective view of the proximity sensor 30 which is integrally provided with the power-receiving device 20 according to the present example is illustrated. This figure corresponds to an implementation example in which the dipole antenna 21 and the slot antenna 22 are combined (see FIG. 5 (C)).

As illustrated in FIG. 5 (A), a dipole antenna 21 is provided as the power-receiving device 20, at one end portion of a metal device housing 31 of the proximity sensor 30. In general, the proximity sensor 30 is configured to include a metal connector 33 for performing wired power supply (see FIG. 2). It is possible to use this portion for mounting a dipole antenna 21 on the device housing 31. The dipole antenna 21 is configured to have a rod-shaped main body so as to extend linearly along the longitudinal direction of the device housing 31.

In the conventional proximity sensor 30, a cable for wiring is made to extend from the end portion opposite to the detection surface 32 of the device housing 31 (see FIG. 2 (C)). The present example is configured to eliminate the need for such a cable. As a result, it becomes possible to attach the dipole antenna 21 to the end portion of the device housing 31 by using a space for the eliminated cable. At this time, the metallic material of the conventional connector 33 of the proximity sensor may be used as a GND of the antenna.

In this way, the dipole antenna 21 may be attached to the device housing 31 by replacing the conventional connector 33.

As illustrated in FIG. 5 (B), a longitudinal slot is formed in the metal device housing 31 of the proximity sensor 30 so as to extend in the longitudinally direction. As a result, a slot antenna 22 is provided as the power-receiving device 20. This slot is provided to penetrate a wall of the device housing 31 along the thickness direction of the device housing 31. This slot extends linearly along the longitudinal direction of the device housing 31, but is provided not to penetrate the end portion of the device housing 31 (see reference numeral 37).

In a case when a slot is formed to penetrate the device housing 31, it is possible to cover a coil, a circuit or the like provided in the device housing with a metal or a resin in order to protect the internal coil, circuit or the like from the intrusion of oil.

Also, in a case when the device housing 31 is made of a non-metal material, it is possible to attach or add a metal film or a metal part to the slot penetrating the wall of the device housing 31. In such a case, the slot is capable of functioning as the slot antenna 22.

As illustrated in FIG. 5 (C), the dipole antenna 21 and the slot antenna 22 are arranged so as to be linearly continuous with each other along the longitudinal direction of the device housing 31 of the proximity sensor 30. In the height direction of the proximity sensor 30, the dipole antenna 21 and the slot antenna 22 are offset from one another (see reference numeral 38). This height difference is made not to cause any particular disadvantage in the directivity of each antenna.

As described above, the device housing 31 has a size in the three-dimensional space (in the X-axis direction, the Y-axis direction, and the Z-axis direction), and the expansion of the size of the device housing 31 in the three-dimensional space due to the provision of the power-receiving devices 21, 22 is substantially limited to one axis direction (for example, the X-axis direction) at most (in practice). Especially in the case of the slot antenna 22, the expansion of the size of the device housing 31 is completely eliminated.

Therefore, according to the present example, it becomes possible to attach the power-receiving device 20 on the device housing 31 of the proximity sensor 30 without significantly changing the configuration of the conventional proximity sensor 30. The power-receiving device 20 preferably includes the dipole antenna 21 and the slot antenna 22, and is capable of receiving energy E from any direction. Each of the antennas 21, 22 may be functionally connected to a rectifier in the device housing 31. The rectifier is an electrical element having a rectifying function for sending a current of electricity only in one direction. The rectifier is capable of converting electromagnetic waves (RF) received by the antennas 21, 22 into direct voltages (DC). The rectifier(s) may be integral with the antenna(s) 21, 22. Also, as described below, the rectifier may be integral with a chip antenna. In this way, the antennas 21, 22 rectify microwaves and convert them into direct currents.

In a case when the proximity sensor 30 is used in a machine 100 or the like in FA (Factory Automation), it is required to have an oil resistance. When oil is used in the vicinity of the machine 100, or inside or outside the machine 100, oil may splash to the device housing 31 of the proximity sensor 30, and thus the corrosion thereof may become a problem. Therefore, the material of the device housing 31 of the proximity sensor 30 is selected in consideration of the oil resistance. In the present example, the antenna (the dipole antenna 21 and/or the slot antenna 22) may be incorporated in the device housing 31 of the proximity sensor 30 in view of the specific issues in FA. At this time, by arranging the antenna by utilizing the metal of the device housing 31, it becomes possible to have advantages peculiar to the wireless power supply based on the microwave system from the point of view of energy harvest.

Figure 9:
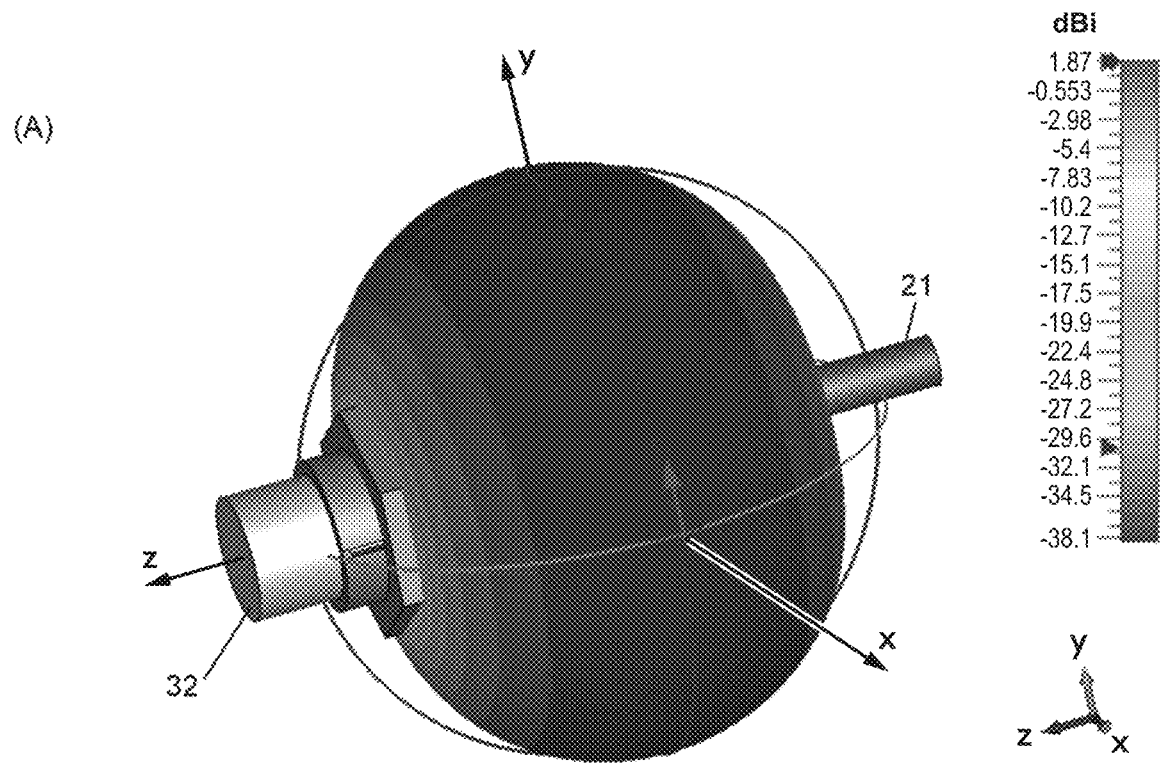
FIG. 9 is an example of a diagram illustrating radiations of two different types of antennas in the three-dimensional space.
Figure 9:
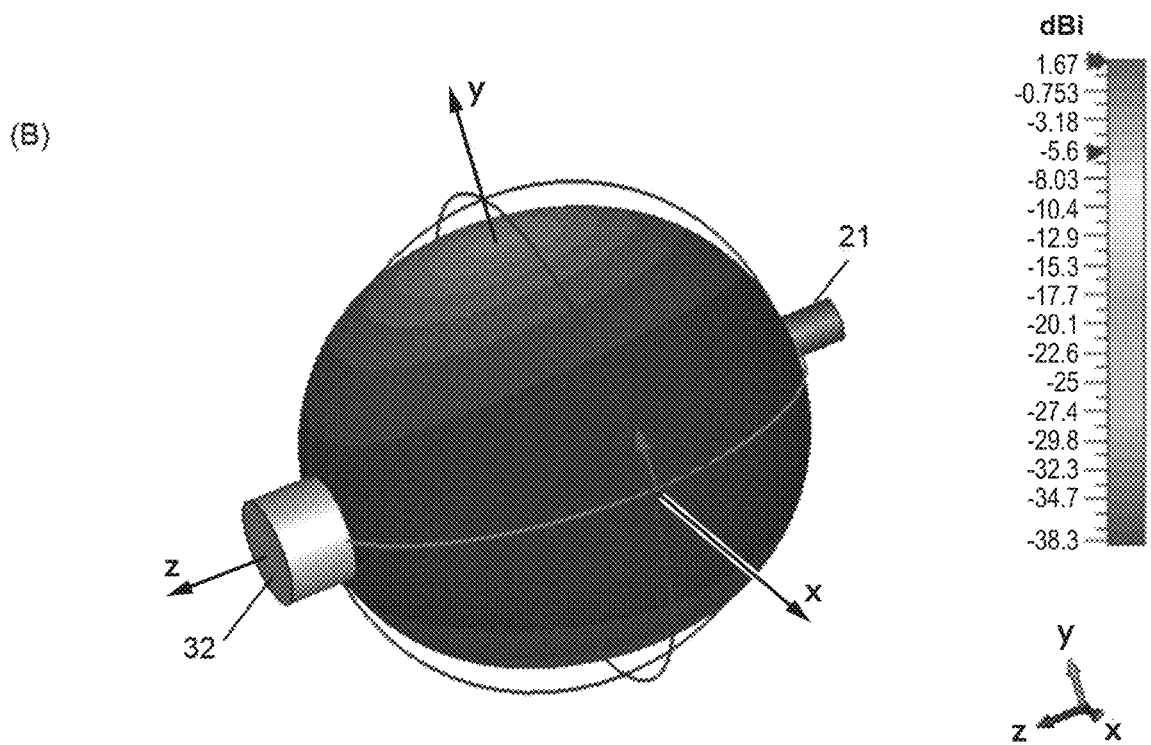

With referring to FIG. 9, the simulation results of the power-receiving conditions of respective antennas 21, 22 in the three-dimensional space are illustrated, based on the configuration illustrated in FIG. 8. In FIG. 9 (A), the directivity of the dipole antenna 21 is illustrated, and in FIG. 9 (B), the directivity of the slot antenna 22 is illustrated. In each figure, it is illustrated that as the color becomes darker, the intensity of the directivity of each antenna 21, 22 becomes stronger.

As can be seen from FIG. 9, similar to the case illustrated in FIG. 6, an area of the slot antenna 22 where the directivity of the antenna is decreased may be complemented by an area of the dipole antenna 21 where the directivity of the antenna is increased. Also, an area of the dipole antenna 21 where the directivity of the antenna is decreased may be complemented by an area of the slot antenna 22 where the directivity of the antenna is increased. Accordingly, the two antennas 21, 22 of different types are configured to complement each other to cover areas where their directivities are weakened. As a result, the antennas 21, 22 are constituted to be capable of receiving electric power in almost all directions without particularly showing a lack of directivity, as a whole.

As described above, the verification is conducted by performing simulations for the omnidirectional antenna which is usable as a factory antenna utilizing the radiation characteristics of the dipole antenna 21 and the slot antenna 22. As a result, although the respective antennas 21, 22 are arranged in the same direction (along the longitudinal direction of the proximity sensor), it is confirmed that these radiation patterns are formed in shapes extending in directions orthogonal with each other at 90 degrees. Therefore, the present example is capable of forming an omnidirectional antenna by using the existing shape of the conventional sensor 30 as it is.

Figure 10:
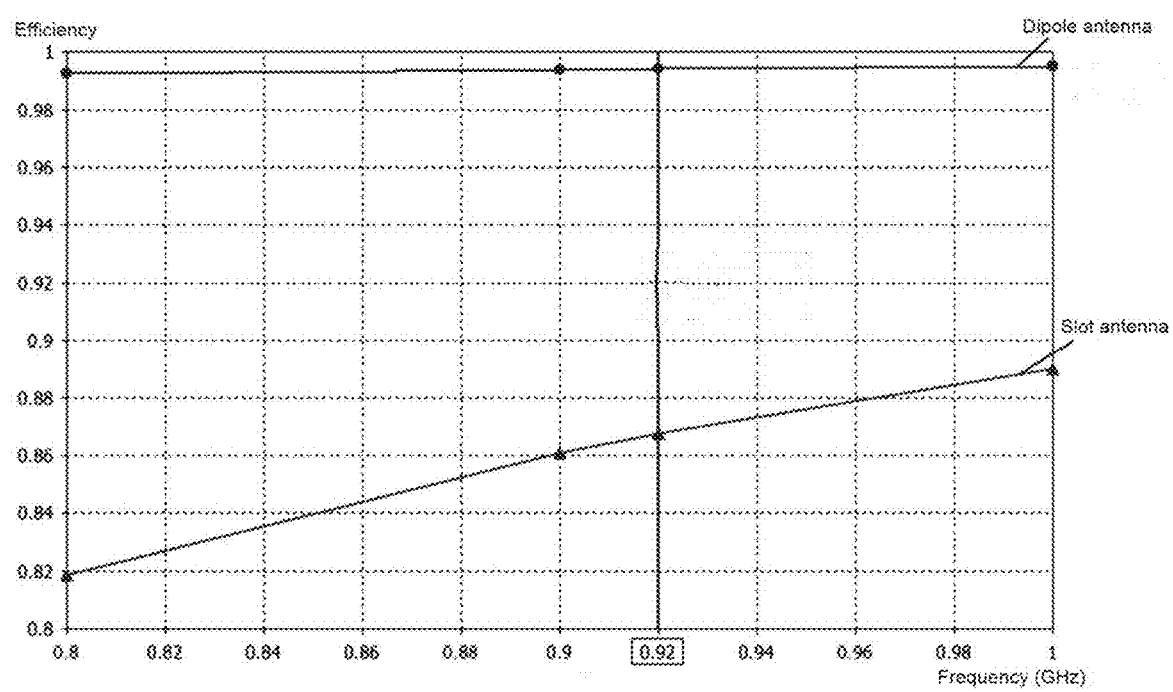
FIG. 10 is an example of a diagram illustrating efficiencies of two different types of antennas.

With referring to FIG. 10, the simulation results of the power-receiving device 20 illustrated in FIG. 8 are illustrated. In this figure, values of frequencies (GHz) are depicted on the horizontal axis, and values of efficiencies of the antennas 21, 22 are depicted on the vertical axis (supposing that efficiency of the perfect (ideal) antenna is 100%). As can be seen from the figure, it is verified that the dipole antenna 21 may have a high efficiency of about 99% and the slot antenna 22 may have a high efficiency of about 86%, when the frequency is varied in a range from 0.8 GHz to 1.0 GHz. Therefore, it is verified that the configuration using the combination of the slot antenna 21 and the dipole antenna 22 illustrated in FIG. 8 is particularly preferable.

The explanation is given about the power-receiving device 20 including the antennas 21, 22 which is configured by using the existing shape of the device housing 31 of the conventional proximity sensor 30 as it is. The application of the power-receiving device 20 is not limited to the proximity sensor, but is applicable to other types of devices (including sensors and actuators) 30.

In addition, it is possible to provide only one of the antennas 21, 22 in the example illustrated in FIG. 8, as illustrated in FIG. 5 (A), (B).

When energy E is transmitted from the power-transmitting device 10 to the power-receiving device 20, the power-receiving efficiency of the power-receiving device 20 is lowered comparing to the case when energy is transmitted by wire, as being known to those skilled in the art. For example, when performing wireless power supply, only about 0.4% of power may be received at 1 m destination, in a space.

Hereinafter, with referring to FIGS. 11 to 14, a means for improving the power-receiving efficiency of the power-receiving device 20 will be described when it is used.

Figure 11:
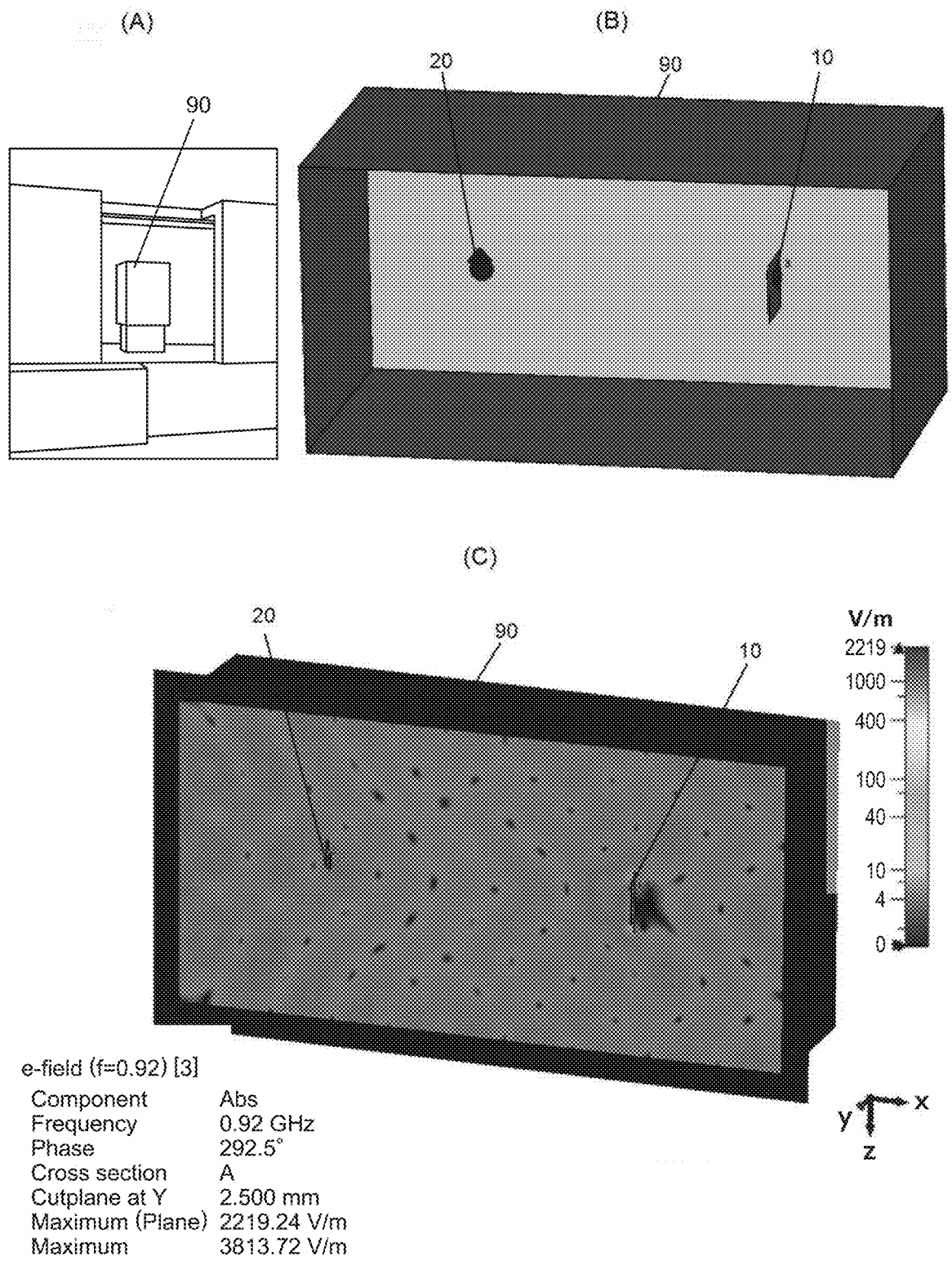
FIG. 11 is an example of a diagram illustrating a means for increasing the efficiency of the power-receiving device by using a closed space.

With referring to FIG. 11 (B), it is exemplified that the power-transmitting device 10 and the power-receiving device 20 are separated from each other and are accommodated in a chamber (or a box) 90 that defines a closed space of a rectangular parallelepiped shape.

The chamber 90 is used to confine the power-transmitting device 10 and the power-receiving device 20 in a enclosed space defined in the chamber 90. Accordingly, the efficiency of wirelessly transmitting energy E between the two devices is improved.

Although not shown in the figure, the chamber 90 is capable of accommodating all or a part of the machine 100 illustrated in FIG. 1.

In FIG. 11 (B), it is illustrated that the chamber 90 has a rectangular parallelepiped shape or a polygonal shape, but the shape thereof may be variously changed according to the embodiment. For example, one or a plurality of corners of the chamber 90 may not be configured at right angles, and chamfering or the like may be performed thereto. Therefore, the number of side surfaces of the chamber 90 is not limited to six. Further, the shape of each side surface of the chamber 90 is not limited to a quadrangle.

With referring to FIG. 11 (C), the simulation results of the movement of electromagnetic waves in the chamber 90 illustrated in FIG. 11 (B) are illustrated. With referring to FIG. 11 (A), the situation at that time is illustrated.

As illustrated in FIG. 11 (C), the electromagnetic waves transmitted in the chamber 90 are reflected on each side surface defining the boundary of the chamber 90. Eventually, the electromagnetic waves are innumerably reflected in the enclosed space, and the energy is confined within the chamber 90. As a result, the power-receiving device 20 is capable of receiving energy transmitted from the power transmission device 10 from various directions. Therefore, the power-receiving device 20 is capable of receiving energy in a plurality of directions compared to the case where energy is received only from one direction without using the chamber 90 (see reference symbol E in FIG. 1 (A)).

Figure 12:
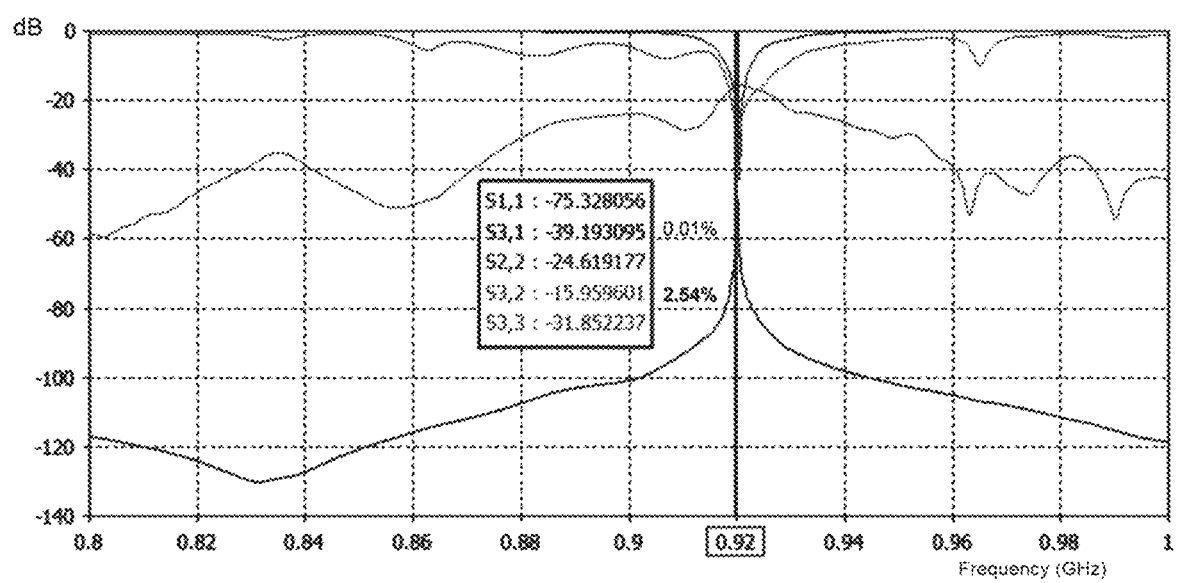
FIG. 12 is an example of a diagram illustrating efficiencies of FIG. 11.

With referring to FIG. 12, the simulation results of the chamber 90 illustrated in FIG. 11 are illustrated. In this figure, values of frequencies (GHz) are depicted on the horizontal axis, and values of efficiencies (dB) of the antennas are depicted on the vertical axis. During the course of the simulations, five parameters (see S1,1, S3,1, S2,2, S3,2, and S3,3 in FIG. 14) are taken and the magnitudes are given in dB. According to the simulation results, it can be seen that, it is possible to enhance the performance at least five times when the wireless power supply is performed in the chamber 90. Further, it is also confirmed that, in general, it is possible to enhance the performance nearly six times when the wireless power supply is performed in the chamber 90.

It is possible to confine energy by using the chamber 90. In addition, the present example is provided with a means for concentrating energy toward the power-receiving device 20.

Figure 13:
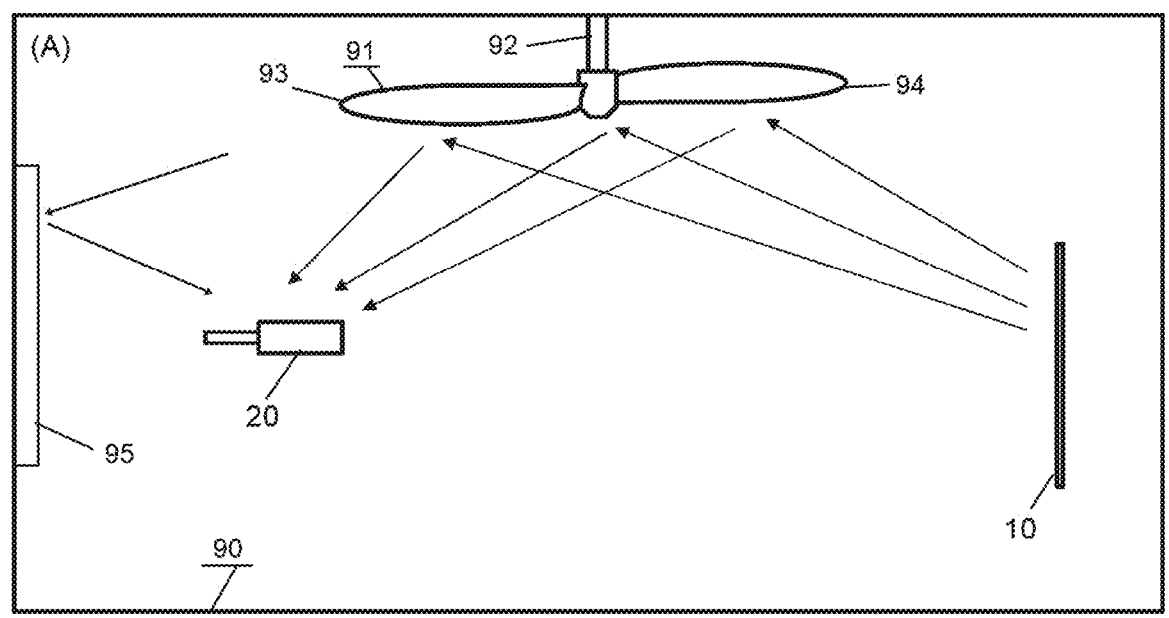
FIG. 13 is an example of a diagram illustrating a means for increasing the efficiency of the power-receiving device by using a closed space and a reflective surface.
Figure 13:
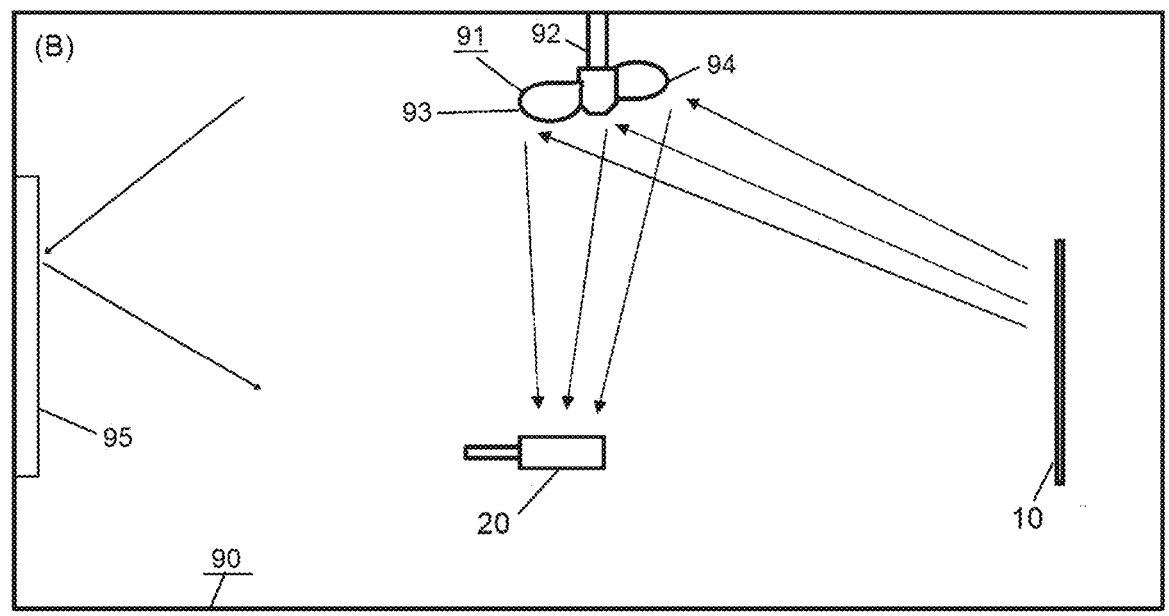

With referring to FIG. 13 (A), (B), it is exemplified that a stirring fan 91 is installed at a ceiling portion of the chamber 90 as a means for reflecting electromagnetic waves. The stirring fan 91 is configured to have a pair of reflecting surfaces 93, 94 which are provided to rotate about a rotation shaft 92 like a fan or a propeller. In this example, each of the pair of reflecting surfaces extends in the opposite directions each other along the longitudinal direction so as to extend linearly as a whole. However, the number, the size, the shape, and the angle, etc., of the reflecting surfaces 93, 94 may be varied depending on the embodiment.

As illustrated in FIG. 13 (A), the stirring fan 91 is capable of reflecting electromagnetic waves which are escaped to the ceiling upward from the lower portion of the chamber 90 at the surfaces of the reflecting surfaces 93, 94 so as to transmit the energy to the lower portion again. Accordingly, the power-receiving device 20 is capable of receiving the energy directly transmitted from the power-transmitting device 10, the energy transmitted by being reflected at the walls of the chamber 90, and the energy transmitted by being reflected from the stirring fan 91.

The reflecting surfaces 93, 94 are configured as moveable parts so that the surfaces 93, 94 are capable of following changes in positions of the power-receiving device 20. For example, as illustrated in FIG. 13 (A), (B), the pair of the reflecting surfaces 93, 94 may rotate about the central rotation axis 92 so as to change the relative position of the stirring fan 91 with respect to the chamber 90.

Therefore, as illustrated in FIG. 1 (A), when the power-receiving device 20 changes the relative position with respect to the power-transmitting device 10, the stirring fan 91 is capable of rotating in accordance with changes in positions, thereby changing the positions of the reflecting surfaces 93, 94. As a result, the power-receiving device 20 is capable of constantly receiving energy with high efficiency following changes in positions of the power-receiving device 20.

For example, as illustrated in FIG. 13 (A), in a case when the pair of the reflecting surfaces 93, 94 extend substantially straight along the longitudinal direction of the chamber 90, it becomes possible to reflect and transmit the energy which is escaped upward from the power transmission device 10 further in the longitudinal direction (along the long axis direction of the power transmission device 10). For this reason, when the rectilinearity of energy is required at the time of being transmitted, this case is preferable.

In addition, as illustrated in FIG. 13 (B), when the pair of the reflecting surfaces 93, 94 extend in a substantially intersecting direction to the longitudinal direction of the chamber 90, it becomes possible to reflect and transmit the energy which is escaped upward from the power transmission device 10 to a direction (along the short axis direction or the lateral direction of the power transmission device 10) intersecting the longitudinal direction.

Further, the pair of the reflecting surfaces 93, 94 is capable of being rotated about the central rotation axis 92 to variously adjust the position and the direction for reflecting the energy.

With referring to FIG. 13 (A), (B), it can be seen that a fixed reflective surface(s) 95 may be further provided on a side surface(s) of the chamber 90.

As discussed above, each side surface of the chamber 90 is capable of reflecting electromagnetic waves. The reflecting surface 95 is configured to reflect electromagnetic waves with a reflectance which is different from that of the side surface of the chamber 90. By changing the reflective efficiency of each side surface of the chamber 90, it becomes possible to reflect electromagnetic waves so as to be more concentrated toward the power-receiving device 20 in the chamber 90. For example, the reflective surface 95 may be configured as a metasurface (meta-surface). In this way, the reflective surface may be used in order to maximize electric power to be received by the power-receiving device when performing wireless power supply over an intermediate distance or a long distance.

Figure 14:
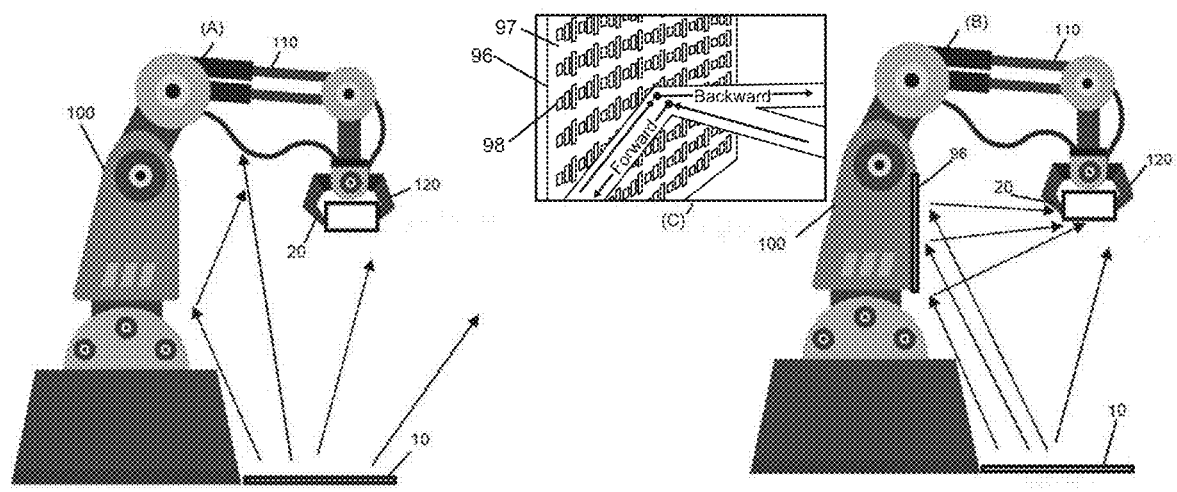
FIG. 14 is an example of a diagram illustrating a means for increasing the efficiency of the power-receiving device by using a metasurface.

With referring to FIG. 14, it is illustrated that a metasurface 96 is provided on a side surface of the machine 100 as a fixed reflective surface.

In a case of the machine (or robot) 100 used in FA (see FIG. 1), the robot arm unit 110, the robot hand unit 120, and the main body, etc., of the robot 100, are made of metallic material. Accordingly, a plurality of reflected waves (or reflecting surfaces) may exist around the robot 100. Therefore, as illustrated in FIG. 14 (A), it is possible to reflect electromagnetic waves toward the power-receiving device 20 by using the reflected waves.

In addition, as illustrated in FIG. 14 (B), it is possible to further provide a metasurface 96 on a side surface of the machine 100. Accordingly, electromagnetic waves may be further concentrated toward the power-receiving device 20. As illustrated in FIG. 14 (C), the metasurface 96 is configured by arranging a plurality of small elements 98 on a substrate 97. Each element 98 is defined in the shape and the arrangement to have a suitable reflective efficiency. Accordingly, the metasurface 96 is capable of reflecting electromagnetic waves and collecting them toward the power-receiving device 20. As a result, it becomes possible to more efficiently transmit energy which is transmitted from the power-transmitting device 10 to the power-receiving device 20.

As described above, the power-receiving device 20 of the present example is configured to form an omnidirectional antenna by using the existing shape of the conventional device (which may be a sensor or an actuator) 30 as it is. It is possible to improve the power-receiving efficiency of the power-receiving device 20 by using the chamber 90 when performing wireless power supply. In addition, the stirring fan 91 may be provided in the chamber 90 when the electromagnetic fields are required to be uniform. In addition, the metasurface (s) 95 and/or 96 may be provided on a side surface of the chamber 90 and/or a main body of the robot 100 used in FA, in order to more efficiently improve the receiving efficiency of the power-receiving device 20.

Figure 15:
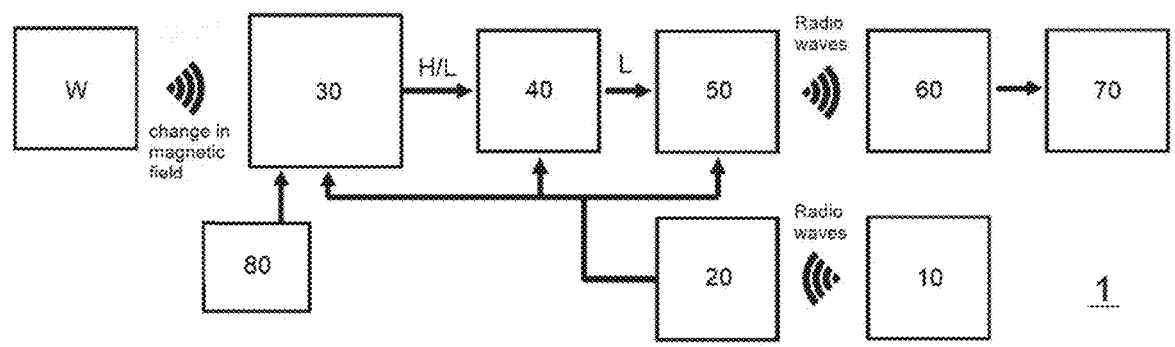
FIG. 15 is an example of a diagram illustrating a modified power-receiving device.

With referring to FIG. 15, a modification of the power-receiving system 1 illustrated in FIG. 1 (B) is exemplified. The system 1 exemplified in the figure is configured to include the power-receiving device 20 for wirelessly receiving energy transmitted from the power-transmitting device 10, the device (for example, a proximity sensor) 30 to which electric power is supplied from the power-receiving device 20, the device 40 for adjusting the output of the device 30 (for example, the periodic filter), and the controller 50.

The proximity sensor 30 is configured to generate signals when it recognizes positions of an object W according to changes in magnetic fields. In the low power mode, periodic signals (H/L) are generated, as described above. However, signals (L) similar to those in the normal power mode may be obtained by passing periodic signals through the periodic filter 40. Accordingly, by generating the signals, the controller 50 is allowed to use the output results of the proximity sensor 30 without performing false recognition.

The controller 50 is configured to have a microcomputer and a wireless communication function. The controller 50 is capable of transmitting signals which are sent from the proximity sensor 30 to an external controller 60 so as to be used for controlling a machine tool 70. The machine tool 70 may be all or a part of the machine 100. Alternatively, the machine tool 70 may be another machine.

As described above, the device 30 is made to be functioned by being supplied with energy by performing wireless power supply. Accordingly, in a case when data transmission of the device 30 is also made to be functioned by being supplied with energy by performing wireless power supply, the device 30 will be fully functional.

For example, as illustrated in FIG. 3 (B) and FIG. 4 (B), it is possible to estimate that the proximity sensor 30 may be operated with electric power of about 6 mW, and data transmission thereof may be operated with electric power of about 1 mW. Therefore, in a case when energy of about 7 mW is supplied to the proximity sensor 30 from the power-receiving device 20, by performing wireless power supply, the device may be fully functional. When performing wireless power supply based on the microwave system, it is possible to supply electric power of about 10 mV to a target through a distance of one meter. Therefore, it is possible to fully function the device 30 by performing wireless power supply. The above is also applicable to another sensor or actuator that is different from the proximity sensor 30.

As illustrated in FIG. 1 (B), the power-receiving device 20 may supply electric power to only the device 30. Alternatively, as illustrated in FIG. 15, the power-receiving device 20 may supply electric power to the periodic filter 40 and the controller 50 in addition to the device 30.

Additionally, one or a plurality of power sources may be provided to the power-receiving system 1. For example, as illustrated in FIG. 15, it is possible to combine an oscillation power generation element 80 with the proximity sensor 30 in order to secure the power supply voltage of the proximity sensor 30 at least.

Various modifications may be made to the power-receiving system 1 illustrated in FIGS. 1 (B), 15. In these figures, the periodic filter 40 is included in order to fully function the device 30 by performing wireless power supply, without requiring a new development of a proximity sensor. However, the periodic filter 40 may be dispensed according to the embodiment of the device to be powered.

In addition, it is known that, for example, as illustrated in FIG. 4 (B), the constant of the filter depends on the supplied voltage (which is substantially equal to the received electric power) of the proximity sensor 30. Accordingly, it is possible to expand the power-receiving system 1 illustrated in FIGS. 1 (B), 15 so as to feed forward the information to the periodic filter 40 or the controller 50.

Example 2

As described above, with referring to FIGS. 5 to 10, the power-receiving device 20 is configured to utilize the radiation characteristics of the dipole antenna 21 and/or the slot antenna 22. However, the power-receiving device 20 is not limited to this example.

Hereinafter, with referring to FIGS. 16 to 20, other examples of the power-receiving device 20 illustrated in FIGS. 5 to 10 will be described. In the examples, the power-receiving device 20 is at least one of a dipole antenna, a slot antenna, a monopole antenna, a chip antenna and an inverted-F antenna.

Figure 16:
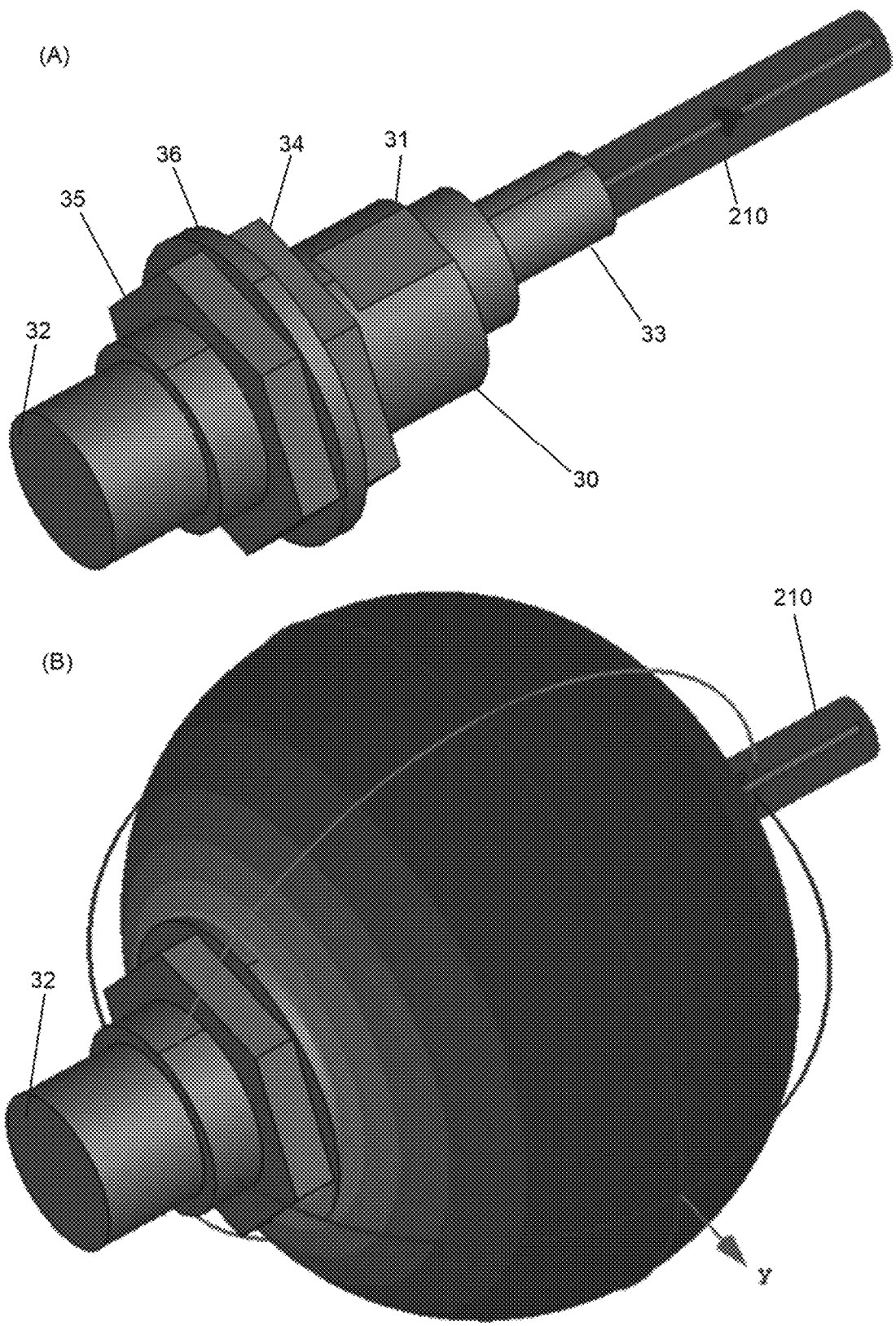
FIG. 16 is an example of a diagram illustrating a modified power-receiving device.

With referring to FIG. 16 (A), a perspective view is illustrated in which a short dipole antenna 210 is provided as the power-receiving device 20 on the device housing 31 of the device (for example, proximity sensor) 30.

Depending on the mounting place of the device, it is not desirable to extend the dipole antenna 210 to project significantly outward from the device housing 31. Therefore, in the example of FIG. 16 (A), the dipole antenna 210 is provided with a relatively short length so as to suppress a portion protruding from the device housing 31. As described above, the dipole antenna 210 may be configured by using the connector 33 of the conventional proximity sensor 30.

In the example of FIG. 16 (A), as a difference from the example illustrated in FIG. 8, a slot antenna is not provided on the device housing 31. Accordingly, the device housing 31 is configured to be completely sealed, and therefore, when the device housing is applied to the machine 100 in FA etc., the surrounding oil or the like is completely prevented from entering the device housing 31.

With referring to FIG. 16 (B), the simulation results of the above-mentioned dipole antenna 210 having a shorter length (see FIG. 16 (A)) are illustrated. As can be seen from the figure, it is possible to obtain the almost same directivity of the antenna, as in the case of FIG. 9 (A), even when the length of the dipole antenna 210 is kept relatively short.

Figure 17:
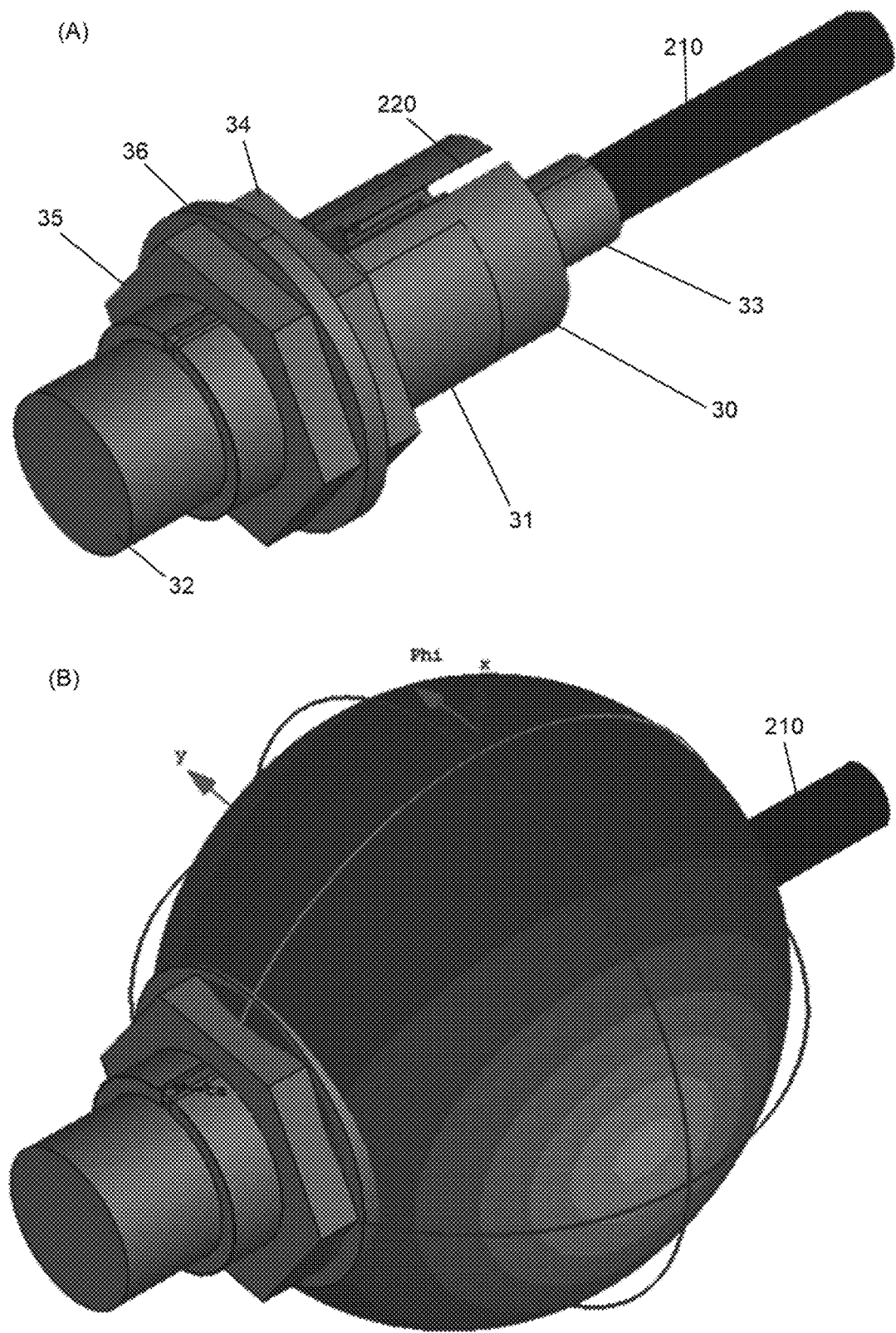
FIG. 17 is an example of a diagram illustrating a modified power-receiving device.

With referring to FIG. 17 (A), a perspective view is illustrated in which a slot antenna 220 is formed as the power-receiving device 20 on the device housing 31 of the proximity sensor 30. In this figure, the portion that is completely blackened corresponds to the dipole antenna 210 illustrated in FIG. 16 (A), and this portion is provided to compare the position and the size of the antenna illustrated in FIG. 17 (A) with those of the antenna illustrated in FIG. 16 (A).

As is known to those skilled in the art, the device housing 31 of the proximity sensor 30 may be variously configured by the manufacturers. In the present example, the slot antenna 220 is formed by using an existing device housing 31 of the conventional proximity sensor 30 as it is. However, it is also possible to design a new device housing 31 having a slot, instead.

For example, in the example illustrated in FIG. 8, there is a step (see reference numeral 38 in FIG. 8) in the device housing 31. Accordingly, the length of a slot that is horizontally drilled on the device housing 31 may be limited.

In the example of FIG. 17 (A), as a difference from the example illustrated in FIG. 8, a relatively large device housing 31 is provided without having a step (see reference numeral 38 in FIG. 8), so that the device housing 31 is allowed to extend straight in the horizontal direction. Accordingly, it becomes possible to drill a slot having a sufficient length in the longitudinal direction. For example, a slot of any length up to about 70%, up to about 80%, up to about 90%, or up to about 100% may be drilled with regard to the entire longitudinal length of the device housing 31 (which is measured from one end of the side 34 to the other end of the side 33 of the body 31).

When a slot is formed on the device housing 31, it is possible to cover a coil, a circuit, or the like provided in the device housing with a metal or a resin in order to protect the internal coil, the circuit, or the like from the intrusion of oil.

With referring to FIG. 17 (B), the simulation results of the above-mentioned slot antenna 220 (see FIG. 17 (A)) are illustrated. As can be seen from the figure, it is possible to obtain the almost same directivity of the antenna, as in the case of FIG. 9 (B), even when the length of the slot antenna 220 is made to be large.

Comparing the cases of FIG. 16 (B) and FIG. 17 (B), it is confirmed that the directivity of the dipole antenna 210 and that of the slot antenna 220 cross each other. This is the same as the cases illustrated in FIG. 6 (A), (B) and FIG. 9 (A), (B).

Figure 18:
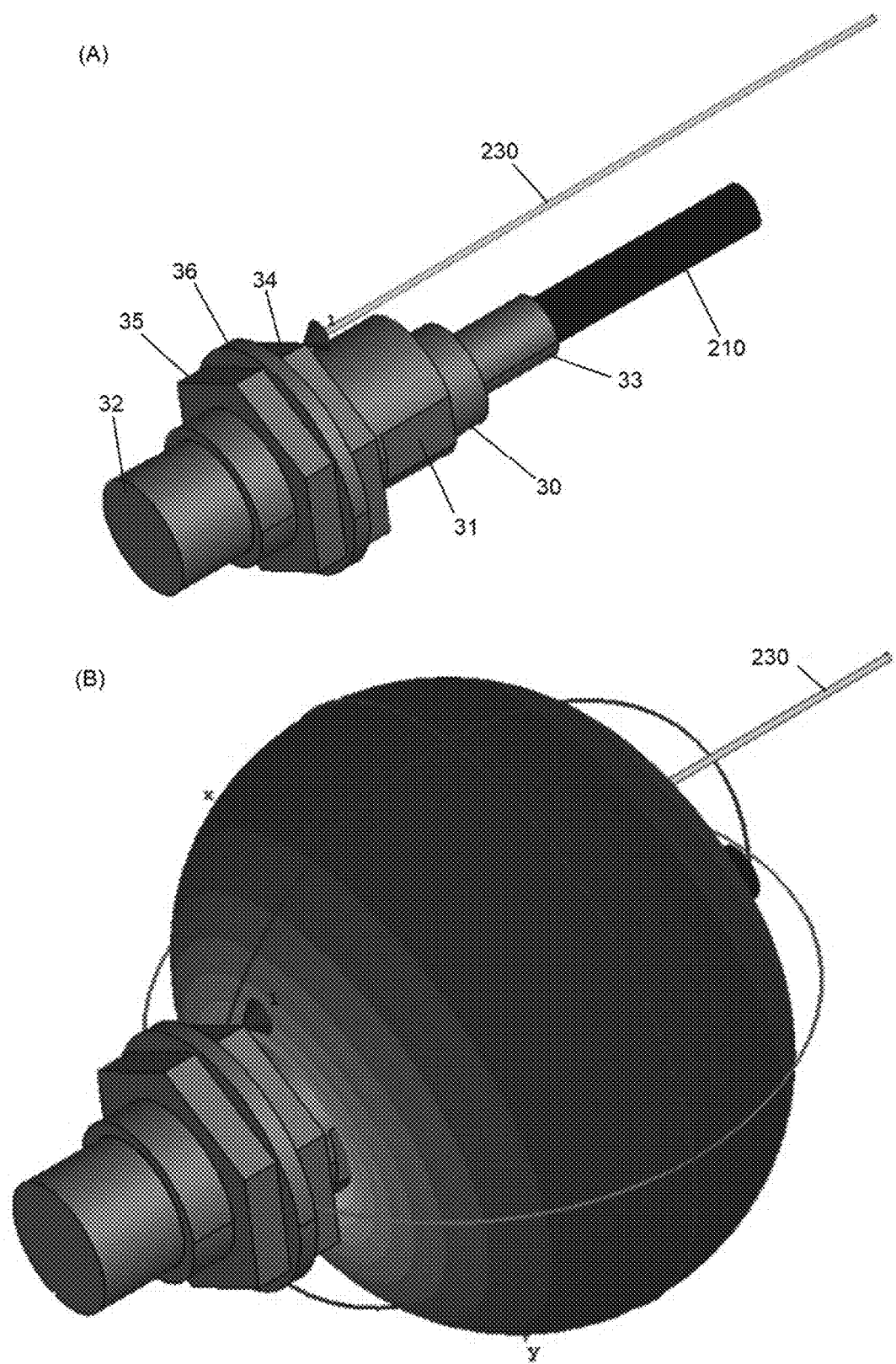
FIG. 18 is an example of a diagram illustrating a modified power-receiving device.

With referring to FIG. 18 (A), a perspective view is illustrated in which a monopole antenna 230 is provided as the power-receiving device 20 on the device housing 31 of the proximity sensor 30. In this figure, the portion that is completely blackened corresponds to the dipole antenna 210 illustrated in FIG. 16 (A), and this portion is provided to compare the position and the size of the antenna illustrated in FIG. 18 (A) with those of the antenna illustrated in FIG. 16 (A). The monopole antenna 230 is also referred to as a rod antenna, and is configured to be smaller in diameter and longer in length in comparison with the dipole antenna 210.

In order to ensure the power-receiving efficiency of the monopole antenna 230, it is necessary to secure the length thereof, and therefore, in the present example, one end portion of the monopole antenna 230 is mounted on the device housing 31 in the vicinity of the nuts 34, 35 and the washer 36 for fastening and fixing the device housing 31, and the other end portion of the monopole antenna 230 is extended straight in the opposite direction. By aligning the extending direction of the device housing 31 and the extending direction of the monopole antenna 230, the overall size is suppressed from becoming bulky, as a whole.

With referring to FIG. 18 (B), the simulation results of the above-mentioned monopole antenna 230 (see FIG. 18 (A)) are illustrated.

Comparing the cases of FIG. 16 (B) and FIG. 18 (B), it is confirmed that the directivity of the dipole antenna 210 and that of the monopole antenna 230 appear in the same direction. It is also confirmed that excellent directional characteristics may be obtained even when the monopole antenna 230 is used instead of the dipole antenna 210. In addition, comparing the case of FIG. 17 (B) and that of FIG. 18 (B), it is confirmed that the directivity of the monopole antenna 230 and that of the slot antenna 220 cross each other.

Figure 19:
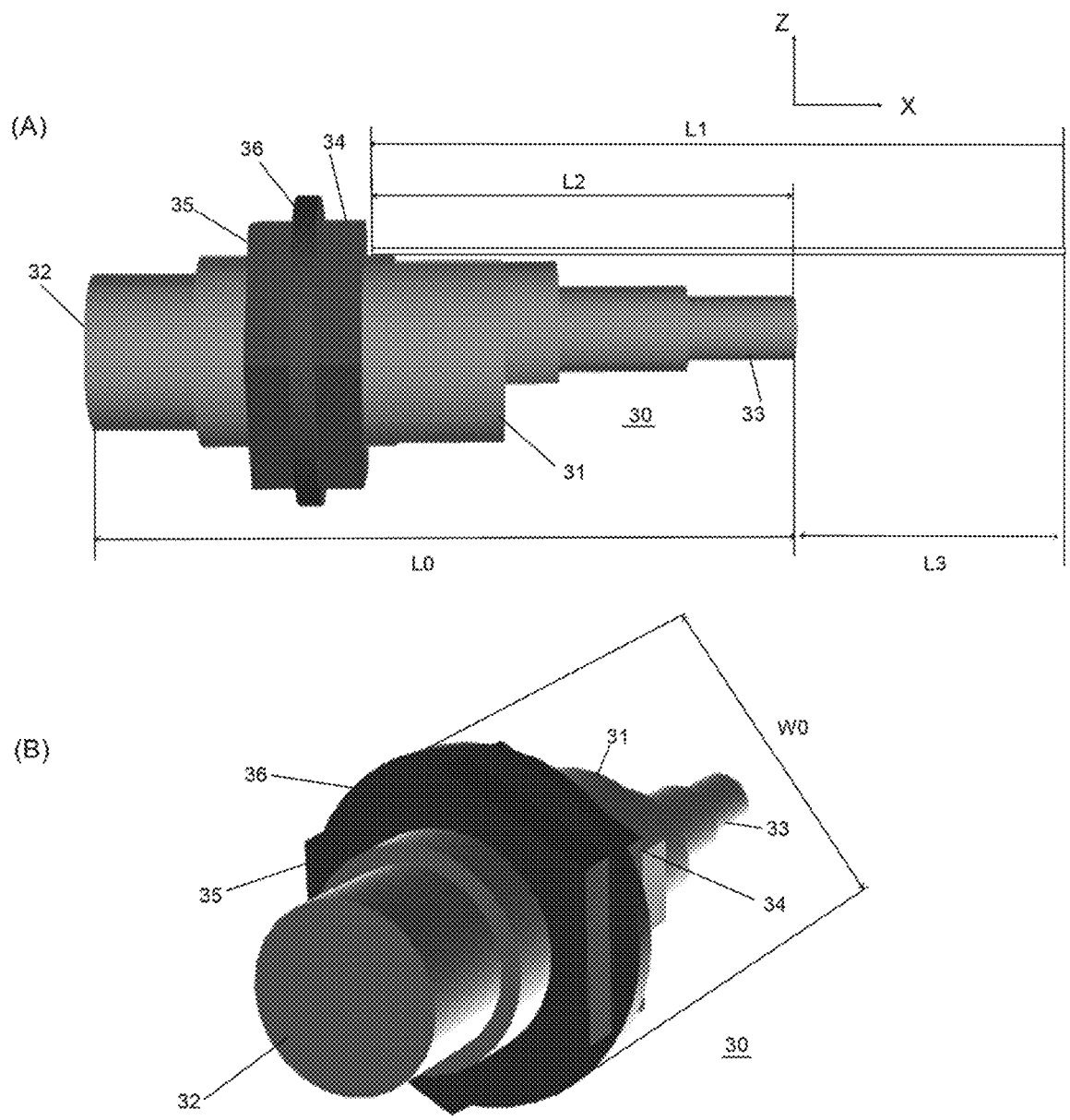
FIG. 19 is an example of a diagram illustrating a comparison of the conventional sensor and the modified example of FIG. 18.

With referring to FIG. 19, a comparison between the size of the conventional proximity sensor 30 illustrated in FIG. 2 (B) and the size of the monopole antenna 230 illustrated in FIG. 18 (A) is depicted.

As illustrated in FIG. 19 (A), the device housing 31 of the conventional proximity sensor 30 extends in the longitudinal direction, and it is supposed that the size thereof is made to be L0. The device housing 31 of the proximity sensor 30 has an enlarged diameter portion (see reference numerals 34, 35, and 36) for fastening and fixing on one end side, and also has a connector 33 on the other end side.

As illustrated in FIG. 19 (A), the monopole antenna 230 is provided close to the enlarged diameter portion for fastening and fixing, and is made to extend along the longitudinal direction of the device housing 31 toward the other end portion 33 in the same direction (or parallel to the longitudinal direction of the device housing 31). Consequently, the length L1 of the elongated monopole antenna 230 is able to be embedded in the longitudinal length L0 of the device housing 31 for the length L2 up to the end portion 33 of the device housing 31 which is opposed to the enlarged diameter portion for fastening and fixing. Accordingly, the size of the extending length L3 of the device housing 31 along one axial direction in the three-dimensional space due to adding of the monopole antenna 230 to the device housing 31 may be set not longer than 2 times of the length L0 at most. In another example, the size of the extending length L3 along one axial direction in the three-dimensional space may be set not longer than 1.5 times of the length L0 of the device housing at most. Further, it is possible to substantially suppress the size of the length L3 to zero by allowing the part of the length L1 to be foldable.

As illustrated in FIG. 19 (B), the monopole antenna 230 is completely accommodated in the original size of the device housing 31 in the width-direction W0 of the device housing 31. Therefore, there is no change in the size of the device housing 31 on the side of the working surface (or detection surface 32) of the sensor 30. On the other side of the sensor 30 opposite to the working surface, the length of the device housing 31 is extended, but the need for wiring (see FIG. 2 (C)) is eliminated. As a result, the problem of the space by providing the length L3 is substantially suppressed.

Therefore, the device housing 31 has a size in the three-dimensional space (in the X-axis direction, the Y-axis direction, and the Z-axis direction), and expansion of the size of the device housing 31 in the three-dimensional space due to the provision of the monopole antenna 230 is substantially limited to one axis direction (X-axis direction) at most.

Figure 20:
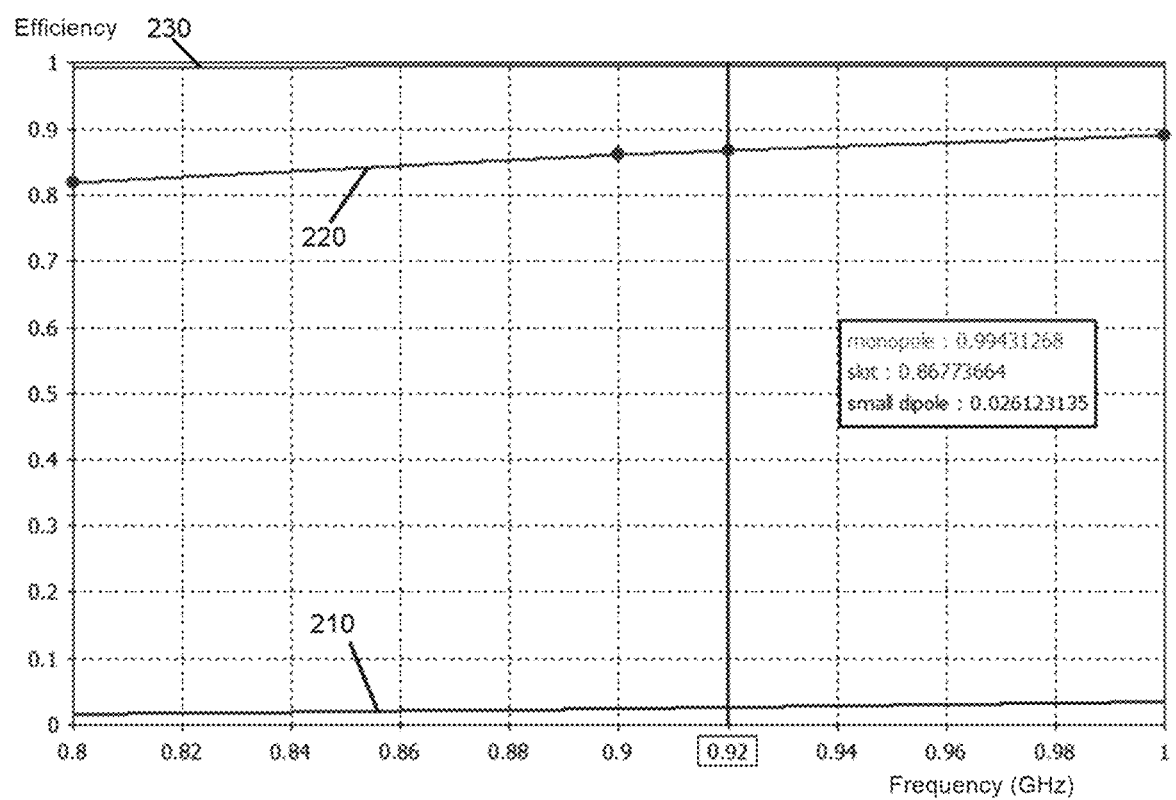
FIG. 20 is an example of a diagram illustrating efficiencies of three different types of antennas.

With referring to FIG. 20, for the three types of modified examples illustrated in FIGS. 16 to 19, the power-receiving efficiencies of these antennas are illustrated, respectively. As can be seen from the figure, when only the dipole antenna 210 having a relatively short length is provided, the power-receiving efficiency is the lowest. Also, when the slot antenna 220 is provided, the power-receiving efficiency exceeds 80% (although it does not reach 90%), and it is found that relatively good power-receiving efficiency may be obtained. Further, when the monopole antenna 230 is provided, the power-receiving efficiency is greatly increased, and it is found that an ideal value close to 100% may be obtained.

When the proximity sensor 30 is attached in a movable member such as the robot hand unit 120, the position and the direction of the power-receiving antenna may be changed variously. In order to maintain the power supplying condition of the proximity sensor 30 satisfactorily in the three-dimensional space, it is desirable that the power-receiving device 20 is capable of maintaining good power-receiving efficiency in each of the six directions (for example, six directions of front-rear directions, left-right directions, and up-down directions) in the three-dimensional space.

It is found that when only the dipole antenna 210 having a shorter length is provided, good power-receiving efficiency may be obtained only by a relatively small angle, with respect to changes in rotation angles. However, it may exhibit relatively good stability in six directions, as a whole.

When the monopole antenna 230 is provided, the best power-receiving efficiency may be obtained (see FIG. 20). However, an elongated rod-shaped component is needed to be attached to the proximity sensor 30. Accordingly, the structure tends to be bulky as a whole. In particular, the monopole antenna 230 has a smaller diameter and a longer entire length as opposed to the case of the dipole antenna 210. Therefore, when it is used, it is necessary to secure a space so as not to be damaged by, for example, the elongated rod-shaped antenna portion being in contact with other components.

When the slot antenna 220 is provided, it is found that a much better power-receiving efficiency may be obtained as compared with the case of the dipole antenna 210 having a shorter length (see FIG. 20) although the power-receiving efficiency of the slot antenna 220 is not as excellent as that of the monopole antenna 230. In the case of the slot antenna 220, there is no need to protrude an additional component from the device housing 31 of the proximity sensor 30 as compared with the cases of the dipole antenna 210 and the monopole antenna 230. Accordingly, the slot antenna 220 offers the advantage of being the most compact structure as a whole, and of maintaining the original size of the device housing 31 of the conventional device 30 as it is.

Figure 31:
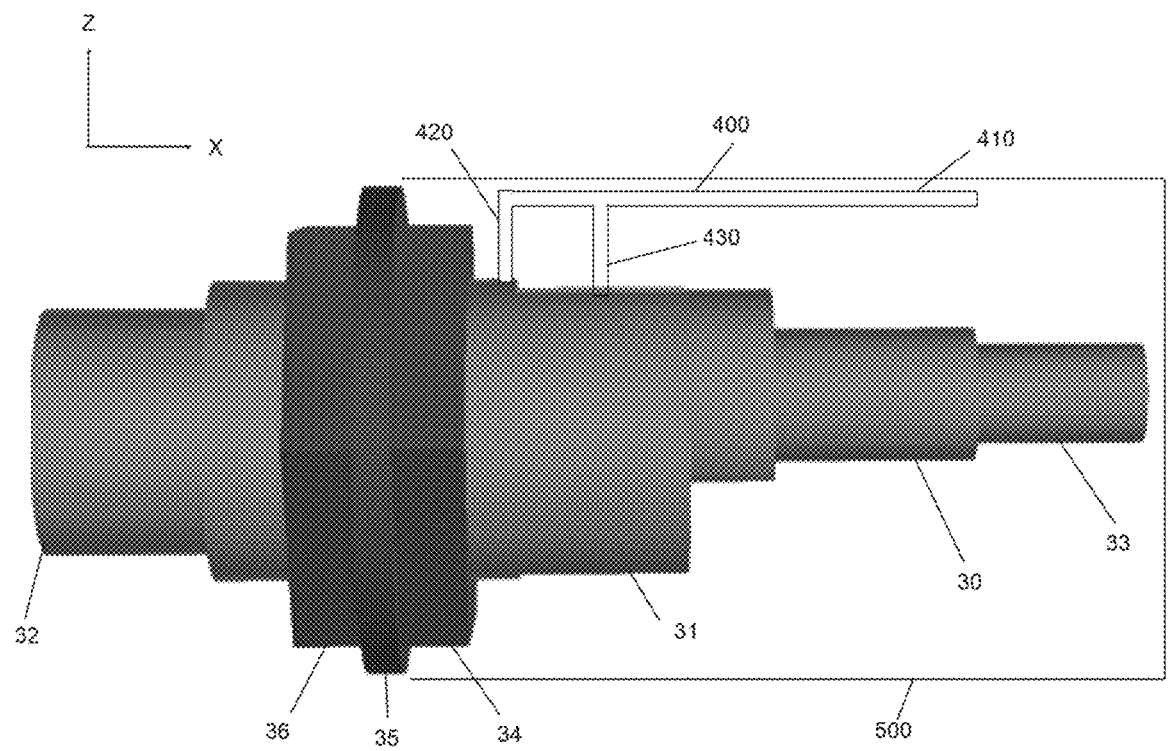
FIG. 31 is an example of a diagram illustrating a device housing which is provided with an inverted-F antenna.

Further, with referring to FIG. 31, another example is illustrated in which an inverted-F antenna 400 is provided as the power-receiving device 20 on the device housing 31 of the device (for example, proximity sensor) 30. As illustrated in the figure, the inverted-F antenna 400 is configured to have an elongated body portion 410, a shorting portion (or shorting point) 420, and a feed portion (or feed point) 430. The longitudinal direction (for example, along the X-axis direction) of the main body portion 410 is aligned with the longitudinal direction of the device housing 31 so that the projection from the device housing 31 due to the provision of the inverted-F antenna 400 is suppressed. The body portion 410 is able to contribute to matching and to radiating (for receiving electric power). It is possible to adjust the input impedance (for example, for increasing it) by making flow a relatively large current through a tip of the main body portion 410 and the shorting portion 420 while preventing a current flowing through the feed portion 430.

It is possible to attach the inverted-F antenna 400 to the device 30 without requiring a large space. For example, the inverted-F antenna 400 may be configured to be shorter compared to the simple monopole antenna 230 (see FIGS. 18, 19). In addition, the inverted-F antenna 400 may make it easier to control impedance matching. The inverted-F antenna 400 offers a large number of adjustment parameters in its configuration. Accordingly, it is possible to cope with various specifications by selecting its appropriate configuration.

For example, it is possible to adjust the separation or distance between the shorting portion 420 and the feed portion 430.

Also, it is possible to adjust the width or length of the shorting portion 420 and that of the feed portion 430.

Also, it is possible to exchange of the positions of the shorting portion 420 and the feed portion 430. In other words, it is possible to reverse the two (as the shorting portion 430 and the feed portion 420).

Also, it is possible to constitute the body portion 410 narrower (in an almost rod shape) and to adjust the length thereof.

Also, it is possible to provide a curved part in the body portion 410. For example, it is possible to form the body portion 410 in an approximately L-shape.

Also, it is possible to constitute the body portion 410 wider (in an almost plate shape) and to adjust the length thereof.

The power-receiving device 20 may include a slot antenna (see FIG. 17) that mainly generates magnetic fields and an inverted-F antenna (see FIG. 31) that mainly generates electric fields. The slot antenna and the inverted-F antenna may be aligned along the substantially same direction, and the slot antenna and the inverted-F antenna may constitute an omnidirectional antenna having two power-receiving patterns (or radiation patterns) substantially orthogonal to each other.

Further, instead of the dipole antenna, the slot antenna, the monopole antenna, and the inverted-F antenna illustrated in FIGS. 16 to 19 and 31, it is also possible to provide a chip antenna (not illustrated) having a planar or linear body to the device housing 31 of the device in the same manner. For example, a linear chip antenna may be considered similar to the above-mentioned monopole antenna.

In addition, in a case when the dipole antenna, the monopole antenna, the inverted-F antenna 400, or the chip antenna is provided to the device housing 31 of the device, a cover 500 for covering the elongated antenna portion may be provided in combination therewith (see FIG. 31). The cover 500 is capable of having an arbitrary size and/or shape in order to protect the antenna portion from being contacted with surrounding components or the like. The cover 500 may be configured to be detachable from the device housing 31 so as to be removed when the antenna is used.

Example 3

As stated above, the cases where at least one of a dipole antenna, a slot antenna, a monopole antenna, an inverted-F antenna, and/or a chip antenna is provided in a sensor are explained.

Hereinafter, a case where a slot antenna is provided in an actuator will be explained.

Figure 21:
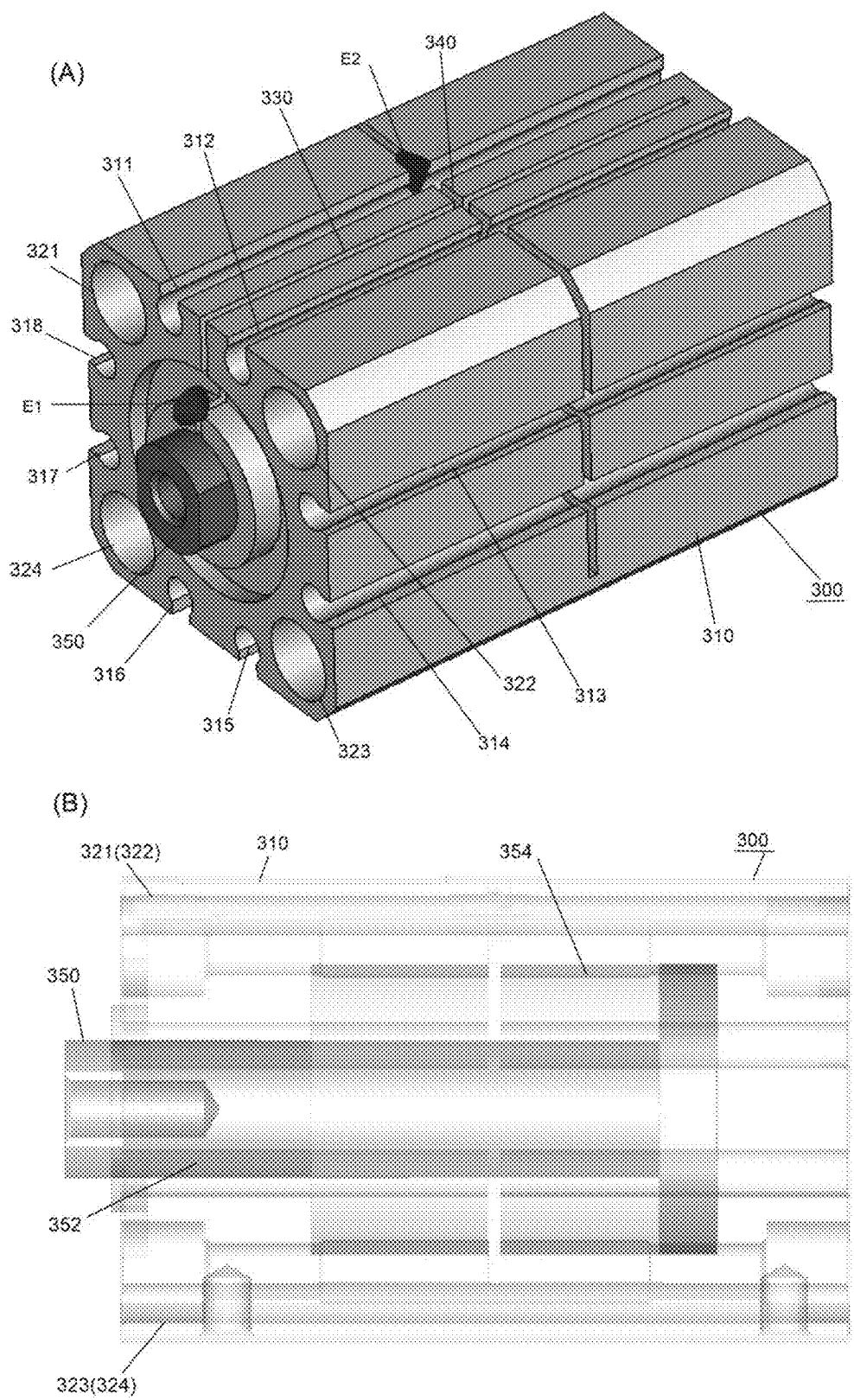
FIG. 21 is an example of a diagram illustrating an actuator having two different types of antennas

With referring to FIG. 21 (A), an actuator is exemplified as a device 30 to which electric power is supplied from the power-receiving device 20. The actuator 300 is a mechanical element that includes a mechanical and/or electrical circuit for converting electrical signals into physical movements. For example, the actuator 300 is configured to have a device housing 310 that constitutes a main body of a substantially rectangular. The device housing 310 extends in the longitudinal direction and defines a space therein to accommodate a working portion or movable portion 350 of the actuator 300. The working portion 350 is capable of performing movements such as expansion/contraction, bend/stretch, and/or rotation, by being operated by a physical device using a machine, oil pressure, air pressure, heat, or electromagnetic, etc.

With referring to FIG. 21 (B), a cross-sectional view of the actuator 300 is schematically illustrated. The working portion 350 that is accommodated in the device housing 310 is capable of electromagnetically functioning according to the input signal so as to protrude a moving portion 352 outward from the inside of the device housing 310 with respect to the fixed portion 354. The movements of an adjacent component (not shown) may be controlled by operations of protruding/retracting of the moving unit 352.

As illustrated in FIG. 21 (A), the actuator 300 has a rectangular parallelepiped device housing 310. It is possible to add one or a plurality of additional surfaces to the rectangular parallelepiped shape for dealing with its design and/or function. For example, a plurality of fixing grooves 311-318 extending along the longitudinal direction are provided by drilling on four side surfaces of the device housing 310. The grooves 311 to 318 may act in pairs with other protrusions (not shown) for fixing the device housing 310 at a predetermined position in order to prevent the occurrence of shifts in the operations of the working portion 350. In addition, arbitrary grooves or holes 321 to 324 may be provided by drilling on the side surface of the device housing 310 as appropriate, depending on the embodiment. Further, it is possible to process the device housing 310 in order to add surface treatment to one or a plurality of surfaces of the device housing 310 for releasing heat from the inside of the device housing 310 to the outside or to enhance the design quality thereof.

With referring to FIG. 21 (A), a first slot (notch) 330 extending in the longitudinal direction is formed in at least one of the four side surfaces of the device housing 310. A space is defined in the interior of the device housing 310 for accommodating the working portion 350 therein. The first slot 330 penetrates the wall of the device housing in the thickness direction and reaches the space along the depth direction. As a result, the first slot 330 is capable of functioning as a first slot antenna.

With referring to the same figure, a second slot (notch) 340 extending in a direction orthogonal to the longitudinal direction is formed in at least one of the four side surfaces of the device housing 310. The second slot 340 penetrates the wall of the device housing in the thickness direction and reaches the space along the depth direction. As a result, the second slot 340 is capable of functioning as a second slot antenna.

The second slot 340 may be provided as a bisector perpendicular to the first slot 330. Accordingly, the first slot 330 and the second slot 340 cross each other in a cross shape. By providing the two slot antennas 330 and 340 in this way, these antennas may become stronger with regard to its rotation as a whole.

The length, the position, and the number of the first slot 330 and those of the second slot 340 are determined in consideration of the radiation patterns of electromagnetic waves.

For example, with referring to FIG. 21 (A), the first slot 330 is provided to extend only in the upper side surface. However, the first slot 330 may further extend over four side surfaces of the upper side, the right side, the left side (not shown), and the lower side (not shown). Therefore, the number of the first slots 330 may be plural.

The second slot 340 is provided to extend over three side surfaces of the upper side, the right side, and the left side (not shown). However, the second slot 340 may further extend over four side surfaces of the upper side, the right side, the left side (not shown), and the lower side (not shown). Therefore, the number of the second slots 340 may be plural.

The first slot 330 and the second slot 340 each extend straight parallel to the side surfaces of the device housing 310 in order to facilitate machining of these slots 330, 340. However, in other examples, the first slot 330 and the second slot 340 may be provided to extend at an angle on any of the side surfaces of the device housing 310 for dealing with its design and/or function.

In addition, the first slot 330 and the second slot 340 are not completely separated from each other and partially intersect each other. However, in other examples, the two slots 330, 340 may be provided to be completely separated from each other.

Preferably, however, the first slot 330 and the second slot 340 are orthogonal to each other at an angle of 90 degrees.

Figure 22:
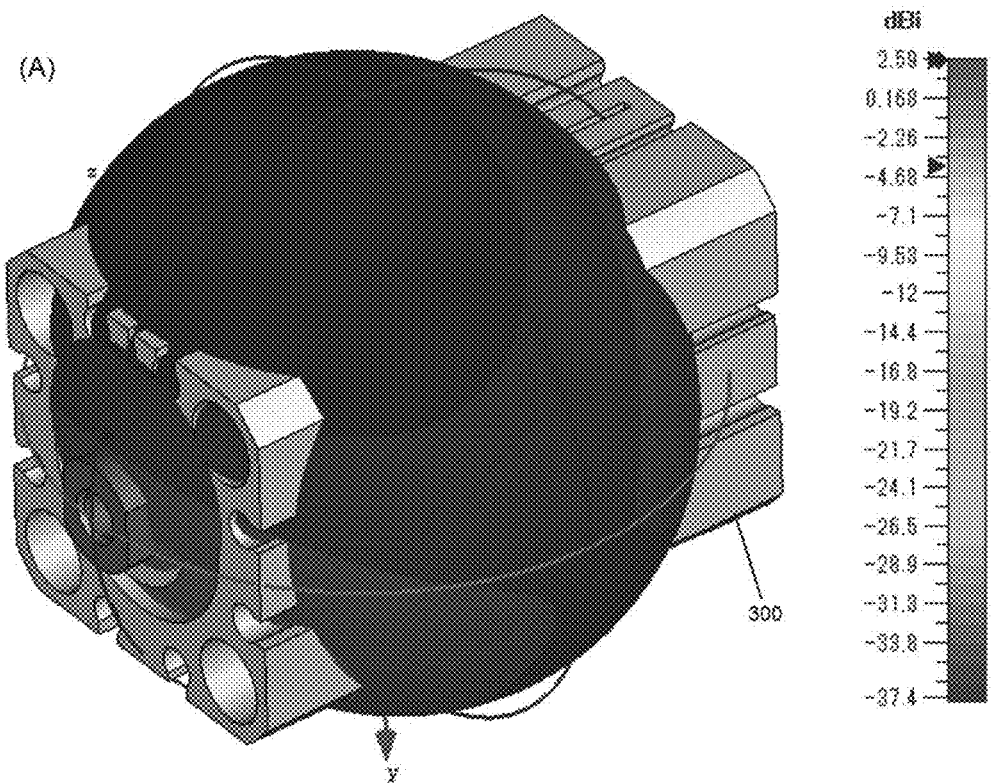
FIG. 22 is an example of a diagram illustrating radiations of two different types of antennas in the three-dimensional space.
Figure 22:
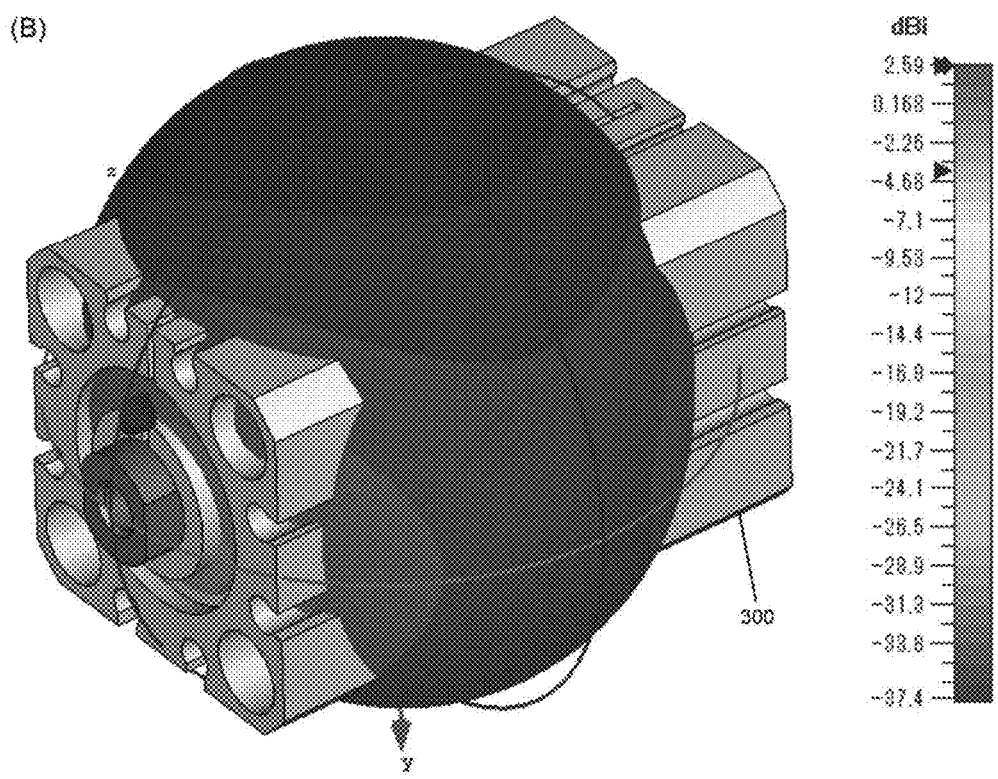
Figure 23:
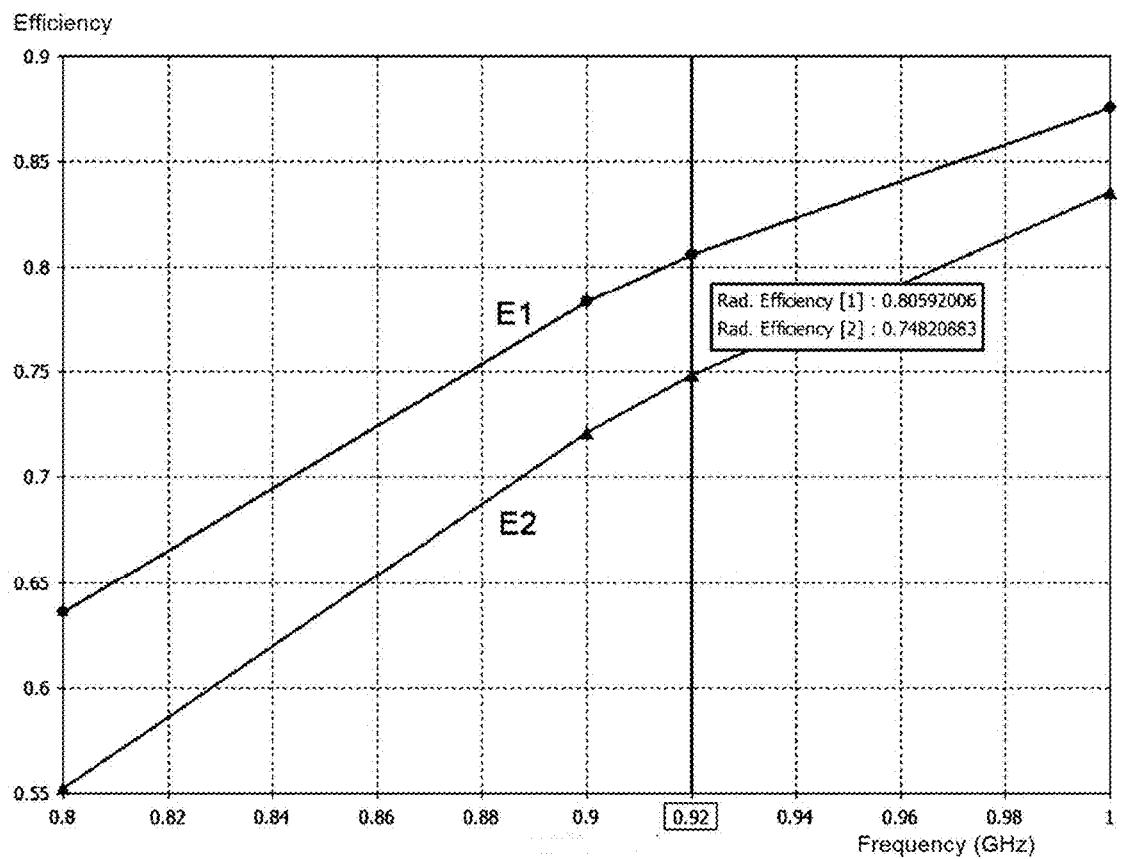
FIG. 23 is an example of a diagram illustrating efficiencies of two different types of antennas.

With referring to FIG. 23 (A), (B), the simulation results of electromagnetic fields of directivities of the two different slot antennas 330, 340 (see FIG. 22 (A)) in the three-dimensional space are illustrated. During the course of the simulation, it is supposed that electric power is supplied at positions E1, E2 in FIG. 21. As a result, it is verified that each of the antennas 330, 340 appears as an omnidirectional antenna. In addition, the strengths of the directivities of the antennas 330, 340 are shifted from each other. Therefore, by using the two antennas 330, 340 in combination, the directivities may be mutually complemented.

With referring to FIG. 23, the simulation results of radiation efficiencies of the two different slot antennas 330, 340 (see FIG. 21) are illustrated. During the course of the simulation, it is supposed that electric power is supplied at positions E1, E2 in FIG. 21. In general, it is verified that each of the antennas 330, 340 may have a high efficiency of 70% to 80%. For example, a high-efficiency of about 80% may be achieved at E1 and a high-efficiency of about 75% may be achieved at E2, at a frequency of 0.92 GHz, respectively.

Figure 24:
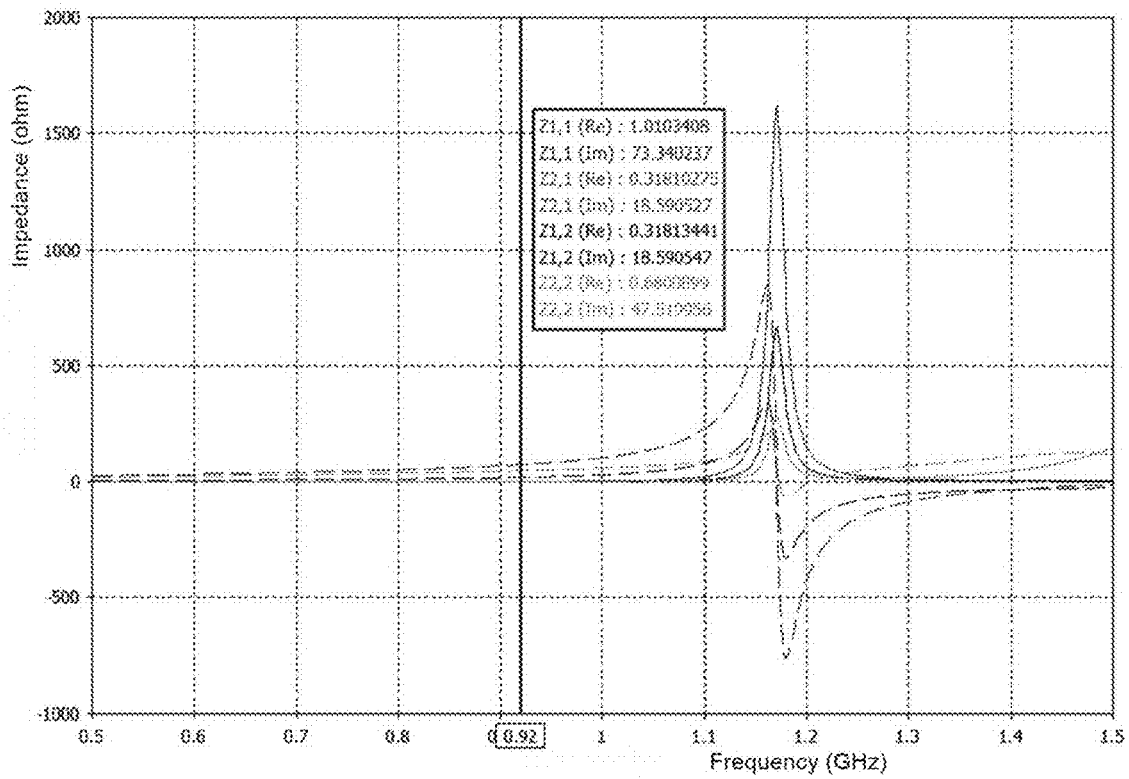
FIG. 24 is an example of a diagram illustrating changes in impedance of the power-receiving device of FIG. 20.

With referring to FIG. 24, the simulation results of impedance characteristics of the actuator 300 (see FIG. 21) are illustrated. In general, it is verified that good changes in impedance characteristics may be achieved by electric power received by the antenna 330, 340. For example, the impedance may be suppressed to a value close to 0Ω at a frequency of 0.92 GHz.

Therefore, omnidirectional antennas 330 and 340 may be obtained only by performing a drilling, cutting or boring process to the device housing 310 of the conventional actuator 300. At this time, another component is not additionally provided to protrude from the device housing 310 so that the mounting space of the conventional actuator 300 is not changed. In particular, there is no configuration change on the working surface side (working portion 350) of the actuator. Accordingly, the device of the present example may be used substantially in the same manner as the conventional actuator 300.

However, it is possible to additionally provide a monopole antenna, a dipole antenna, a chip antenna or an inverted-F antenna or the like on the device housing 310, in addition to the above-mentioned slot antennas 330, 340 or instead of the slot antennas 330, 340 in the example illustrated in FIG. 21.

Example 4

In the above-mentioned actuator 300 illustrated in FIGS. 21 to 24, the slot antennas 330, 340 are provided by boring slots on the device housing 310.

With referring to FIGS. 25 to 30, a modified example is exemplified with regard to the actuator 300 having the slot antennas 330, 340.

Figure 25:
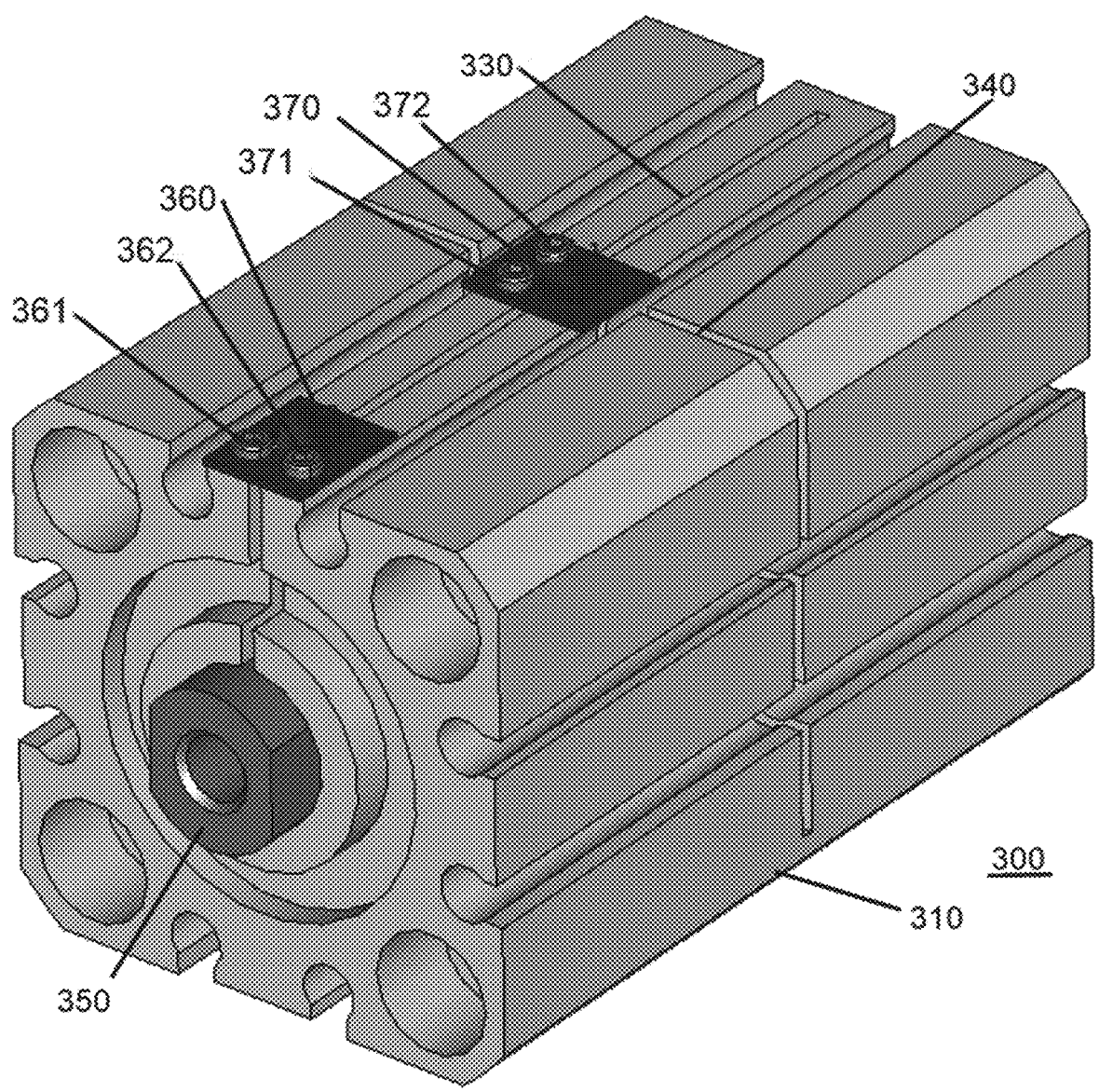
FIG. 25 is an example of a diagram illustrating a perspective view of an actuator having two different antennas and bolts.

With referring to FIG. 25, a perspective view of the actuator 300 is illustrated. Hereinafter, only differences from the actuator 300 illustrated in FIG. 21 (A) will be described.

The first slot antenna 330 and the second slot antenna 340 are provided by drilling on the device housing 310 of the actuator 300. In addition, each of the slot antennas 330, 340 is provided with a substrate (or board) 360, 370 of an IC for receiving electric power for improving the power-receiving efficiency.

Figure 26:
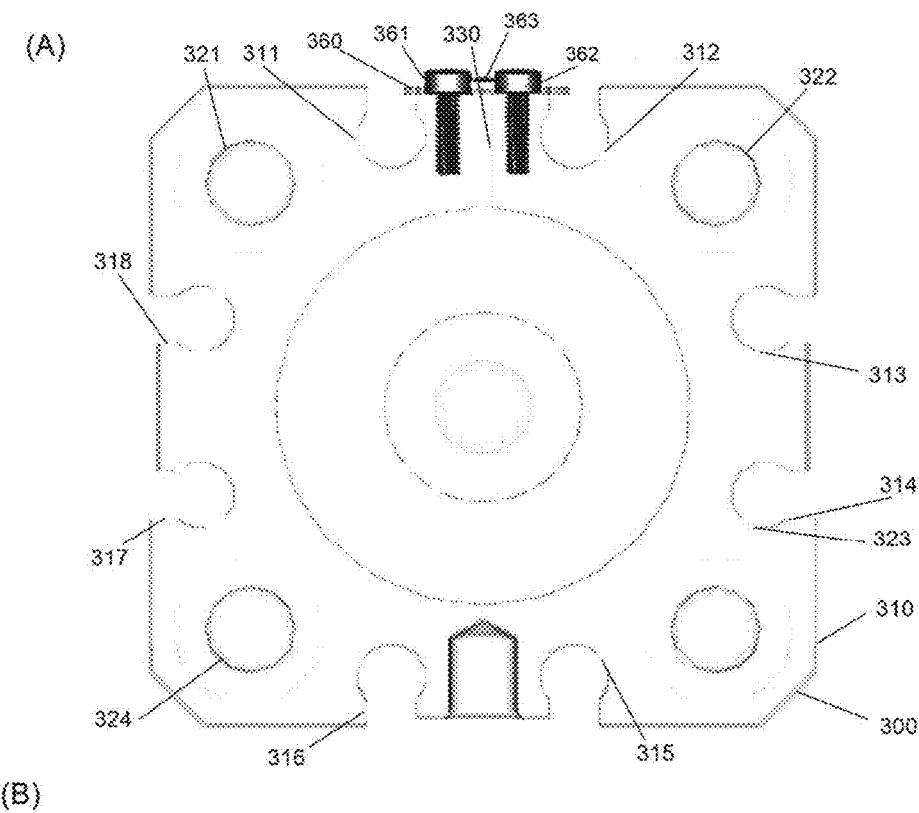
FIG. 26 is an example of a diagram illustrating a side view and a front view of the actuator of FIG. 25 for allowing the inside part to be viewed.
Figure 26:
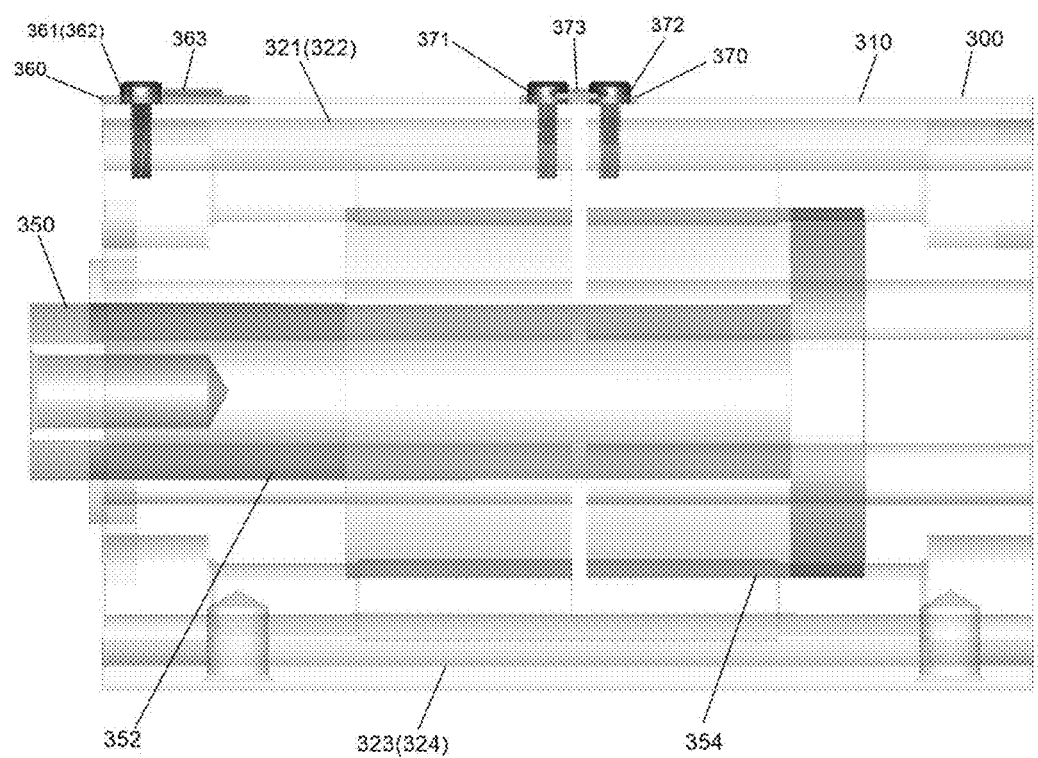

With referring to FIG. 26 (A), (B), a cross-sectional view of the front surface side and that of the side surface side of the actuator 300 (see FIG. 25) are schematically illustrated. As can be seen from the figures, bolts 361, 362 and a rectifier 363 are provided on the substrate 360. Similarly, it can be seen that bolts 371 and 372 and a rectifier 373 are provided on the substrate 370. These rectifiers 363, 373 may be provided as integrated with chip antennas, respectively.

In FIG. 26, it is illustrated that the substrates 360, 370 for feeding electric power are provided. However, actually, the slots 330, 340 formed on the device housing 310 serve as antennas. By providing a chip antenna, an inverted-F antenna, a monopole antenna, and/or a dipole antenna, etc., on the substrates 360 and/or 370, it becomes possible to generate respective patterns of electric fields and/or magnetic fields. As a result, it becomes possible to realize a coverage of 360 degrees. Therefore, it is possible to attain space saving of the device by minimizing the space required to add an antenna thereon, and to achieve an omnidirectional antenna (for receiving electric power from 360 degrees around). Thus, the actuator 300 which is capable of receiving electric power without having an antenna protruding to the outside is configured as a wireless power feeding actuator to be used as an antenna-less actuator (which is not provided with a protruding antenna).

Two bolts 361, 362 are provided on the substrate 360, and also two bolts 371, 372 are provided on the substrate 370. The two bolts 361, 362 are juxtaposed on the substrate 360 along the lateral direction, and the two bolts 371, 372 are juxtaposed on the other substrate 370 along the longitudinal direction. Each of the pair of the bolts 361, 362 and the pair of the bolts 371, 372 is capable of passing a current of electricity, and the two pairs are arranged orthogonally to each other. The number of the bolts 361, 362, and 371, 372 on each of the substrates 360 and 370 may be two or more. These bolts are not provided with surface coating. However, the bolts may be provided with surface coating under the conditions of short-circuiting of the conductors, and no loosening of the screws even when the robot moves abruptly.

As described above, each of the slot antennas 330, 340 is configured to generate radiation at the slot portion so that each slot is capable of functioning as an antenna. During the course of the function, each of the bolts 361, 362, and 371, 372 on the substrates 360 and 370 functions to send a current of electricity therethrough. Each of the rectifiers 363 and 373 is an element having a rectifying function of sending a current of electricity only in one direction, and of converting electromagnetic waves (RF) received by the antennas 330, 340 into DC-voltages (DC). A chip antenna may be further provided integrally on each of the substrates 360, 370. The two bolts 361, 362, and 371, 372 are provided on each of the substrates 360 and 370, respectively, but the number thereof may vary depending on the embodiment.

There are two types of chip antenna: a linear chip antenna like a dipole antenna or a monopole antenna; and a planar chip antenna. In the present example, a planar chip antenna is provided. The chip antenna is capable of being provided by using a metal portion of the device housing 310 of the actuator 300, as it is. Therefore, the area efficiency of the device may be improved as compared with the cases of the dipole antenna and the monopole antenna. In addition, various materials may be used to the chip antenna, and for example, ceramics or the like may be used thereto.

Figure 27:
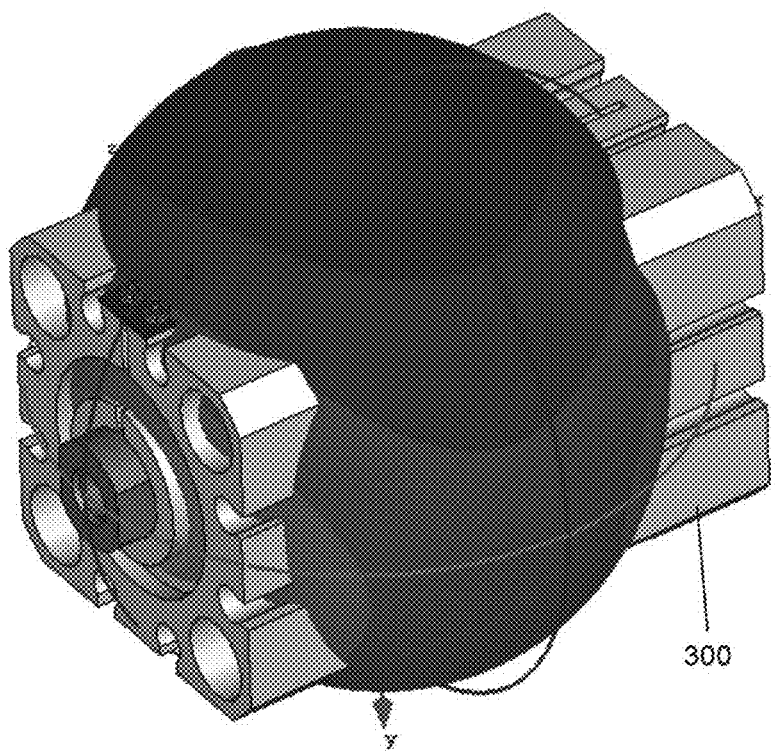
FIG. 27 is an example of a diagram illustrating radiations of two different types of antennas in the three-dimensional space.
Figure 27:
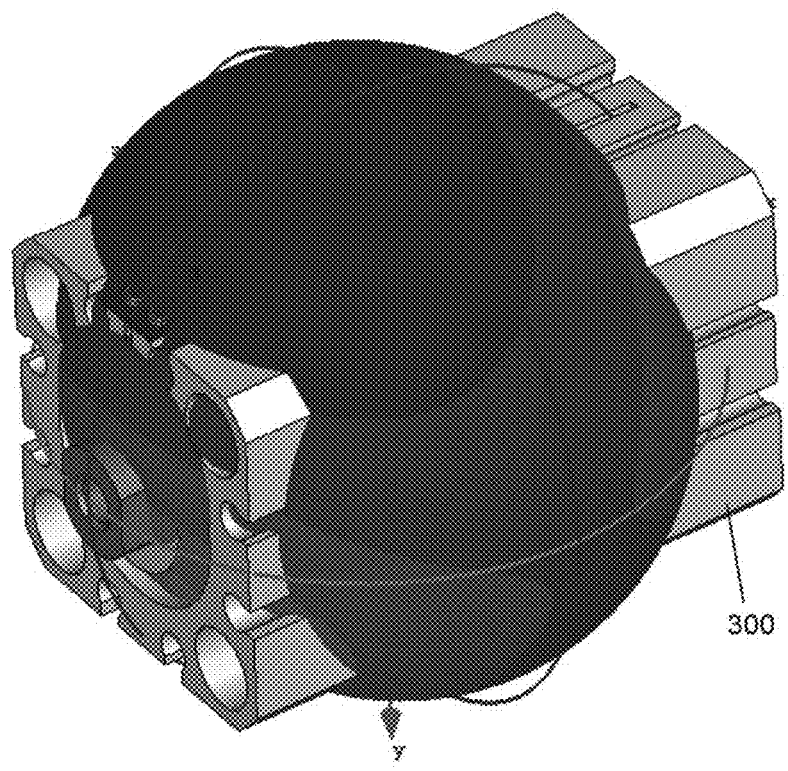

With referring to FIG. 27 (A), (B), the simulation results of electromagnetic fields of directivities of the antennas in the three-dimensional space are illustrated with regard to the two different slot antennas 330, 340 and the substrates 360, 370 (see FIG. 25). As in the cases of FIG. 22 (A), (B), each of the antennas 330, 340 appears as an omnidirectional antenna. The strengths of the directivities of the antennas 330, 340 are shifted from each other. Therefore, it is possible to mutually complement these directivities by using the two antennas 330, 340 in combination.

Figure 28:
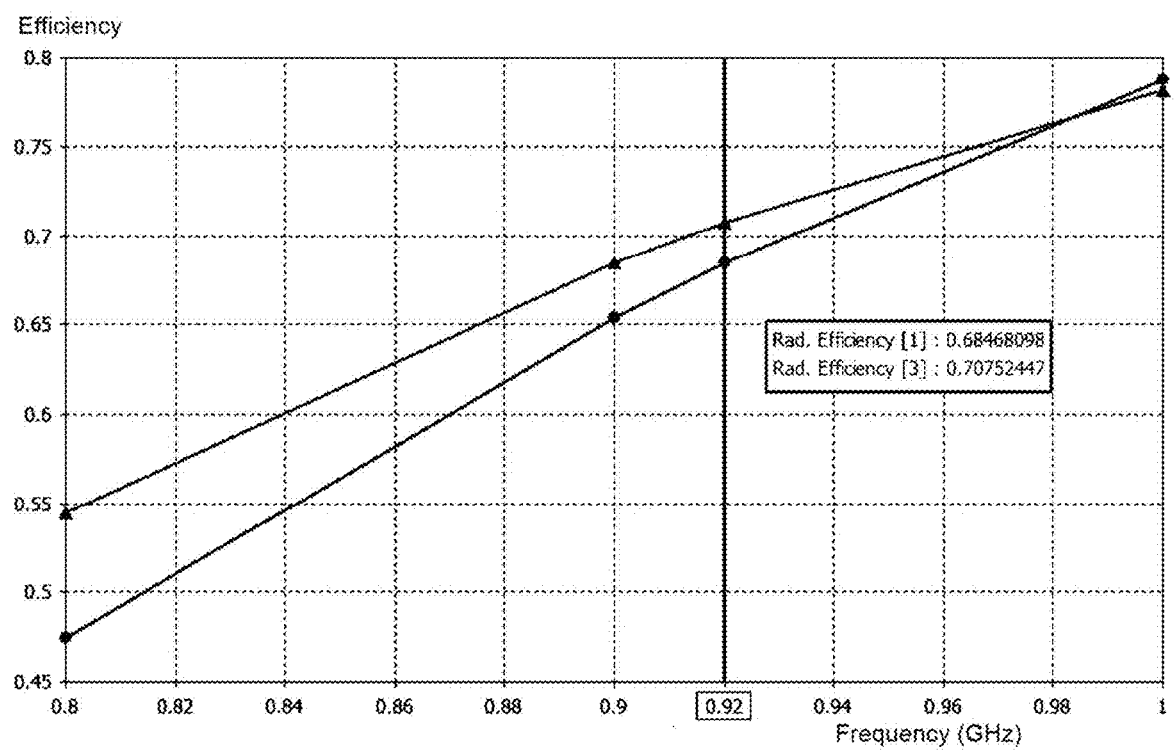
FIG. 28 is an example of a diagram illustrating efficiencies of two different types of antennas.

With referring to FIG. 28, the simulation results of radiation efficiencies are illustrated with regard to the two different slot antennas 330, 340 and the substrates 360, 370 (see FIG. 25). As in the case of FIG. 23, it is confirmed that, in general, each of the antennas 330, 340 may achieve a high efficiency of close to 70%. It is illustrated that the results of FIG. 23 correspond to an ideal power feeding, but the results of FIG. 28 correspond to a more realistic power feeding. Accordingly, in the case of FIG. 28, the efficiency is slightly lowered comparing to the case of FIG. 23.

Figure 29:
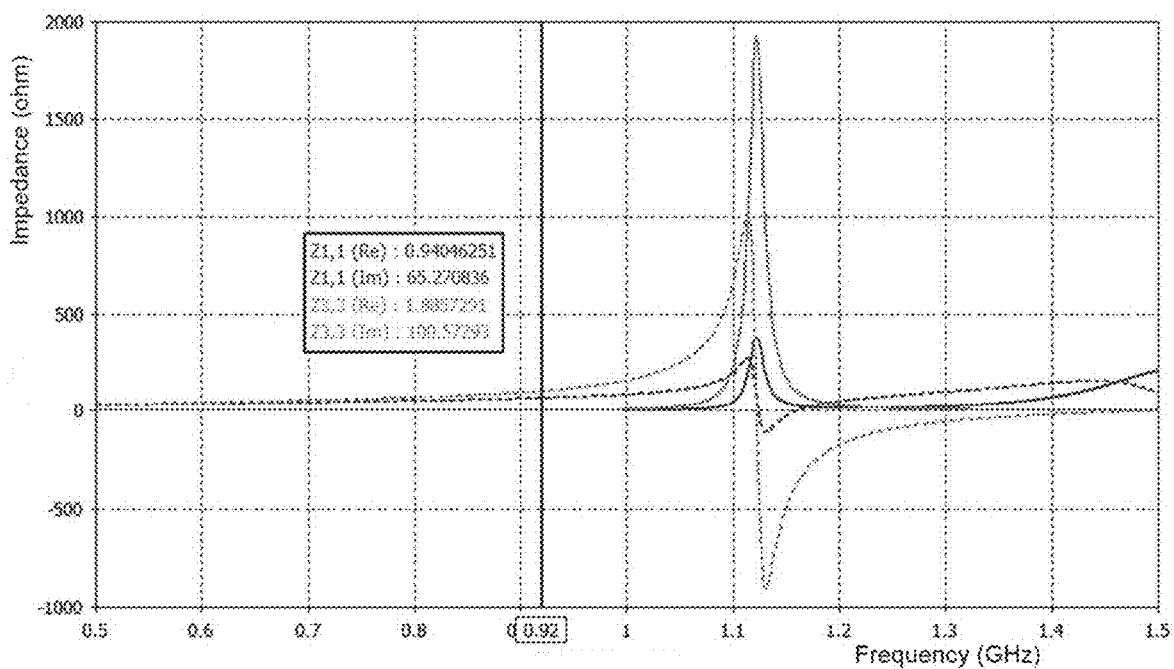
FIG. 29 is an example of a diagram illustrating changes in impedance of the power-receiving device of FIG. 21.

With referring to FIG. 29, the simulation results of impedance characteristics are illustrated with regard to the actuator (see FIG. 25). It is confirmed that, in general, good changes in impedance characteristics may be obtained due to electric power received by each antenna 330, 340 and the substrate 360, 370. For example, the impedance may be suppressed to a value close to 0Ω at the frequency of 0.92 GHz.

Figure 30:
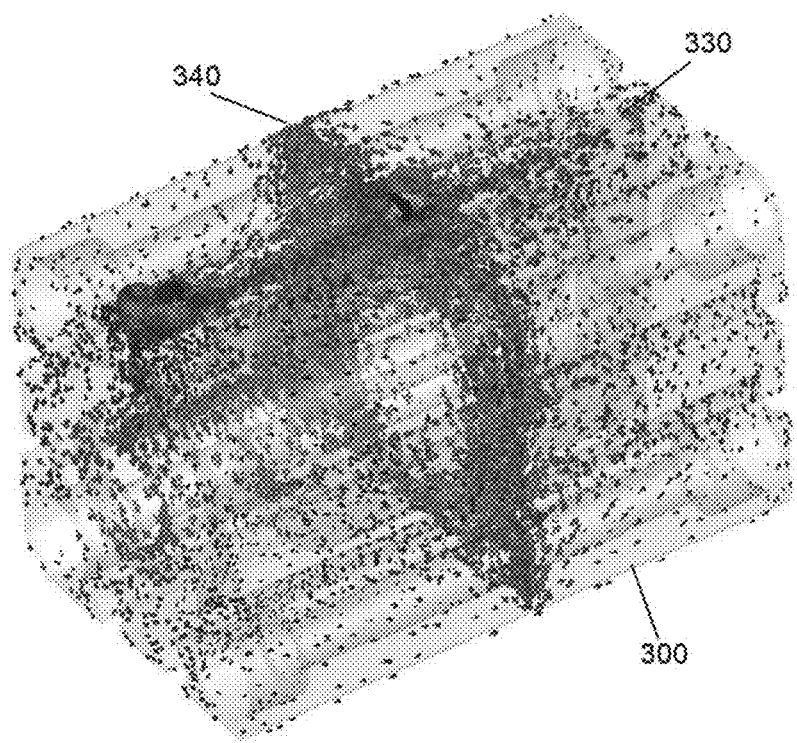
FIG. 30 is an example of a diagram illustrating simulations of the power-receiving condition of the power-receiving device of FIG. 25.
Figure 30:
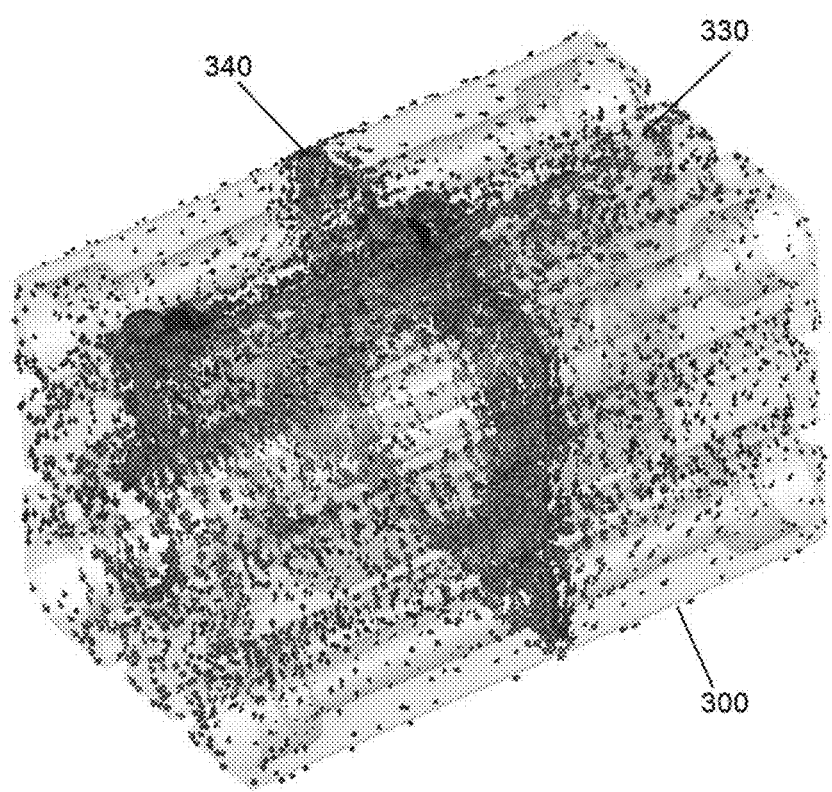

With referring to FIG. 30, the simulation results of electric current distributions on surfaces are illustrated for the actuator 300 (see FIG. 25). It is illustrated that, generally, currents are suitably distributed along the positions of the antennas 330, 340, respectively. Therefore, it is verified that each antenna 330, 340 may excellently act in practice.

Figure 32:
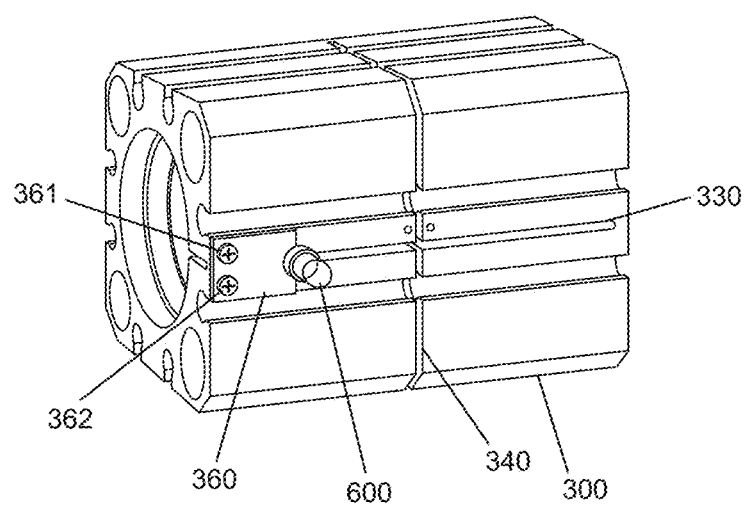
FIG. 32 is an example of a diagram illustrating an actuator housing which is provided with a LED.
Figure 32:
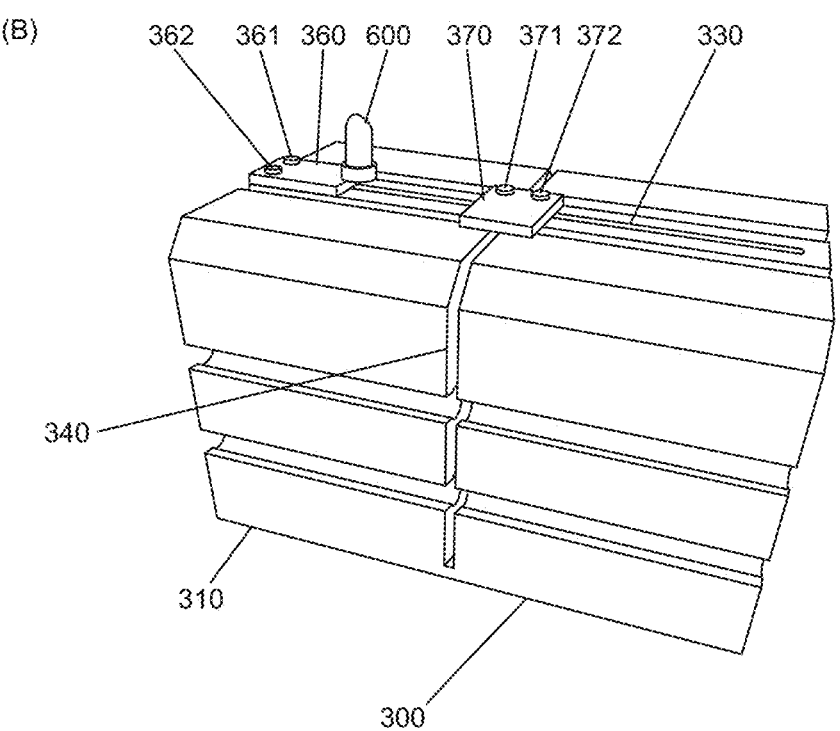

With referring to FIGS. 32 (A), (B), it is exemplified that a light-emitting diode (LED) 600 is able to be provided on the main body 310 of the actuator 300. The LED 600 is connected to the output of the power-receiving device via a switch (not shown). The LED 600 is configured to light up when the LED 600 is energized by voltages above a predetermined threshold. The lighting of the LED 600 is made to be visually confirmed from the outside of the actuator 300.

Accordingly, a user (for example, an inspector) is allowed to easily understand the power-receiving condition of the power-receiving device based on the lighting of the LED 600 without performing an electric inspection. The intensity of the light emitted by the LED 600 is approximately proportional to the amount of the current of electricity flowing therethrough. It is preferable to minimize the frequency or the duration of the lighting of the LED 600 in order to prevent wasting of available power for performing wireless power supply. The LED 600 may be switched on, before or after the start of the use of the power-receiving device in order to minimize the effect of the lighting on the power feeding operation.

Alternatively, it is possible to provide an acoustic device (not shown) such as a buzzer or the like on the main body 310 of the actuator 300 instead of the LED 600. Similarly, a buzzer may be configured to sound when voltages above a predetermined threshold flow therethrough. Therefore, a user (for example, an inspector) may easily understand the power-receiving condition of the power-receiving device according to the volume of the buzzer without performing an electrical inspection.

Example 5

Figure 33:
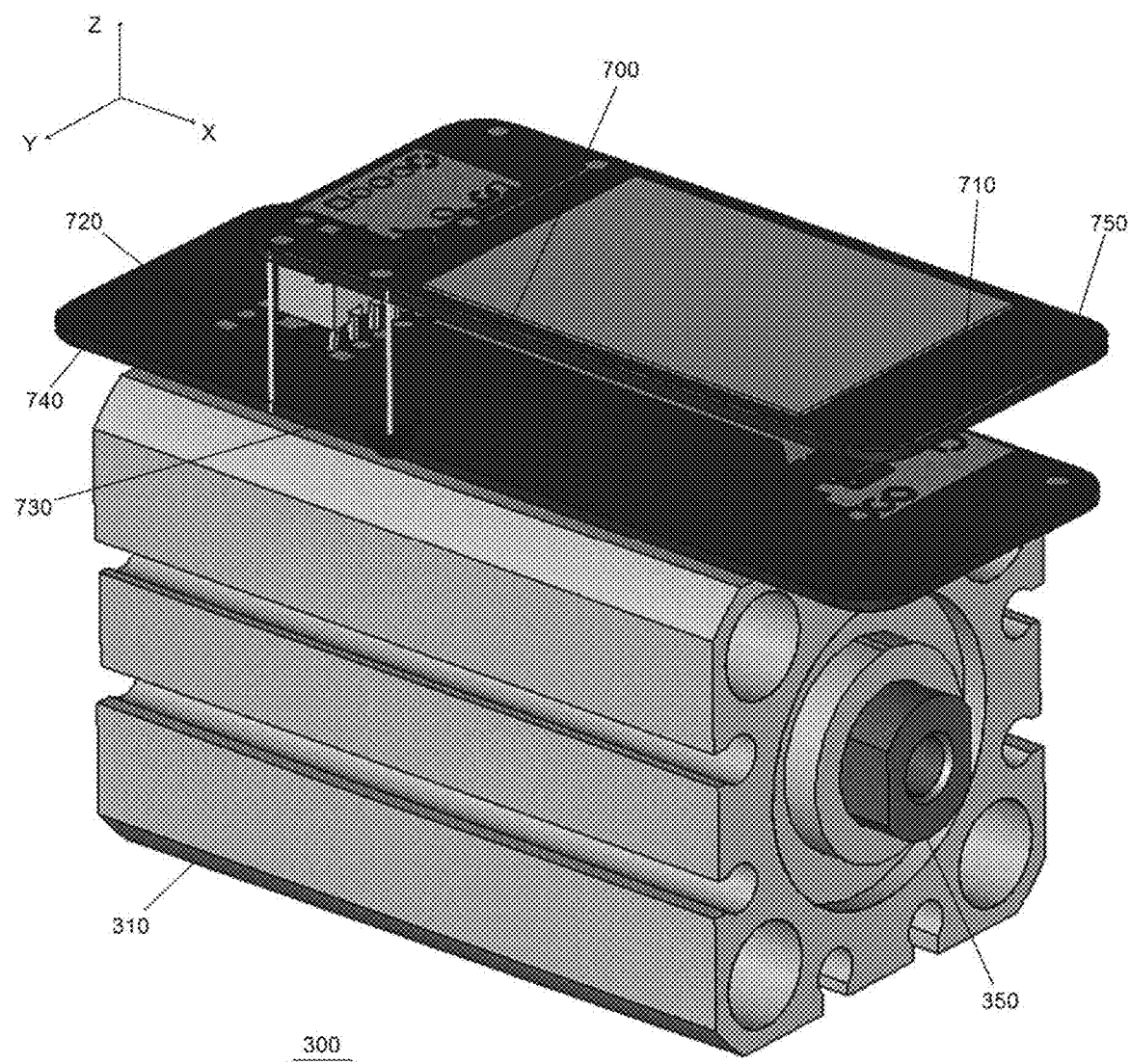
FIG. 33 is an example of a diagram illustrating a device housing which is provided with an inverted-F antenna.

With referring to FIG. 33, it is illustrated that an inverted-F antenna 700 is provided on the device housing 310 of the actuator 300. The device housing 310 has a size in the three-dimensional space (in the X-axis direction, the Y-axis direction, and the Z-axis direction), and expansion of the size of the device housing in the three-dimensional space due to the provision of the power-receiving devices is substantially limited to one axis direction (the Z-axis direction) at most.

Specifically, the device housing 310 has a substantially hexahedral structure, and the substrates 740, 750 are provided for attaching the inverted-F antenna 700 on the upper surface of the device housing 310. The size of each of the substrates 740, 750 is substantially equal to the size of the upper surface (one side surface) of the device housing 310, or is slightly bigger than the size of the upper surface at a small ratio (in the X-axis direction and the Y-axis direction). Especially, the back of the substrate 740 is made to be a ground substrate, and is short-circuited to the device housing 310 to effectively increase the ground size.

The inverted-F antenna 700 is configured to have a body portion 710 having a substantially L-shape (or angled shape), a long and narrow shorting portion 720, and a feed portion 730. It is possible to mount the inverted-F antenna 700 on the device housing 310 without requiring a relatively large space. For example, it is possible to configure the inverted-F antenna 700 to be shorter in the longitudinal direction (X-axis direction) as compared to the simple monopole antenna 230 (see FIGS. 18, 19). The longitudinal direction of the main body portion 710 is aligned with the longitudinal direction (X-axis direction) of the device housing 310. However, its tip portion extends in the width direction (Y-axis direction). It is possible to suppress the size in the width direction of the body portion 710 having a substantially L-shape to be equal to or smaller than the size in the width direction (Y-axis direction) of the device housing 310. Therefore, the protrusion from the device housing in the three-dimensional space due to the provision of the inverted-F antenna 700 is suppressed in the X-axis direction and the Y-axis direction. The body portion 710 may be constituted to be substantially straight without having an angled portion, or may be formed in a substantially L-shape having only one angled portion. However, it is possible to increase the number of angled portions.

The shorting portion 720, and the feed portion 730 are provided to connect the two substrates 740, 750 in the vertical direction (the Z-axis direction). It is possible to adjust the distance between the shorting portion 720 and the feed portion 730, and the width and the length of the shorting portion 720 and those of the feed portion 730. It is also possible to replace the locations of the shorting portion 720 and the feed portion 730. That is, it is possible to have a feed portion 720 and a shorting portion 730. The control of the impedance matching may be executed more easily in the inverted-F antenna 400. The reason is that, a plurality of adjustable parameters are provided in the inverted-F antenna 400 so that it is possible to cope with various specifications by selecting an appropriate shape of the inverted-F antenna 400. The body portion 710 is able to contribute to matching and to radiating (for receiving electric power).

Also in this case, the power-receiving device 20 may include the slot antenna (see FIGS. 21, 25) that mainly generates magnetic fields, and the inverted-F antenna (see FIG. 33) that mainly generates electric fields. The slot antenna and the inverted-F antenna may be aligned in substantially the same direction, and the slot antenna and the inverted-F antenna may constitute an omnidirectional antenna having two radiation patterns and/or power-receiving patterns substantially orthogonal to each other.

As described above, the present examples provide the device housings 31, 310 for wirelessly receiving electric power for supplying electric power to the corresponding device 30, 300, while suppressing the expansion of the sizes of the devices 30, 300. In addition, the present examples provide the devices 30, 300 having the same device housings 31, 310.

The power-receiving device 20 provided on the device housings 31, 310 is at least one of a dipole antenna, a slot antenna, a monopole antenna, an inverted-F antenna, and a chip antenna (which may be a linear antenna or a planar antenna)

Preferably, the device housing 31, 310 are configured to include the power-receiving device 20 having at least two of a monopole antenna, a dipole antenna, a slot antenna, an inverted-F antenna, and a chip antenna.

Preferably, the two antennas of the power-receiving device 20 are made to have different directivities from each other. Preferably, the two antennas are provided to constitute an omnidirectional antenna having different radiation patterns or power-receiving patterns substantially orthogonal to each other.

The power-receiving device 20 is configured such that a portion protruding to the outside from the device housings 31, 310 is substantially limited to one axis direction at the maximum in the three-dimensional space (for example, see the X-axis direction in FIG. 8, the X-axis direction in FIG. 19, and the Z-axis direction in FIG. 33). Alternatively, the power-receiving device 20 is configured such that a portion protruding to the outside from the device housings 31, 310 is substantially eliminated (see FIGS. 21, 25). As a result, in both the cases, the device may be treated in almost the same way as the conventional device 30.

Preferably, in a case where the power-receiving device 20 is configured to have a portion protruding to the outside (see the X-axis direction in FIG. 8), the protruding direction thereof is made to be aligned with the conventional wiring direction (see the wiring in FIG. 2 (C)). As a result, the usability of the device is not substantially impaired in almost the same way as the conventional device 30.

Preferably, when the power-receiving device 20 is mounted on the device housing 31, 310 of the device, it is configured not to interfere with the working surface of the device (see reference numeral 32 in FIG. 8, and reference numeral 350 in FIG. 21). As a result, the usability of the device is not substantially impaired in almost the same way as the conventional device 30.

In FIG. 33, it is illustrated that when the inverted-F antenna 700 is provided upward (in the Z-axis direction) from the upper surface of the device housing 310, a part of the substrate 740 is made to protrude in a direction perpendicular to the protruding direction (in the X-axis direction and/or the Y-axis direction). However, the ratio of the protrusion (along the X-axis direction) of the substrate 740 is relatively small as a whole, and it is possible to ignore it in practice. For example, in a case when the protrusion is made to be equal to or less than about 10% of the size of the upper surface of the device housing 310, it is possible to ignore the protrusion because it may not cause substantial damage in practice. Importantly, even if there is a slight protrusion (for example, along the X-axis direction) of the substrate 740, the ratio of the protrusion is suppressed. As a result, the operation of the device 300 is not affected by it, and the mounting space thereof is not substantially increased.

The devices 30, 300 to which electric power is supplied by the power-receiving device 20 is able to be operated in the low power mode as illustrated in FIG. 4 (or in a mode that enables the operation with about one-fifth of power consumption of a conventional normal operation mode). Alternatively, the devices 30, 300 may be operated in the normal power mode (or in a mode that enables the operation with power consumption of the conventional operation mode). In addition, it may be possible to operate the devices 30, 300 with power consumption of in a range of from about 1/5 to about 1/1 as compared to the conventional operation mode.

In practice, the power-receiving device 20 may be provided as a device (or an electric device) that is a sensor or an actuator. For example, it may be provided as the sensor 30 illustrated in FIGS. 8, 16-18 or as the actuator 300 illustrated in FIGS. 21, 25.

Alternatively, the power-receiving device 20 may be provided as a device housing of a device that is a sensor or an actuator. For example, the present example may be applied to an existing sensor or actuator only by replacing a device housing thereof. For example, the present example may be provided as the device housing 31 to be used for the sensor 30 illustrated in FIGS. 8, 16-18 or the device housing 310 to be used for the actuator 300 illustrated in FIGS. 21, 25.

The device housing 31, 310 is defined as a housing (or a case) that forms a main body of the device. The above-mentioned device housings 31, 310 are configured to fully accommodate the internal components (for example, a circuit, etc.) of the device. However, in some examples, it is not always necessary to completely accommodate the internal components of the device, but it is possible to expose one or a plurality of the components from the device housing.

Further, the power-receiving device 20 may be provided as a part of a device housing of a device that is a sensor or an actuator. For example, the present example may be applied only by replacing or attaching a part of a device housing of an existing sensor or actuator. It may be provided as the connector 33 to be used for the device housing 31, for supplying electric power to the sensor 30, as illustrated in FIGS. 8, 16-18. That is, it may be provided as the connector 33 for performing wireless power supply that is used by being replaced with a conventional connector for performing wired power supply.

Further, the power-receiving device 20 may be provided as a system 1 which is configured to include a device 30 to which electric power is supplied, and additional components (see reference numerals 40, 50 in FIG. 1A and reference numeral 80 in FIG. 15).

Further, the power-receiving device 20 may be provided as a machine 100 having a system 1 which is configured to include a device 30 to which electric power is supplied, and additional components (see reference numerals 40, 50 in FIG. 1A and reference numeral 80 in FIG. 15).

The power-receiving device 20 may be configured to allow the adjustment of the power-receiving condition of the antenna according to the embodiment. For example, the protruding length of the dipole antenna 21 illustrated in FIG. 8 or the protruding length of the monopole antenna 230 illustrated in FIG. 18 may be made to be changeable. The dipole antenna 21 illustrated in FIG. 8, the monopole antenna 230 illustrated in FIG. 18, and the linear chip antenna, etc., may be configured to be detachable, dividable, extendable and/or foldable.

In addition, for example, in the actuator 300 illustrated in FIG. 25, each of the bolts 361, 362, 371, 372 provided on the substrates 360, 370 is capable of sending a current of electricity therethrough. The positions of the bolts 361, 362, 371, 372 may be made to be adjustable. For example, when the bolts 361, 362, 371, 372 are provided to be screwed into corresponding holes formed in the substrates 360, 370, the height of the bolts 361, 362, 371, 372 may be changed by adjusting the screwed condition. Each of the protruding heights of the bolts 361, 362, 371, 372 may be adjusted in order to obtain an optimum current value according to the power-receiving condition.

Further, for example, in the actuator 300 illustrated in FIG. 25, the depth, the length, the width, and/or the feeding position of each of the slots 330, 340 provided by drilling on the device housing 310 of the actuator 300 may be made to be adjustable. For example, when each of the slots 330, 340 is provided by forming a recessed portion on the device housing 310, the depth, the length, the width or the like thereof may be changed by fitting an arbitrary member in each of the slots 330, 340. The depth, the length, the width or the like of each of the slots 330, 340 may be adjusted in order to obtain an optimum feeding position according to the power-receiving condition.

Further, for example, in the actuator 300 illustrated in FIG. 25, the power-receiving condition of the antennae 300 may be made to be adjustable by providing an IC for receiving electric power on one or a plurality of the substrates 360, 370. The adjustment of the bolts 361, 362, 371, 372 and the slots 330, 340 may be configured to be performed manually or automatically.

Further, for example, in the actuator 300 illustrated in FIG. 25, when the rectifiers 363, 373 are provided on the substrates 360, 370, each of the rectifier 363, 373 may have a negative impediment. In such a case, an IC for receiving electric power may be used to search for a positive feeding position in order to avoid the occurrence of the impedance-mismatching. The IC for receiving electric power may be configured to determine a feeding position according to the power-receiving condition in order to avoid the occurrence of the impedance-mismatching without using an impedance matching circuit.

Further, for example, in the present examples, the power-receiving system 1 or the power-receiving device 20 may be configured to include a CPU (or a processing device) and a memory (or a storage device) in order to perform the control of the above-described contents for adjusting the power-receiving condition of the antenna.

The CPU is generally defined as a device that executes software (or program). For example, The CPU is configured as a Neumann-type CPU. The CPU may be configured to include a control device for controlling the whole of the system/device, an arithmetic device, a register for temporarily storing data, an interface for a memory, and an interface for a peripheral device and an input/output device, etc.

The memory is defined as a device capable of storing data therein. For example, the memory is a primary storage device that is accessed directly by the CPU or a secondary storage device that is accessed by using an input/output channel, etc. For example, the memory may be configured to use an arbitrary medium, a fixed disc, a volatile or non-volatile random access memory, a CD, a DVD, a flash drive, a removable media (for example, a small thumb-sized memory) which is attachable to a corresponding interface (for example, a USB port) or the like.

Further, for example, the present example may be provided as a computer program product for controlling the power-receiving condition of the antenna, with regard to the above-mentioned power-receiving system 1 or the power-receiving device 20.

The computer program product may be implemented as a program, a function, a routine, an executable object or the like.

Therefore, the present invention also relates to a computer program product for performing the above-described control.

The computer program product (for example, a computer program means or the like) may be implemented by using a memory card, an USB stick, a CD-ROM, a DVD, or a file that is downloadable from a server in a network. For example, such a file may be provided by transferring a file containing a computer program product through a wireless communication network.

A person skilled in the art may recognize that the above-described examples may be used or modified in a variety of ways without departing from the scope of the claims.

For example, each of the components of the power-receiving device 20 or the power-receiving system 1 may include different one or a plurality of components necessary for the operation, or may further include additional one or a plurality of components to provide one or a plurality of functions other than those described herein.

Therefore, it is feasible to practice the contents of the claims otherwise than as specifically described herein.

The above-mentioned examples disclose at least the following configurations.

(1)

A device housing constituting a main body of a device which is a sensor or an actuator is provided.

The device housing is provided with a power-receiving device for mainly generating an electric field and/or a magnetic field for performing wireless power supply.

The power-receiving device includes at least one of a dipole antenna, a slot antenna, a monopole antenna, a chip antenna and an inverted-F antenna.

In addition, the device housing has a size in a three-dimensional space, and expansion of the size of the device housing in the three-dimensional space due to the provision of the power-receiving devices is substantially limited to one axis direction at most.

For example, the size of the expansion of the device housing in the three-dimensional space due to the provision (or adding) of the power-receiving devices is substantially limited to one axis direction in practice (in a case of the dipole antenna, the monopole antenna, the linear chip antenna, or the inverted-F antenna).

Alternatively, for example, the size of the expansion of the device housing due to the provision of the power-receiving devices is substantially eliminated in practice (in a case of the slot antenna or the planar chip antenna).

Preferably, in a case that the size of the device housing is expanded along the one axis direction due to the provision of the power-receiving devices, the ratio of the expansion is suppressed.

For example, the size of the expansion may be set not longer than 2 times of the size of the device housing along the expanding direction. Or, the size of the expansion may be set not longer than 1.5 times of the size of the device housing along the expanding direction.

As a result, the devices 30, 300 according to the present embodiments are capable of avoiding an expansion of the mounting space, and of being used almost the same way as the conventional device to which electric power is supplied with a wire.

(2)

The power-receiving device may include a slot antenna for mainly generating a magnetic field and a dipole antenna for mainly generating an electric field.

In addition, the slot antenna and the dipole antenna may be arranged substantially in a same direction.

Further, the slot antenna and the dipole antenna may form an omnidirectional antenna having two emission patterns or power-receiving patterns which are orthogonal to each other (see FIGS. 8, 9).

(3)

The power-receiving device may include a slot antenna for mainly generating a magnetic field and a monopole antenna for mainly generating an electric field.

In addition, the slot antenna and the monopole antenna may be arranged substantially in a same direction.

Further, the slot antenna and the monopole antenna may form an omnidirectional antenna having two emission patterns or power-receiving patterns which are orthogonal to each other (see FIGS. 17, 18).

(4)

The power-receiving device may include a first slot antenna for mainly generating a magnetic field and a second slot antenna for mainly generating a magnetic field.

In addition, the first slot antenna and the second slot antenna may be arranged substantially in intersecting directions.

Further, the first slot antenna and the second slot antenna may form an omnidirectional antenna having two emission patterns or power-receiving patterns which are orthogonal to each other (see FIGS. 21, 22).

(5)

The power-receiving device may include a slot antenna for mainly generating a magnetic field and an inverted-F antenna for mainly generating an electric field.

In addition, the slot antenna and the inverted-F antenna may be arranged substantially in a same direction.

Further, the slot antenna and the inverted-F antenna may form an omnidirectional antenna having two emission patterns or power-receiving patterns which are orthogonal to each other (see FIGS. 8, 31, 21, 33).

(6)

The power-receiving device may include a slot antenna for mainly generating a magnetic field and a chip antenna for mainly generating an electric field.

In addition, the slot antenna and the chip antenna may be arranged substantially in a same direction;

Further, the slot antenna and the chip antenna may form an omnidirectional antenna having two emission patterns or power-receiving patterns which are orthogonal to each other (see FIG. 25).

(7)

The power-receiving device may include at least two of the dipole antenna, the slot antenna, the monopole antenna, the chip antenna and the inverted-F antenna.

In addition, each of the antennas may be configured to have a substantially different emission pattern or power receiving pattern.

Especially, each of the two antennas 21, 22 may be configured to have a different directivity of antenna so that areas of the two antennas where the directivities are weakened may be mutually interpolated.

(8)

The power-receiving device may be a slot antenna.

In addition, the expansion of the size of the device housing due to the provision of the power-receiving devices may be substantially eliminated.

Especially, when the slot antenna is provided on the device housing, it may be provided along the longitudinal direction of the device housing by drilling a wall of the device housing in the thickness direction (see FIGS. 17, 21, 25).

(9)

The device housing may be capable of including a metallic connecter for performing wired power supply (see reference numeral 33 in FIGS. 8, 2), and the connector may be provided with the power-receiving device.

In this case, it becomes possible to perform wireless power supply only by replacing a part of the device housing (see reference numeral 33 in FIGS. 8, 2), and to utilize the existing device housing in maximum.

(10)

The device housing may be provided with a chip antenna which is integrated with a rectifier (see FIGS. 25, 26).

(11)

The device housing may be provided with a slot antenna and a bolt which is capable of passing a current of electricity (see FIGS. 25, 26).

(12)

A device which is a sensor or an actuator is provided.

The sensor includes the above-mentioned device housing.

In addition, the device is capable of performing wireless power supply according to a microwave system.

(13)

A system including a device which is a sensor or an actuator; and a filter which is capable of receiving output of the device is provided.

The device includes the above-mentioned device housing.

In addition, the filter is used to enable operation of the sensor or the actuator with about one-fifth of power consumption of a conventional normal operation mode of the sensor or the actuator.

Alternatively, the device may be operated with power consumption of in a range of from about 1/5 to about 1/1 as compared to the conventional operation mode.

It is possible to operate the device by performing wireless power supply, and also operate the data transmission of the device by performing wireless power supply. Accordingly, it is possible to fully operate the device by performing wireless power supply thereto.

EXPLANATION OF REFERENCE NUMERALS

1: System
10: Power-transmitting device
20: Power-receiving device
21: Dipole antenna
22: Slot antenna
30: Device (for example, sensor)
31: Device housing (housing or case)
33: Connector
210: Dipole antenna
220: Slot antenna
230: Monopole antenna
300: Device (for example, actuator)
310: Device housing (housing or case)
330: Slot antenna
340: Slot antenna
363: Rectifier (for example, integrated with chip antenna)
373: Rectifier (for example, integrated with chip antenna)
400: Inverted-F antenna
700: Inverted-F antenna

What is claimed is:

1. A device housing constituting a main body of a device which is a sensor or an actuator,
   wherein the device housing is provided with a power-receiving device for mainly generating an electric field or a magnetic field for performing wireless power supply;
   wherein the power-receiving device includes at least one of a dipole antenna, a slot antenna, a monopole antenna, a chip antenna and an inverted-F antenna; and
   wherein the device housing has a size in a three-dimensional space, and expansion of the size of the device housing in the three-dimensional space due to the provision of the power receiving devices is substantially limited to one axis direction at most.

2. The device housing according to claim 1, wherein the power-receiving device includes a slot antenna for mainly generating a magnetic field and a dipole antenna for mainly generating an electric field;
   wherein the slot antenna and the dipole antenna are arranged substantially in a same direction; and
   wherein the slot antenna and the dipole antenna form an omnidirectional antenna having emission patterns or power receiving patterns which are orthogonal to each other.

3. The device housing according to claim 1, wherein the power-receiving device includes a slot antenna for mainly generating a magnetic field and a monopole antenna for mainly generating an electric field;
   wherein the slot antenna and the monopole antenna are arranged substantially in a same direction; and
   wherein the slot antenna and the monopole antenna form an omnidirectional antenna having emission patterns or power receiving patterns which are orthogonal to each other.

4. The device housing according to claim 1, wherein the power-receiving device includes a first slot antenna for mainly generating a magnetic field and a second slot antenna for mainly generating a magnetic field;
   wherein the first slot antenna and the second slot antenna are arranged substantially in intersecting directions; and
   wherein the first slot antenna and the second slot antenna form an omnidirectional antenna having emission patterns or power receiving patterns which are orthogonal to each other.

5. The device housing according to claim 1, wherein the power-receiving device includes a slot antenna for mainly generating a magnetic field and an inverted-F antenna for mainly generating an electric field;
   wherein the slot antenna and the inverted-F antenna are arranged substantially in a same direction; and
   wherein the slot antenna and the inverted-F antenna form an omnidirectional antenna having emission patterns or power receiving patterns which are orthogonal to each other.

6. The device housing according to claim 1, wherein the power-receiving device includes a slot antenna for mainly generating a magnetic field and a chip antenna for mainly generating an electric field;
   wherein the slot antenna and the chip antenna are arranged substantially in a same direction; and
   wherein the slot antenna and the chip antenna form an omnidirectional antenna having emission patterns or power receiving patterns which are orthogonal to each other.

7. The device housing according to claim 1, wherein the power-receiving device includes at least two of the dipole antenna, the slot antenna, the monopole antenna, the chip antenna and the inverted-F antenna; and
   wherein the at least two of the antennas are configured to have a substantially different emission pattern or power receiving pattern.

8. The device housing according to claim 1, wherein the power-receiving device is a slot antenna, and
   wherein the expansion of the size of the device housing in a three-dimensional space due to the provision of the power receiving devices is substantially eliminated.

9. The device housing according to claim 1, wherein the device housing is capable of including a metallic connecter for performing wired power supply, and
   wherein the connector is provided with the power receiving device.

10. The device housing according to claim 1, wherein the device housing is provided with a chip antenna which is integrated with a rectifier.

11. The device housing according to claim 1, wherein the device housing is provided with a slot antenna and a bolt which is capable of passing a current of electricity.

12. A device which is a sensor or an actuator, the device comprising:
   the device housing according to claim 1,
   wherein the device is capable of performing wireless power supply according to a microwave system.

13. A system comprising:
   a device which is a sensor or an actuator; and
   a filter which is capable of receiving output of the device;
   wherein the device includes the device housing according to claim 1; and
   wherein the filter is used to enable operation of the sensor or the actuator with about one-fifth of power consumption of a conventional normal operation mode of the sensor or the actuator.

* * * * *